(12) United States Patent
Burns

(10) Patent No.: US 12,478,995 B2
(45) Date of Patent: *Nov. 25, 2025

(54) FLUID DISPENSING SYSTEMS

(71) Applicant: Rooftop Research, LLC, New Wilmington, PA (US)

(72) Inventor: Robert S. Burns, New Wilmington, PA (US)

(73) Assignee: Rooftop Research, LLC, New Wilmington, PA (US)

(*) Notice: Subject to any disclaimer, the term of this patent is extended or adjusted under 35 U.S.C. 154(b) by 99 days.

This patent is subject to a terminal disclaimer.

(21) Appl. No.: 18/497,406

(22) Filed: Oct. 30, 2023

(65) Prior Publication Data
US 2024/0058828 A1 Feb. 22, 2024

Related U.S. Application Data

(63) Continuation of application No. 17/547,539, filed on Dec. 10, 2021, now Pat. No. 11,826,772, which is a continuation of application No. 16/251,517, filed on Jan. 18, 2019, now Pat. No. 11,198,142.

(51) Int. Cl.
*B05B 7/24* (2006.01)
*B05B 7/00* (2006.01)
*B05B 7/08* (2006.01)
*B65D 83/00* (2006.01)

(52) U.S. Cl.
CPC .......... *B05B 7/2486* (2013.01); *B05B 7/0846* (2013.01); *B05B 7/2424* (2013.01); *B05B 7/2472* (2013.01); *B05B 7/2481* (2013.01); *B65D 83/7713* (2025.01); *B05B 7/0093* (2013.01)

(58) Field of Classification Search
CPC ... B05B 7/2486; B05B 7/0846; B05B 7/2424; B05B 7/2472; B05B 7/2481; B65D 83/0072
USPC ...................................................... 222/94–95
See application file for complete search history.

(56) References Cited

U.S. PATENT DOCUMENTS

| | | | |
|---|---|---|---|
| 2,752,075 | A | 6/1956 | Hill |
| 3,288,333 | A | 11/1966 | Valk, Jr. |
| 3,767,078 | A | 10/1973 | Gortz et al. |
| 3,791,557 | A | 2/1974 | Venus, Jr. |

(Continued)

*Primary Examiner* — Jeremy Carroll
(74) *Attorney, Agent, or Firm* — Dority & Manning, P.A.

(57) ABSTRACT

A variety of dispensing manifolds which are removable connectable to a single deformable container having a single exit portion are disclosed. The dispensing manifolds of the present disclosure provide a single deformable container having a single exit with one or more outlets from which a fluid can be controllably dispensed. The present disclosure also provides a single force generation mechanism, a deformable container holding a fluid or substance, and dispensing mechanisms all on one machine, i.e., a carrier; a system that may also include a pressurized air source that assists a flow of a fluid; and a system that allows for a continuous flow a substance. The systems of the present disclosure provide a deformable container and a method of dispensing wherein, during dispensing, an actuation member is continuously free of contact with the fluid or substance within the container and the actuation member only contacts the exterior surface of the deformable container.

21 Claims, 55 Drawing Sheets

(56) References Cited

U.S. PATENT DOCUMENTS

| | | |
|---|---|---|
| 4,201,318 A | 5/1980 | Adams |
| 4,212,413 A | 7/1980 | Barber, Jr. et al. |
| 4,334,636 A | 6/1982 | Paul |
| 4,355,734 A | 10/1982 | Moore |
| 4,749,337 A | 6/1988 | Dickinson et al. |
| 4,830,230 A | 5/1989 | Powers |
| 5,206,037 A * | 4/1993 | Robbins, III ........ B65D 1/0292 425/522 |
| 5,238,147 A | 8/1993 | Yasui et al. |
| 5,312,028 A | 5/1994 | Hume |
| 5,346,476 A | 9/1994 | Elson |
| 5,390,825 A | 2/1995 | Rockel |
| 5,411,180 A | 5/1995 | Dumelle |
| 5,553,740 A * | 9/1996 | King .................... B67D 7/0255 222/88 |
| 5,593,066 A | 1/1997 | Konuma et al. |
| 5,755,361 A | 5/1998 | Restive et al. |
| 5,799,827 A | 9/1998 | D'Andrade |
| 5,881,914 A | 3/1999 | Tsuda et al. |
| 5,882,691 A | 3/1999 | Conboy |
| 5,984,199 A | 11/1999 | Restive |
| 6,257,448 B1 | 7/2001 | D'Andrade et al. |
| 6,267,999 B1 | 7/2001 | Romer et al. |
| 6,308,868 B1 | 10/2001 | Hoffman et al. |
| 6,328,715 B1 | 12/2001 | Dragan et al. |
| 6,412,707 B1 | 7/2002 | Wirz |
| 6,595,392 B2 | 7/2003 | Barnett |
| 6,662,969 B2 | 12/2003 | Peeler et al. |
| 7,056,556 B2 | 6/2006 | Burns |
| 8,342,372 B2 | 1/2013 | Choiniere et al. |
| 8,998,040 B2 * | 4/2015 | Burns .................... F04B 9/1053 222/63 |
| 9,511,390 B2 * | 12/2016 | Burns .................... F15B 15/149 |
| 11,198,142 B2 | 12/2021 | Burns |
| 2003/0102333 A1 * | 6/2003 | Wright ................. B67D 1/0001 222/326 |
| 2004/0056045 A1 * | 3/2004 | Kosmyna .............. B05B 7/2472 222/394 |
| 2007/0227133 A1 | 10/2007 | Aarestad et al. |
| 2008/0000928 A1 | 1/2008 | Choiniere et al. |
| 2011/0081499 A1 * | 4/2011 | Parks .................... B05B 7/2405 427/428.01 |
| 2011/0259912 A1 | 10/2011 | Choiniere et al. |
| 2011/0259919 A1 | 10/2011 | Choiniere et al. |
| 2012/0012054 A1 | 1/2012 | Galvin et al. |
| 2012/0042826 A1 * | 2/2012 | Galvin ................ B32B 37/1284 118/612 |
| 2012/0074167 A1 | 3/2012 | Galvin et al. |
| 2012/0104020 A1 * | 5/2012 | Cur ....................... B67D 1/0001 222/105 |
| 2012/0181301 A1 | 7/2012 | Choiniere et al. |
| 2013/0008376 A1 | 1/2013 | Snowwhite et al. |
| 2013/0247750 A1 | 9/2013 | Olson |
| 2013/0269806 A1 * | 10/2013 | Burns ............... B01F 33/50114 137/594 |
| 2014/0169997 A1 | 6/2014 | Ibatici |
| 2014/0263440 A1 * | 9/2014 | Burns ............... B05C 17/00583 222/386.5 |
| 2017/0036234 A1 | 2/2017 | Burns |

\* cited by examiner

CONVENTIONAL SYSTEM

FLUID DISPENSING SYSTEMS

CROSS-REFERENCE TO RELATED APPLICATIONS

The present application is a continuation of and claims priority to U.S. application Ser. No. 17/547,539 entitled "Fluid Dispensing System", filed Dec. 10, 2021, which claims priority to U.S. application Ser. No. 16/251,517 entitled "Fluid Dispensing System", filed Jan. 18, 2019, the entire disclosures of which are hereby expressly incorporated by reference herein.

BACKGROUND OF THE INVENTION

1. Field of the Disclosure

The present disclosure relates generally to fluid dispensing systems. More particularly, the present disclosure relates to dispensing manifolds that provide a single container having a single exit with one or more outlets from which a fluid can be controllably dispensed; a system having a force generation mechanism, a container holding a fluid or substance, and dispensing mechanisms all on one machine, i.e., a carrier; a system that may also include a pressurized air source that assists a flow of a fluid; and a system that allows for a continuous flow a substance.

2. Description of the Related Art

Containers are used to hold liquids until it is desired to dispense such liquids. A force is applied to the outside of the container to deform the container and dispense the liquid. However, such deformation of a container to dispense a liquid is random and causes undesired consequences. For example, in a sausage caulking gun or similar operation, a seal between the dispensing components is difficult to maintain and the flexible wall of the container is able to slip between a plate and an inside wall of a vessel the container is within. This condition is often referred to as "blow by" and causes a significant portion of the liquid to be stuck within the blown by portion of the container. This significant portion of the liquid is then unable to be dispensed.

Force generation systems produce a force which acts on a container holding a substance to dispense the substance from the container. Force generation systems need to be able to stop a flow of the substance when desired. Conventional systems have containers, force generation systems, and dispensing portions that do not form integral systems and that are separate and apart from each other.

SUMMARY OF THE INVENTION

The present disclosure provides a variety of dispensing manifolds which are removable connectable to a single deformable container having a single exit portion. The dispensing manifolds of the present disclosure provide a single deformable container having a single exit with one or more outlets from which a fluid can be controllably dispensed.

The present disclosure also provides a single force generation mechanism, a deformable container holding a fluid or substance, and dispensing mechanisms all on one machine, i.e., a carrier. A carrier of the present disclosure conveniently holds the components of a fluid dispensing system of the present disclosure so that a user is able to conveniently apply multiple beads of a substance simultaneously to a substrate. The carrier of the present disclosure allows a user to be able to conveniently and easily maneuver a fluid dispensing system of the present disclosure to apply a single bead or pattern or multiple beads or patterns of a fluid or substance simultaneously to a substrate.

The present disclosure also provides a system that may also include a pressurized air source that assists a flow of a fluid. The present disclosure also provides a system that allows for a continuous flow a substance.

Advantageously, the systems of the present disclosure provide a deformable container and a method of dispensing wherein, during dispensing, an actuation member is continuously free of contact with the fluid or substance within the container and the actuation member only contacts the exterior surface of the deformable container.

In accordance with an embodiment of the present disclosure, a fluid dispensing system includes a carrier movable over a surface; a deformable container having a first end, a second end, and a deformable wall extending therebetween and defining a container interior adapted to hold a fluid, the deformable container disposed on a portion of the carrier, and wherein the deformable container includes a single opening defined by the second end of the deformable container; and a dispensing manifold removably connectable to the second end of the deformable container, the dispensing manifold including a first exit and a second exit; wherein, with the dispensing manifold connected to the second end of the deformable container, the first exit of the dispensing manifold is an outlet for a first bead of the fluid and the second exit of the dispensing manifold is an outlet for a second bead of the fluid, and wherein the first exit and the second exit simultaneously dispense the first bead and the second bead on the surface.

In one configuration, the second end of the deformable container is rigid. In another configuration, the dispensing manifold is connected to the second end of the deformable container via a mechanical connection. In yet another configuration, the deformable container is removably disposable relative to the carrier. In one configuration, the dispensing manifold includes a third exit and a fourth exit, wherein, with the dispensing manifold connected to the second end of the deformable container, the third exit of the dispensing manifold is an outlet for a third bead of the fluid and the fourth exit of the dispensing manifold is an outlet for a fourth bead of the fluid, and wherein the first exit, the second exit, the third exit, and the fourth exit simultaneously dispense the first bead, the second bead, the third bead, and the fourth bead on the surface. In another configuration, the dispensing manifold includes a first tier having a connection portion, a first port, and a second port, the connection portion removably connectable to the second end of the deformable container; and a second tier in fluid communication with the first tier, the second tier having the first exit, the second exit, the third exit, and the fourth exit; wherein the first port and the second port are in fluid communication with the second tier. In yet another configuration, the first bead, the second bead, the third bead, and the fourth bead flow evenly to the first exit, the second exit, the third exit, and the fourth exit. In one configuration, the first port is in fluid communication with the first exit and the second exit. In another configuration, the second port is in fluid communication with the third exit and the fourth exit. In yet another configuration, the dispensing manifold includes a third exit, a fourth exit, and a fifth exit, wherein, with the dispensing manifold connected to the second end of the deformable container, the third exit of the dispensing manifold is an outlet for a third bead of the fluid and the fourth exit of the dispensing manifold is an outlet for a fourth bead of the fluid and the fifth exit of the dispensing manifold is an outlet for a fifth bead of the fluid, and wherein the first exit, the second exit, the third exit, the fourth exit, and the fifth exit simultaneously dispense the first bead, the second bead, the third bead, the fourth bead, and the fifth bead on the surface. In one configuration, the dispensing manifold includes a first tier having a connection portion, a first port, and a second port, the connection portion removably connectable to the second end of the deformable container; a second tier in fluid communication with the first tier, the second tier having a third port, a fourth port, a fifth port, and a sixth port; and a third tier in fluid communication with the second tier, the third tier having the first exit, the second exit, the third exit, the fourth exit, and the fifth exit; wherein the first port and the second port are in fluid communication with the second tier, and wherein the third port, the fourth port, the fifth port, and the sixth port are in fluid communication with the third tier. In another configuration, wherein the first bead, the second bead, the third bead, the fourth bead, and the fifth bead flow evenly to the first exit, the second exit, the third exit, the fourth exit, and the fifth exit. In yet another configuration, the third port is located between the first exit and the second exit. In one configuration, the fourth port is located between the second exit and the third exit. In another configuration, the fifth port is located between the third exit and the fourth exit. In yet another configuration, the sixth port is located between the fourth exit and the fifth exit. In one configuration, the fluid dispensing system includes an actuation member movably positionable relative to the deformable container, wherein, with the deformable container disposed on the carrier, the actuation member is movable between a first position in which the actuation member is spaced from the deformable container and a second position in which the actuation member contacts a portion of the deformable container. In another configuration, as the actuation member moves from the first position towards the second position, the actuation member deforms the deformable container thereby expelling the fluid from the single opening of the deformable container to the dispensing manifold. In yet another configuration, as the actuation member deforms the deformable container thereby expelling the fluid from the single opening of the deformable container to the dispensing manifold, the fluid flows evenly to and flows evenly out the first exit and the second exit. In one configuration, the actuation member is continuously free of contact with the fluid. In another configuration, the actuation member only contacts an exterior surface of the deformable container.

In accordance with another embodiment of the present disclosure, a fluid dispensing system includes a carrier movable over a surface; a deformable container having a first end, a second end, and a deformable wall extending therebetween and defining a container interior adapted to hold a fluid, the deformable container disposed on a portion of the carrier, and wherein the deformable container includes a single opening defined by the second end of the deformable container; a dispensing manifold including a connection portion, a first exit, and a second exit; and a hose having a first hose end and a second hose end, the first hose end removably connectable to the second end of the deformable container and the second hose end removably connectable to the connection portion of the dispensing manifold; wherein, with the dispensing manifold in fluid communication with the deformable container via the hose, the first exit of the dispensing manifold is an outlet for a first bead of the fluid and the second exit of the dispensing manifold is an outlet for a second bead of the fluid, and wherein the first exit and the second exit simultaneously dispense the first bead and the second bead on the surface.

In accordance with another embodiment of the present disclosure, a fluid dispensing system includes a carrier movable over a surface; a deformable container disposed on a first portion of the carrier, the deformable container having a first end, a second end, and a deformable wall extending therebetween and defining a container interior adapted to hold a fluid; and a force generation system disposed on a second portion of the carrier in communication with the deformable container, the force generation system transitionable between a first setting in which the deformable container holds the fluid and a second setting in which the force generation system actuates an actuator which exerts a force deforming the deformable container thereby expelling the fluid from the deformable container.

In one configuration, the system includes a hose having a first hose end and a second hose end, the first hose end removably connectable to the second end of the deformable container. In another configuration, the system includes a dispensing manifold removably connectable to the second end of the deformable container, the dispensing manifold including a first exit and a second exit; wherein, with the dispensing manifold connected to the second end of the deformable container, the first exit of the dispensing manifold is an outlet for a first bead of the fluid and the second exit of the dispensing manifold is an outlet for a second bead of the fluid, and wherein the first exit and the second exit simultaneously dispense the first bead and the second bead on the surface. In yet another configuration, the dispensing manifold includes a third exit and a fourth exit, wherein, with the dispensing manifold connected to the second end of the deformable container, the third exit of the dispensing manifold is an outlet for a third bead of the fluid and the fourth exit of the dispensing manifold is an outlet for a fourth bead of the fluid, and wherein the first exit, the second exit, the third exit, and the fourth exit simultaneously dispense the first bead, the second bead, the third bead, and the fourth bead on the surface. In one configuration, the force generation system comprises a single hydraulic pump. In another configuration, the second end of the deformable container is rigid. In yet another configuration, the second end of the deformable container includes a threaded portion. In one configuration, the system includes a second deformable container disposed on a third portion of the carrier, the second deformable container having a second deformable container first end, a second deformable container second end, and a second container deformable wall extending therebetween and defining a second container interior adapted to hold a second fluid, wherein the force generation system is in communication with the second deformable container, the force generation system transitionable between the first setting in which the second deformable container holds the second fluid and the second setting in which the force generation system actuates a second actuator which exerts a force deforming the second deformable container thereby expelling the second fluid from the second deformable container. In another configuration, the system includes a first receiving portion having a first end and a second end, the first end having a first inlet and a second inlet, and the second end having an outlet; a first line connecting the second end of the deformable container to the first inlet of the first receiving portion, wherein the first receiving portion receives the fluid via the first line; and a second line connecting the second deformable container second end to the second inlet of the first receiving portion, wherein the first receiving portion receives the second fluid via the second line. In one configuration, the first receiving portion includes a first channel defining a first channel longitudinal axis that is linear and a second channel defining a second channel longitudinal axis that is linear. In another configuration, the first receiving portion is a vee manifold. In yet another configuration, the system includes a mixing nozzle removably connected to the outlet of the first receiving portion, wherein the first channel and the second channel of the first receiving portion flow into the mixing nozzle and the mixing nozzle mixes the fluid and the second fluid to create a first mixed fluid. In one configuration, the system includes a second deformable container disposed on a third portion of the carrier, the second deformable container having a second deformable container first end, a second deformable container second end, and a second container deformable wall extending therebetween and defining a second container interior adapted to hold a second fluid, and wherein the force generation system is in selective communication with both the deformable container and the second deformable container, wherein the force generation system selectively actuates the actuator which exerts a force deforming one of the deformable container and the second deformable container. In another configuration, the system includes a pressurized air source that assists a flow of the fluid.

In accordance with another embodiment of the present disclosure, a fluid dispensing system includes a first carrier; a first deformable container disposed on a first portion of the first carrier, the first deformable container having a first end, a second end, and a deformable wall extending therebetween and defining a first container interior adapted to hold a first fluid; a first hose having a first hose end and a second hose end, the first hose end removably connectable to the second end of the first deformable container; a second carrier; a second deformable container disposed on a first portion of the second carrier, the second deformable container having a third end, a fourth end, and a second container deformable wall extending therebetween and defining a second container interior adapted to hold a second fluid; a second hose having a third hose end and a fourth hose end, the third hose end removably connectable to the fourth end of the second deformable container; a valve system transitionable between a first position and a second position; and a dispensing hose having an inlet and an outlet, the inlet of the dispensing hose is in communication with the first hose and the second hose via the valve system, wherein, with the valve system in the first position, the first hose is in fluid communication with the dispensing hose and the second hose is not in fluid communication with the dispensing hose, and wherein, with the valve system in the second position, the second hose is in fluid communication with the dispensing hose and the first hose is not in fluid communication with the dispensing hose.

In one configuration, the first carrier is movable over a surface. In another configuration, the second carrier is movable over a surface. In yet another configuration, the first carrier is separate from the second carrier. In one configuration, the system includes a first force generation system disposed on a second portion of the first carrier in communication with the first deformable container, the first force generation system transitionable between a first setting in which the first deformable container holds the first fluid and a second setting in which the first force generation system actuates an actuator which exerts a force deforming the first deformable container thereby expelling the first fluid from the first deformable container. In another configuration, the system includes a second force generation system disposed on a second portion of the second carrier in communication with the second deformable container, the second force generation system transitionable between a third setting in which the second deformable container holds the second fluid and a fourth setting in which the second force generation system actuates a second actuator which exerts a force deforming the second deformable container thereby expelling the second fluid from the second deformable container. In yet another configuration, the first fluid is a same fluid as the second fluid. In one configuration, the system includes a third deformable container disposed on a third portion of the first carrier, the third deformable container having a first end, a second end, and a third container deformable wall extending therebetween and defining a third container interior adapted to hold a third fluid. In another configuration, the system includes a third hose having a fifth hose end and a sixth hose end, the fifth hose end removably connectable to the second end of the third deformable container. In yet another configuration, the system includes a fourth deformable container disposed on a third portion of the second carrier, the fourth deformable container having a third end, a fourth end, and a fourth container deformable wall extending therebetween and defining a fourth container interior adapted to hold a fourth fluid. In one configuration, the system includes a fourth hose having a seventh hose end and an eighth hose end, the seventh hose end removably connectable to the fourth end of the fourth deformable container. In another configuration, the system includes a second valve system transitionable between a first position and a second position; and a second dispensing hose having a second inlet and a second outlet, the second inlet of the second dispensing hose is in communication with the third hose and the fourth hose via the second valve system, wherein, with the second valve system in the first position, the third hose is in fluid communication with the second dispensing hose and the fourth hose is not in fluid communication with the second dispensing hose, and wherein, with the second valve system in the second position, the fourth hose is in fluid communication with the second dispensing hose and the third hose is not in fluid communication with the second dispensing hose. In yet another configuration, the first force generation system is in communication with the third deformable container, the first force generation system transitionable between the first setting in which the third deformable container holds the third fluid and the second setting in which the first force generation system actuates a third actuator which exerts a force deforming the third deformable container thereby expelling the third fluid from the third deformable container. In one configuration, the second force generation system is in communication with the fourth deformable container, the second force generation system transitionable between the third setting in which the fourth deformable container holds the fourth fluid and the fourth setting in which the second force generation system actuates a fourth actuator which exerts a force deforming the fourth deformable container thereby expelling the fourth fluid from the fourth deformable container. In another configuration, the third fluid is a same fluid as the fourth fluid. In yet another configuration, the third fluid and the fourth fluid are a different fluid than the first fluid and the second fluid. In one configuration, the fluid dispensing system allows for a first continuous flow of one of the first fluid and the second fluid to the dispensing hose. In another configuration, the fluid dispensing system allows for a second continuous flow of one of the third fluid and the fourth fluid to the second dispensing hose. In yet another configuration, the system includes a pressurized air source that assists a flow of the first fluid. In one configuration, the system includes a pressurized air source that assists a flow of the second fluid. In another configuration, the system includes a pressurized air source that assists a flow of the third fluid. In yet another configuration, the system includes a pressurized air source that assists a flow of the fourth fluid.

In accordance with an embodiment of the present disclosure, a fluid dispensing system includes a carrier movable over a surface; a deformable container having a first end, a second end, and a deformable wall extending therebetween and defining a container interior adapted to hold a fluid, the deformable container disposed on a portion of the carrier, and wherein the deformable container includes a single opening defined by the second end of the deformable container; and a dispensing manifold removably connectable to the second end of the deformable container, the dispensing manifold including a first exit; wherein, with the dispensing manifold connected to the second end of the deformable container, the first exit of the dispensing manifold is an outlet for a first bead of the fluid.

In one configuration, the second end of the deformable container is rigid. In another configuration, the dispensing manifold is connected to the second end of the deformable container via a mechanical connection. In yet another configuration, the deformable container is removably disposable relative to the carrier. In one configuration, the dispensing manifold includes a second exit, wherein, with the dispensing manifold connected to the second end of the deformable container, the second exit of the dispensing manifold is an outlet for a second bead of the fluid, and wherein the first exit and the second exit simultaneously dispense the first bead and the second bead on the surface. In another configuration, the dispensing manifold includes a third exit and a fourth exit, wherein, with the dispensing manifold connected to the second end of the deformable container, the third exit of the dispensing manifold is an outlet for a third bead of the fluid and the fourth exit of the dispensing manifold is an outlet for a fourth bead of the fluid, and wherein the first exit, the second exit, the third exit, and the fourth exit simultaneously dispense the first bead, the second bead, the third bead, and the fourth bead on the surface. In yet another configuration, the dispensing manifold includes a first tier having a connection portion, a first port, and a second port, the connection portion removably connectable to the second end of the deformable container; and a second tier in fluid communication with the first tier, the second tier having the first exit, the second exit, the third exit, and the fourth exit; wherein the first port and the second port are in fluid communication with the second tier. In one configuration, the first bead, the second bead, the third bead, and the fourth bead flow evenly to the first exit, the second exit, the third exit, and the fourth exit. In another configuration, the first port is in fluid communication with the first exit and the second exit. In yet another configuration, the second port is in fluid communication with the third exit and the fourth exit. In one configuration, the system includes an actuation member movably positionable relative to the deformable container, wherein, with the deformable container disposed on the carrier, the actuation member is movable between a first position in which the actuation member is spaced from the deformable container and a second position in which the actuation member contacts a portion of the deformable container. In another configuration, as the actuation member moves from the first position towards the second position, the actuation member deforms the deformable container thereby expelling the fluid from the single opening of the deformable container to the dispensing manifold. In yet another configuration, as the actuation member deforms the deformable container thereby expelling the fluid from the single opening of the deformable container to the dispensing manifold, the fluid flows evenly to and flows evenly out the first exit and the second exit. In one configuration, the actuation member is continuously free of contact with the fluid. In another configuration, the actuation member only contacts an exterior surface of the deformable container.

In accordance with another embodiment of the present disclosure, a fluid dispensing system includes a carrier movable over a surface; a deformable container having a first end, a second end, and a deformable wall extending therebetween and defining a container interior adapted to hold a fluid, the deformable container disposed on a portion of the carrier, and wherein the deformable container includes a single opening defined by the second end of the deformable container; a dispensing manifold including a connection portion and a first exit; and a hose having a first hose end and a second hose end, the first hose end removably connectable to the second end of the deformable container and the second hose end removably connectable to the connection portion of the dispensing manifold; wherein, with the dispensing manifold in fluid communication with the deformable container via the hose, the first exit of the dispensing manifold is an outlet for a first bead of the fluid.

BRIEF DESCRIPTION OF THE DRAWINGS

The above-mentioned and other features and advantages of this disclosure, and the manner of attaining them, will become more apparent and the disclosure itself will be better understood by reference to the following descriptions of embodiments of the disclosure taken in conjunction with the accompanying drawings, wherein.

Corresponding reference characters indicate corresponding parts throughout the several views. The exemplifications set out herein illustrate exemplary embodiments of the disclosure, and such exemplifications are not to be construed as limiting the scope of the disclosure in any manner.

DETAILED DESCRIPTION

Figure 1:
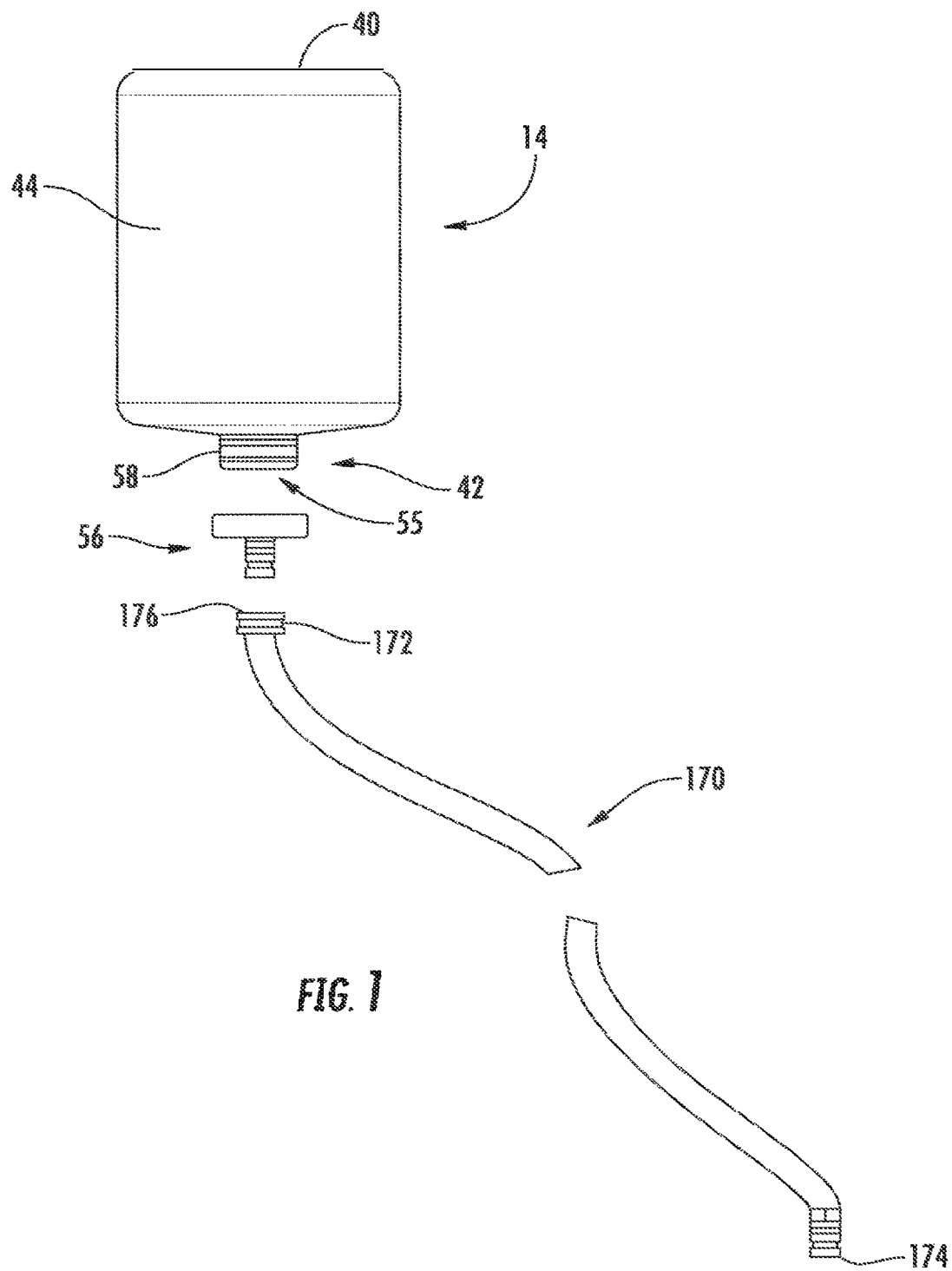
FIG. 1 is an exploded, perspective view of a fluid dispensing system in accordance with an embodiment of the present invention.

The following description is provided to enable those skilled in the art to make and use the described embodiments contemplated for carrying out the invention. Various modifications, equivalents, variations, and alternatives, however, will remain readily apparent to those skilled in the art. Any and all such modifications, variations, equivalents, and alternatives are intended to fall within the spirit and scope of the present invention.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting.

In the following discussion, "distal" refers to a direction generally toward a portion of a substance dispensing system in which a substance is expelled from a container, and "proximal" refers to the opposite direction of distal, i.e., away from the portion of the substance dispensing system in which a substance is expelled from a container. For purposes of this disclosure, the above-mentioned references are used in the description of the components of a substance dispensing system in accordance with the present disclosure.

The present disclosure provides a variety of dispensing manifolds which are removable connectable to a single container having a single exit portion. The dispensing manifolds of the present disclosure provide a single container having a single exit with one or more outlets from which a fluid can be controllably dispensed.

FIGS. 1-16 illustrate exemplary embodiments of a fluid or substance dispensing system 10 of the present disclosure. Referring to FIGS. 1-16, fluid dispensing system 10 includes confinement structure 12, deformable container 14, actuation member 16, a carrier 17, and a dispensing manifold 19 as will be described in more detail below.

In the exemplary embodiment of FIGS. 43-51, confinement structure 12, container 14, and actuation member 16 are illustrated as elongated cylindrical members, though it is contemplated that other shapes and sizes of these components may be used. For example, confinement structure 12, container 14, and actuation member 16 can have other multi-sided polygon cross-sectional shapes, such as square, rectangular, or triangular cross-sectional shapes. Container 12 may also be available in a variety of shapes and sizes to accommodate a variety of substances.

Figure 43:
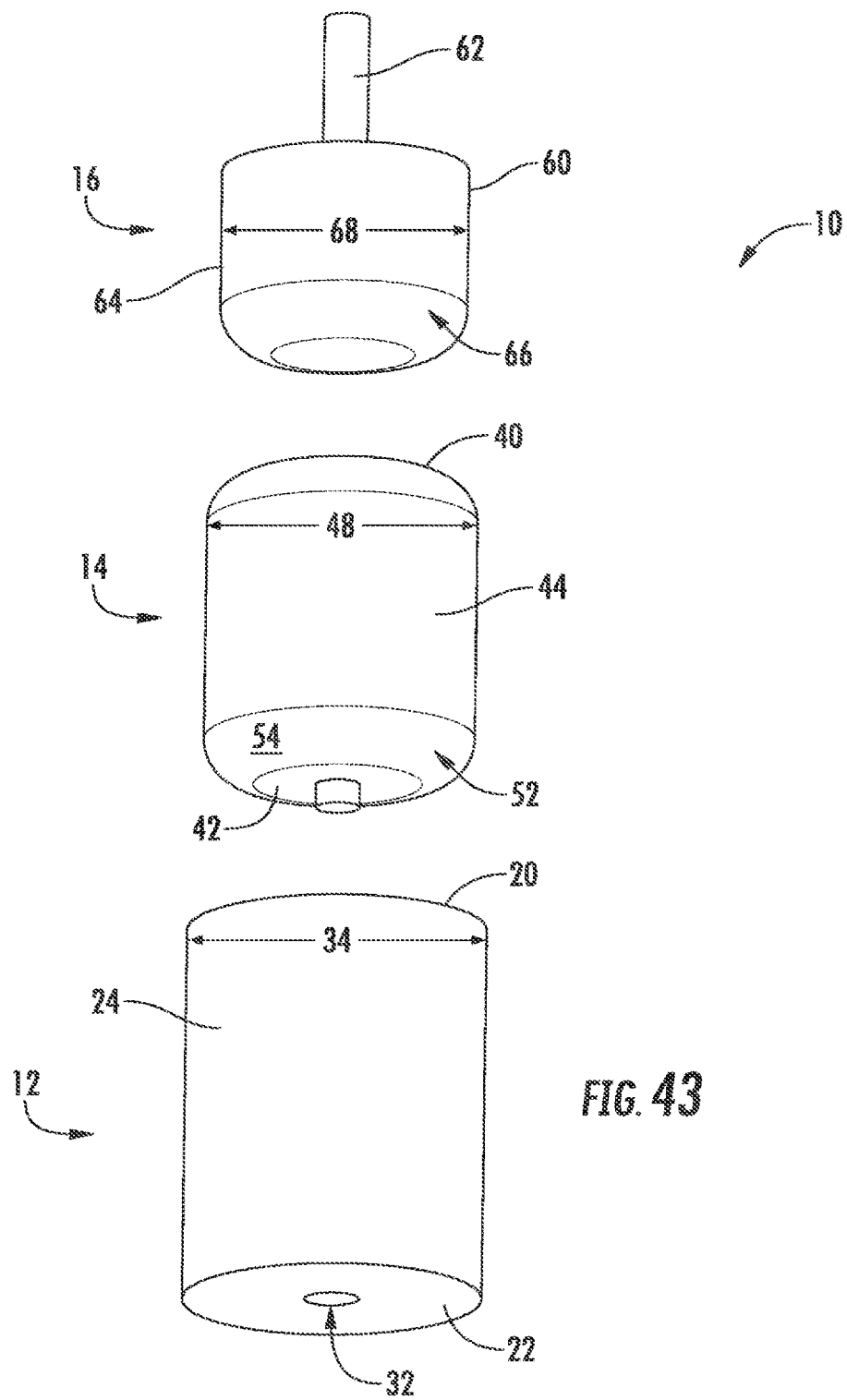
FIG. 43 is an exploded, perspective view of a fluid dispensing system in accordance with an embodiment of the present invention.

Referring to FIGS. 43-51, confinement structure 12 includes proximal end 20, distal end 22, and sidewall 24 extending between proximal end 20 and distal end 22. Referring to FIGS. 43-51, sidewall 24 of confinement structure 12 defines an interior 26 sized and shaped to receive container 14 and actuation member 16. Referring to FIGS. 43-51, distal end 22 of confinement structure 12 defines an interior profile 28. For example, the interior wall surface 30 of distal end 22 of confinement structure 12 defines interior profile 28 of confinement structure 12. In one embodiment, proximal end 20 of confinement structure 12 includes an open end and distal end 22 of confinement structure 12 includes an exit portion or exit aperture 32. Referring to FIG. 43, proximal end 20 of confinement structure 12 defines a confinement structure diameter 34. In one embodiment, confinement structure diameter 34 is defined by interior wall surface 30 of confinement structure 12. In this manner, proximal end 20 of confinement structure 12 defines an interior confinement structure diameter 34 as shown in FIG. 43.

Referring to FIGS. 43-51, confinement structure 12 is configured with actuation member 16 to provide a substance dispensing system 10 that allows for controllable deformation of a container 14 such that a portion of the container 14 acts as a wiping means to empty a substance from the container 14. Confinement structure 12 has a sufficient rigidity to maintain a container 14 therein during controllable deformation of the container 14. Confinement structure 12 is capable of receiving a variety of different containers 14 containing a variety of substances.

Figure 5:
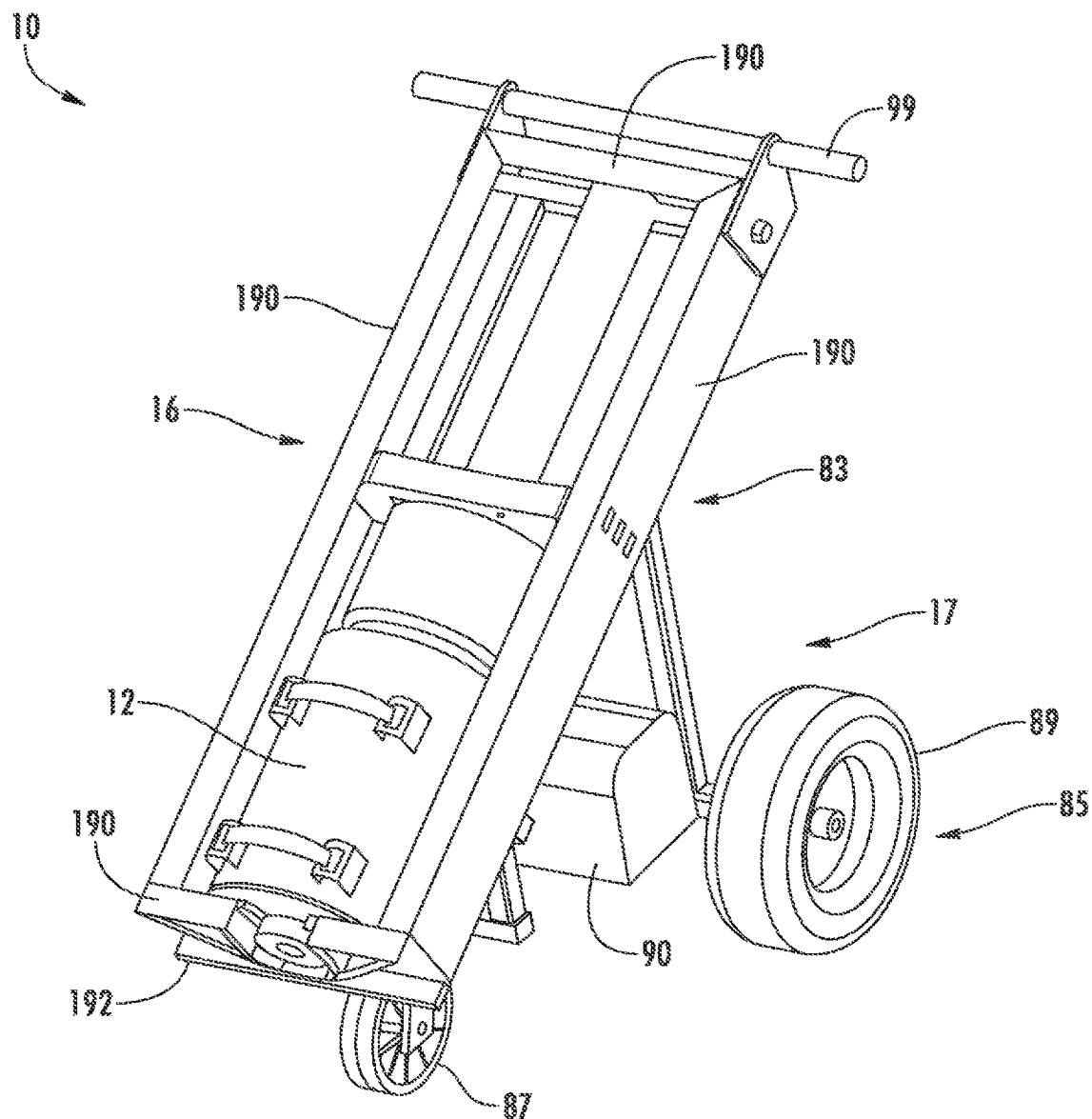
FIG. 5 is a perspective view of an integral fluid dispensing system with one container in accordance with another embodiment of the present invention.
Figure 6:
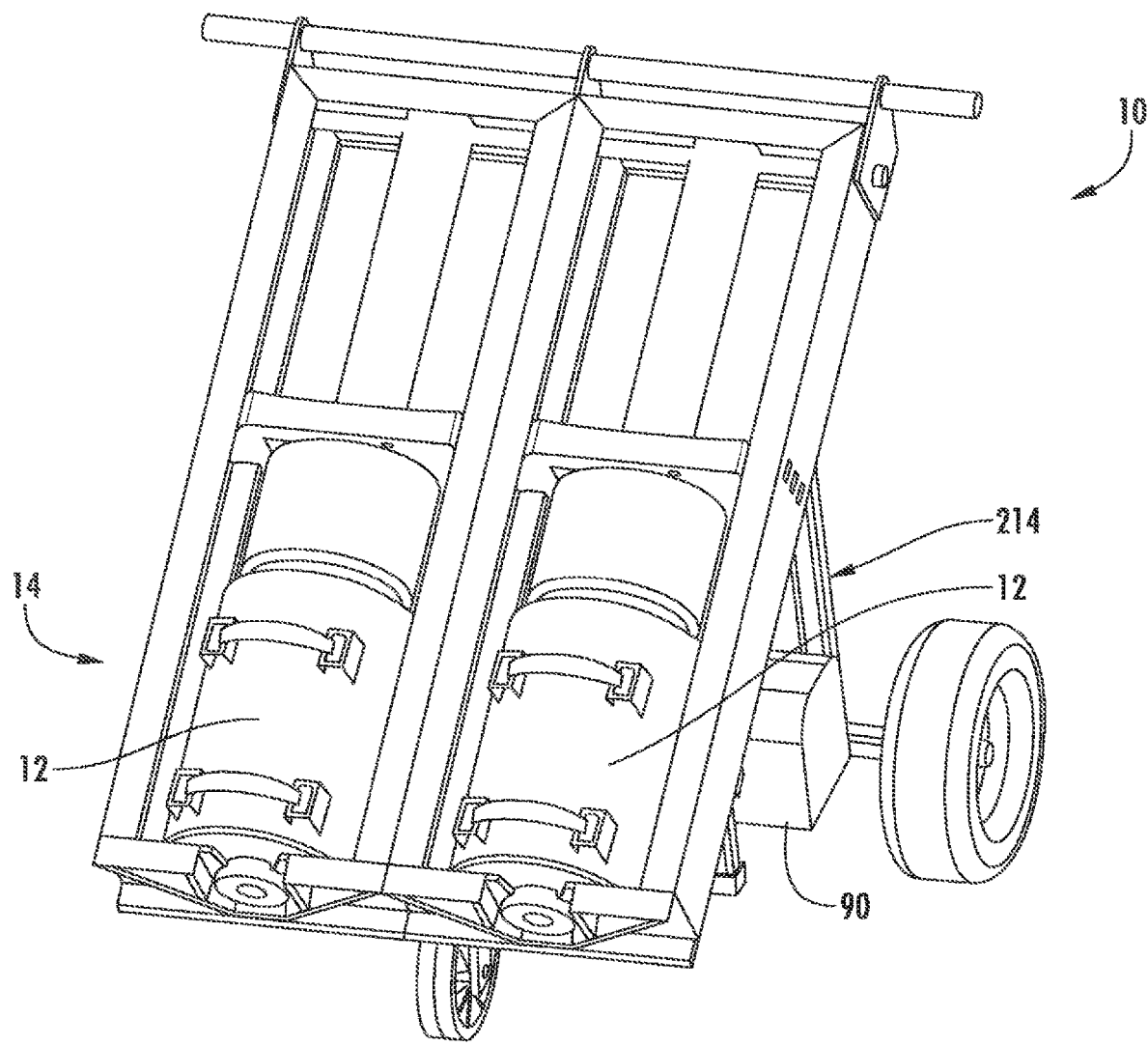
FIG. 6 is a perspective view of an integral fluid dispensing system with two containers in accordance with another embodiment of the present invention.
Figure 7:
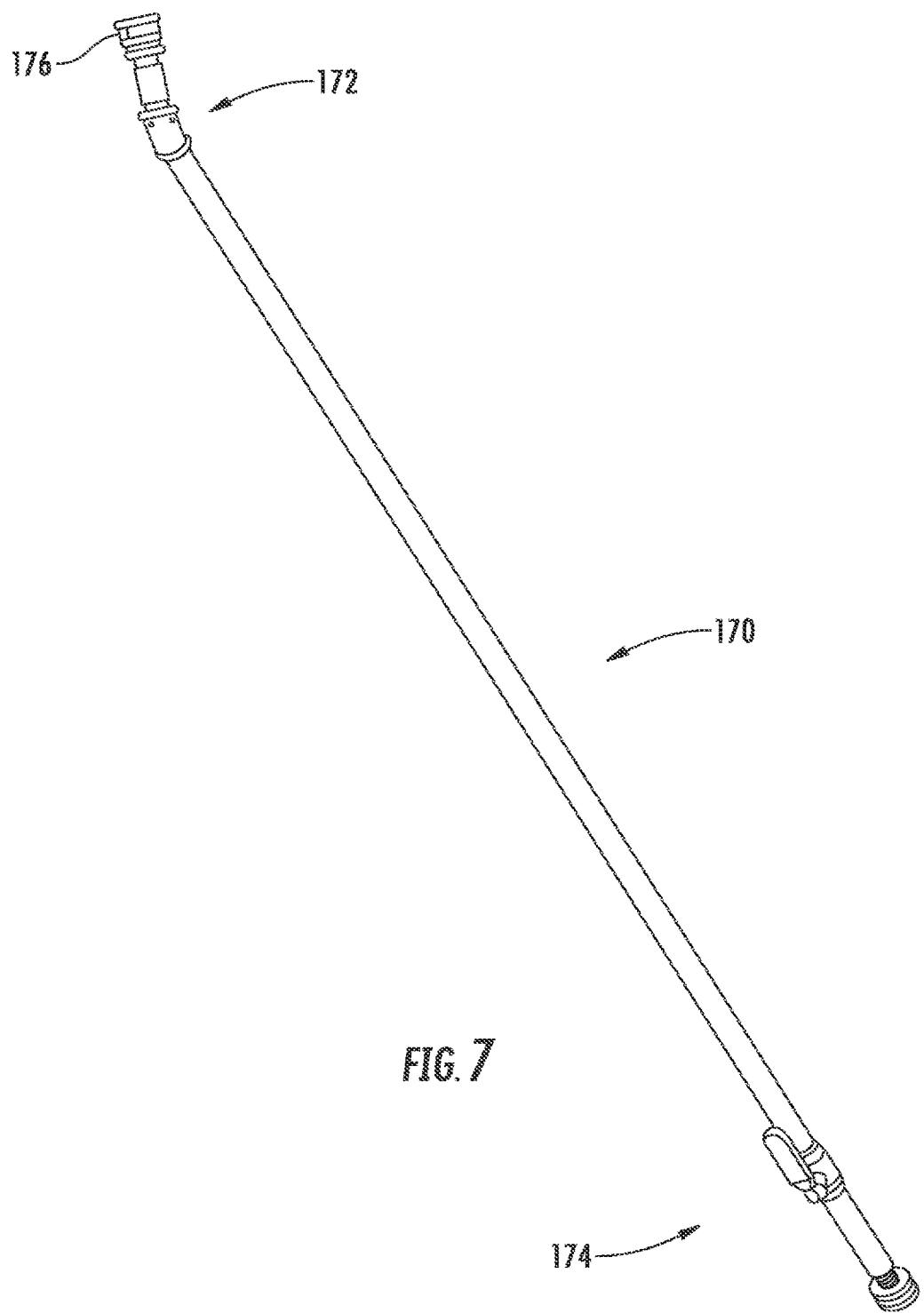
FIG. 7 is a perspective view of a dispensing portion in accordance with an embodiment of the present invention.
Figure 8:
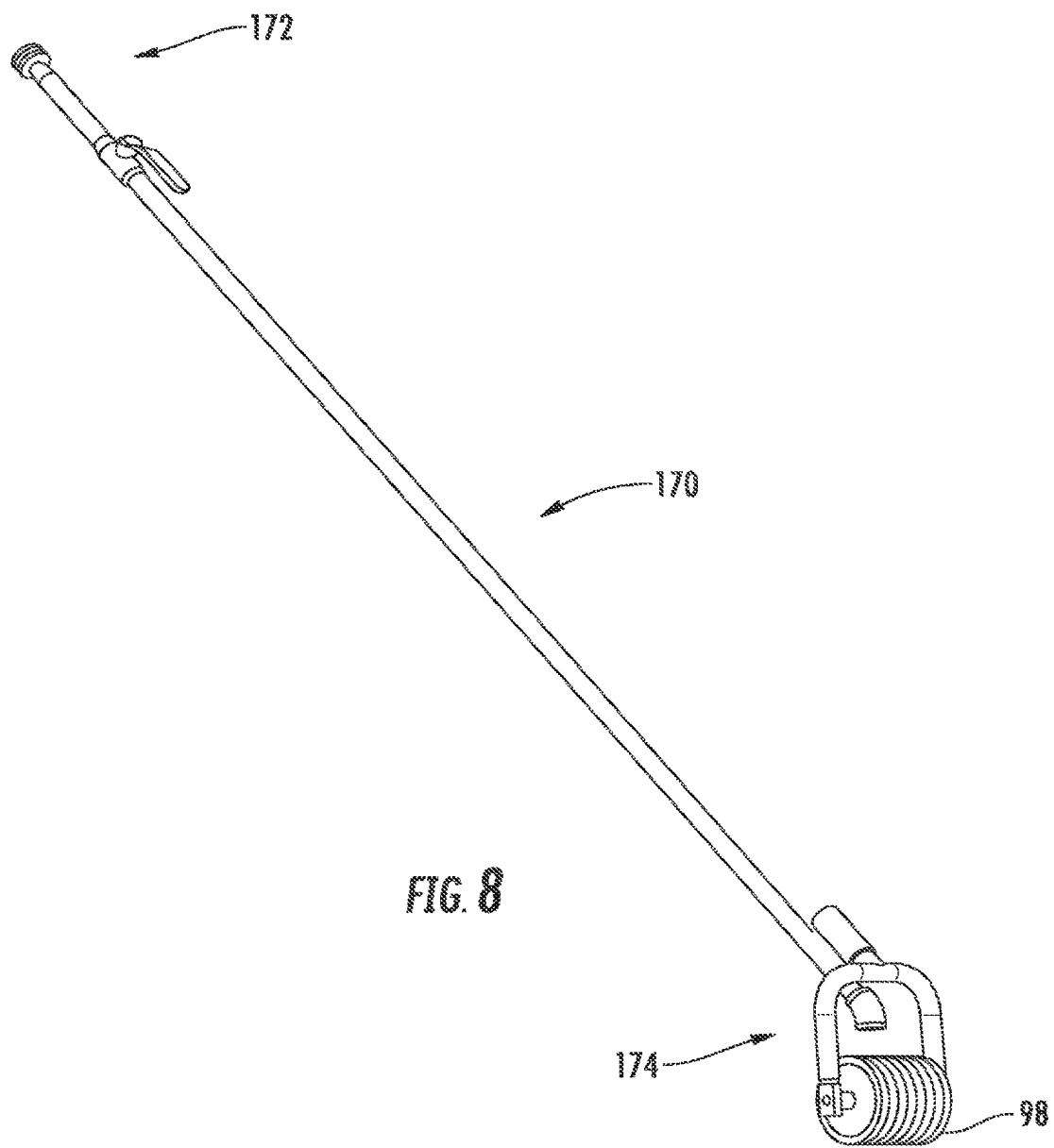
FIG. 8 is a perspective view of a dispensing portion in accordance with another embodiment of the present invention.
Figure 9:
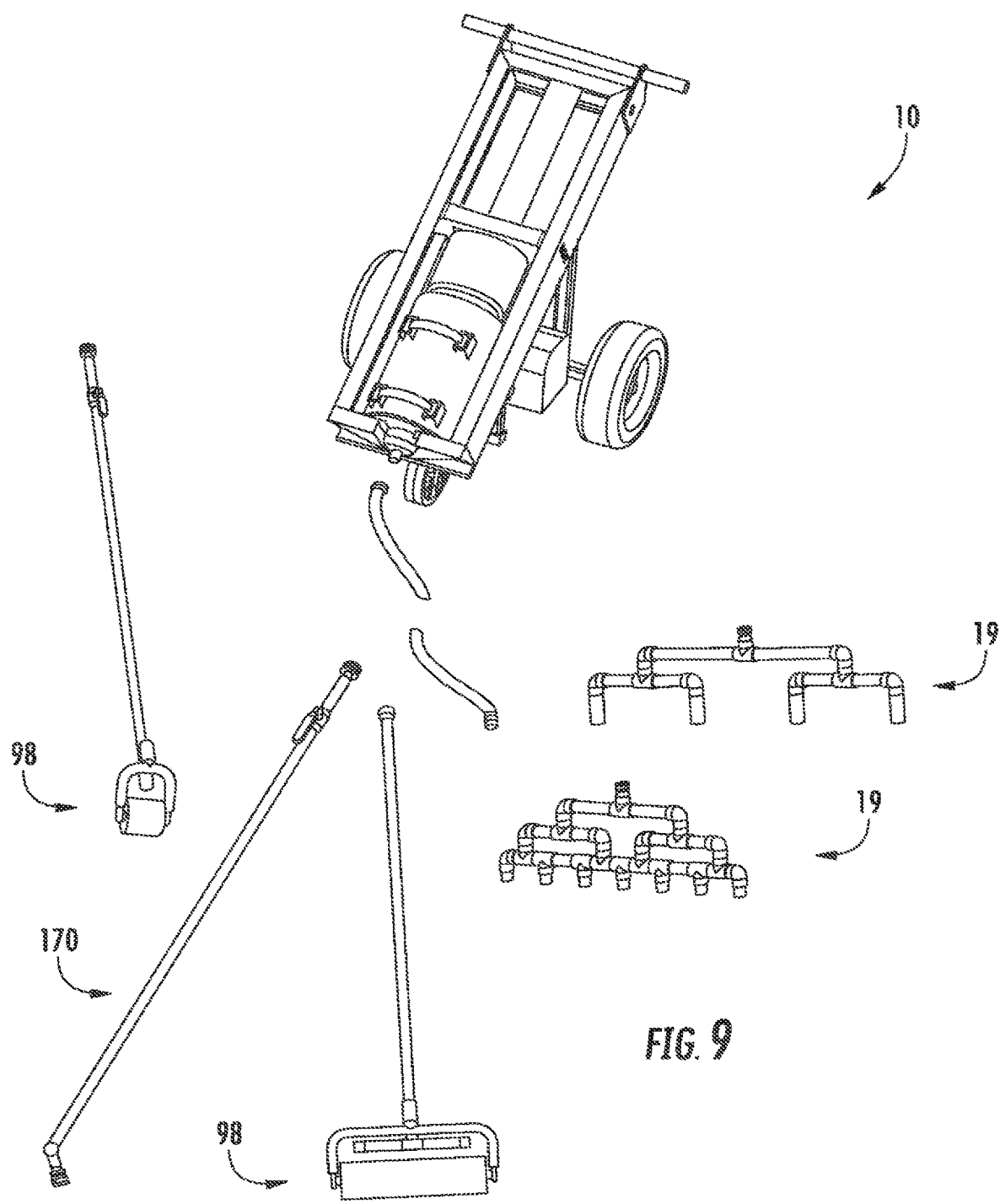
FIG. 9 is an exploded, perspective view of a fluid dispensing system in accordance with an embodiment of the present invention.
Figure 10:
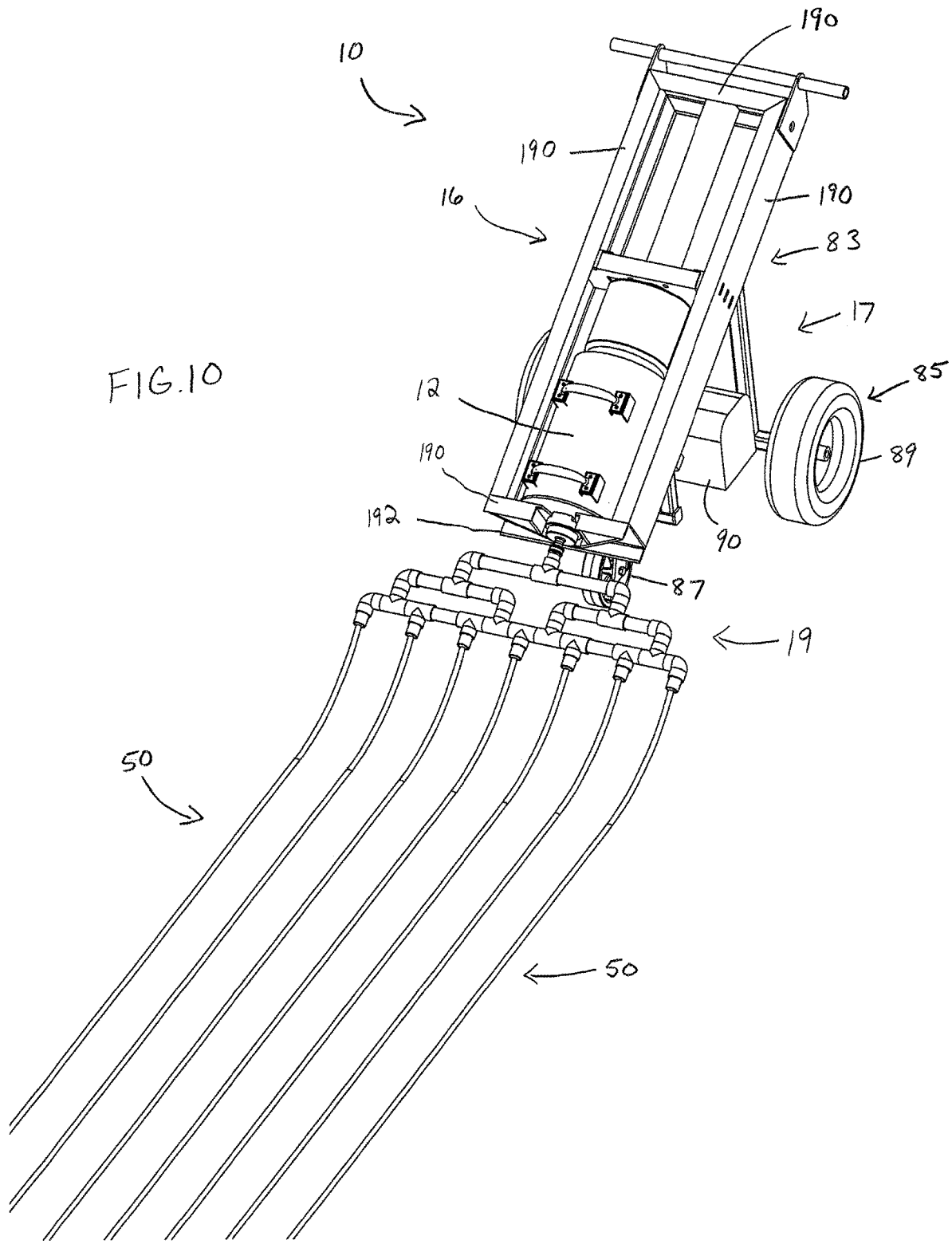
FIG. 10 is a perspective view of an integral fluid dispensing system with a dispensing manifold in accordance with another embodiment of the present invention.
Figure 11:
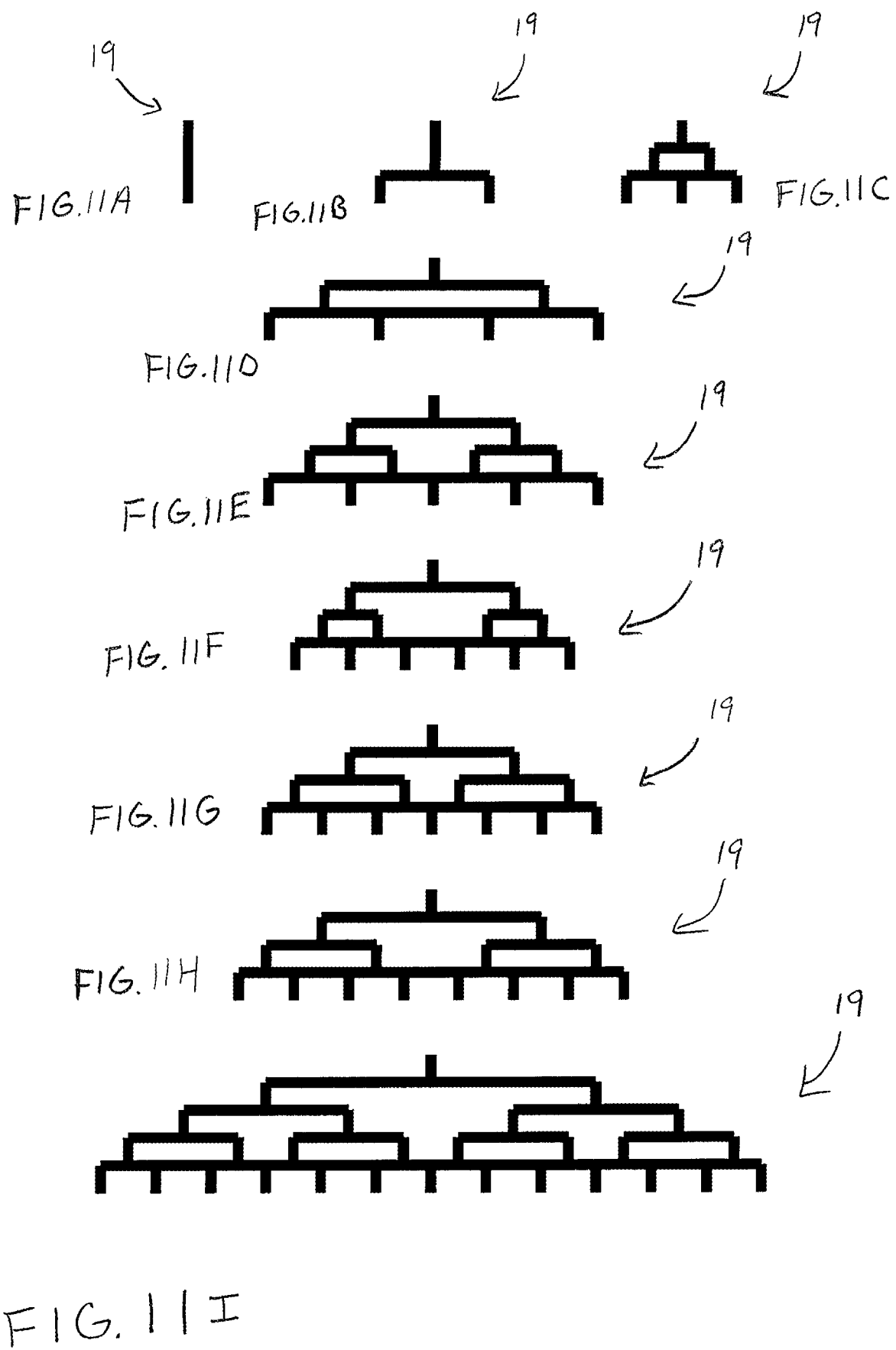
FIG. 11A is a perspective view of a dispensing manifold in accordance with an embodiment of the present invention.
FIG. 11B is a perspective view of a dispensing manifold in accordance with an embodiment of the present invention.
FIG. 11C is a perspective view of a dispensing manifold in accordance with an embodiment of the present invention.
FIG. 11D is a perspective view of a dispensing manifold in accordance with an embodiment of the present invention.
FIG. 11E is a perspective view of a dispensing manifold in accordance with an embodiment of the present invention.
FIG. 11F is a perspective view of a dispensing manifold in accordance with an embodiment of the present invention.
FIG. 11G is a perspective view of a dispensing manifold in accordance with an embodiment of the present invention.
FIG. 11H is a perspective view of a dispensing manifold in accordance with an embodiment of the present invention.
FIG. 11I is a perspective view of a dispensing manifold in accordance with an embodiment of the present invention.
Figure 12:
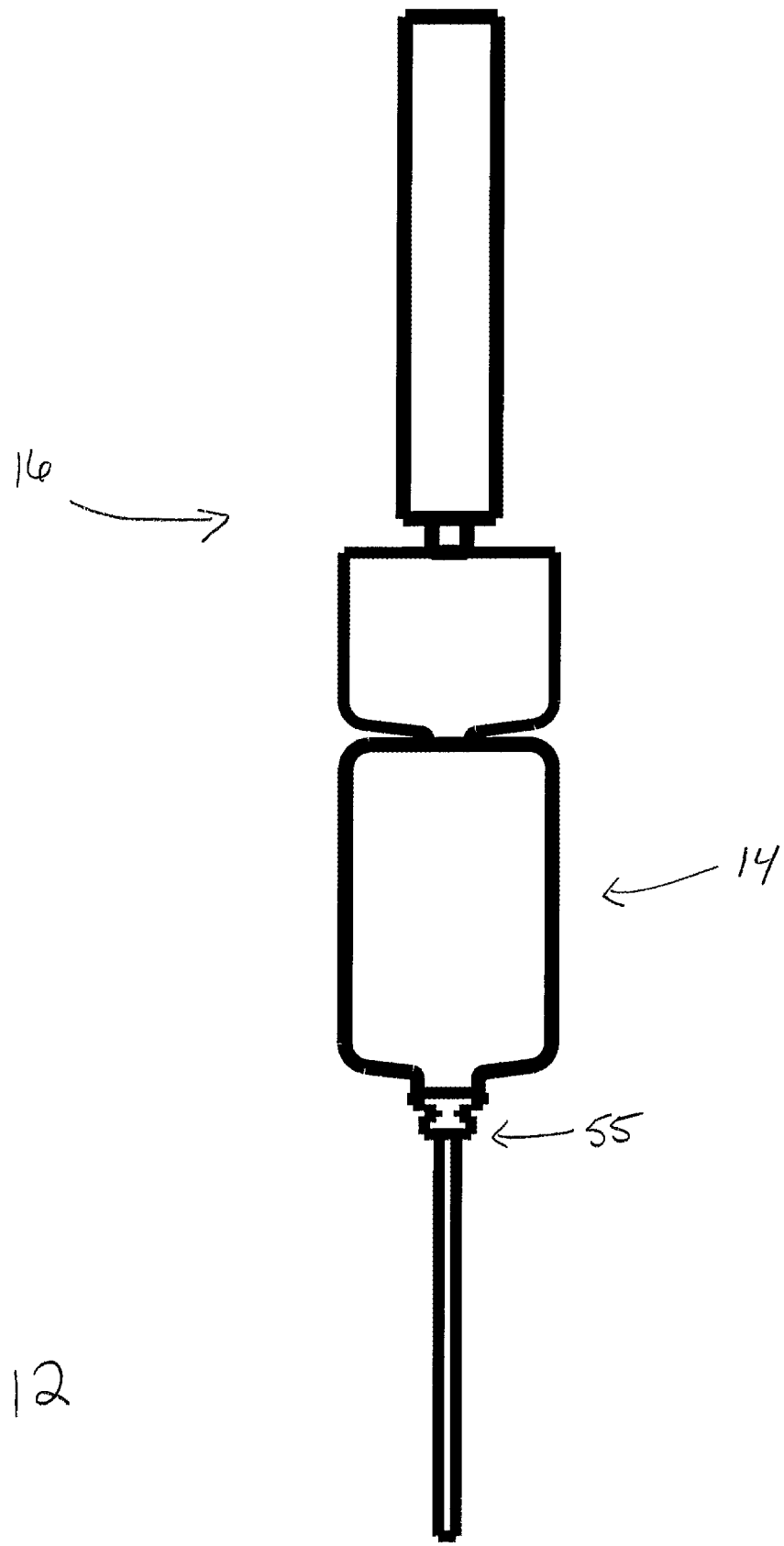
FIG. 12 is a perspective view of a fluid dispensing system in accordance with an embodiment of the present invention.

Referring to FIGS. 5, 6, and 10, in some embodiments, confinement structure 12 includes handles 35 which allow a user to more easily maneuver the confinement structure 12 and to properly position the confinement structure 12 onto the carrier 17.

Referring to FIGS. 1, 5, 9, 10, 12, 13, and FIGS. 43-51, a container 14 of the present disclosure includes first end 40, second end 42, and a deformable wall 44 extending between first end 40 and second end 42. Referring to FIGS. 43-51, deformable wall 44 of container 14 defines a container interior 46 adapted to hold a fluid or substance 50. Container 14 is adapted to hold a variety of different fluids or substances. For example, container 14 is adapted to hold various adhesives, coatings, putties, and caulkings for a variety of different applications. Some one part and multiple component products which could be used with the present disclosure include noiseproofing compounds, glazing adhesives and sealants, chinking compounds, solar glass sealants, self-leveling sealants, composite construction adhesives coatings and compounds, flooring adhesives, roofing adhesives, roof coatings, masonry tuck pointing, mechanical equipment adhesives, architectural metal sealant, marine adhesives and coatings, waterproofing compounds, siding sealants, fabric adhesives, leather adhesives, vinyl adhesives, wood construction adhesives, wallpaper adhesives, firestopping adhesives and caulkings, silicone, grease, architectural railing systems, guardrail systems, automotive sealants and adhesives, manufacturing processes, door and window adhesives and sealants, EIFS adhesives and sealants, flooring sealants, truck bed liners, epoxies, rust proofing, para-methoxy-n-methylamphetamine (PMMA), acrylic caulkings, and polyurethane foam insulation. It is also contemplated that other substances such as foodstuffs could be used with the present disclosure.

Container 14 is sized and shaped to be positionable within interior 26 of confinement structure 12 as shown in FIGS. 43-51. Referring to FIG. 43, first end 40 of container 14 defines a container diameter 48. Container 14 has a tear resistance sufficient to withstand tearing during a controlled deformation process.

Referring to FIGS. 43-51, second end 42 of container 14 defines a container profile 52. For example, the container wall surface 54 of second end 42 of container 14 defines container profile 52 of container 14. Referring to FIG. 43, in one embodiment, the container profile 52 of container 14 may be shaped to substantially correspond to interior profile 28 of confinement structure 12 with container 14 in an initial or undeformed configuration. However, in alternative embodiments, the container profile 52 of container 14 may be configured in a different shape than the interior profile 28 of confinement structure 12 with container 14 in an initial or undeformed configuration. In such an embodiment, with container 14 positioned within confinement structure 12, the walls of confinement structure 12 control the shape and deformation of container 14 because of the rigidity of the walls of confinement structure 12. For example, referring to FIGS. 43-51, confinement structure 12 controls and maintains container 14 such that the shape of container profile 52 substantially corresponds to the interior profile 28 of confinement structure 12 during a controlled deformation process.

Referring to FIG. 1, in one embodiment, the container 14 includes a dispensing cap 56 that is removably connectable to the second end 42 of the container 14 via a mechanical connection. For example, the dispensing cap 56 and the second end 42 of the container 14 may be connected via a threaded connection, a quick connect coupling, or other mechanical connection mechanism. In other embodiments, the dispensing cap 56 and the second end 42 of the container 14 may be connected via other types of connection mechanisms. Referring to FIG. 1, in one embodiment, the second end 42 of the container 14 includes threaded portion 58.

Referring to FIGS. 43-51, actuation member 16 includes head portion 60 and shaft portion 62. Actuation member 16 may be slidably or movably positionable within confinement structure 12. Head portion 60 of actuation member 16 is sized and shaped to contact first end 40 of container 14 to deform container 14 during a controlled deformation process.

Shaft portion 62 of actuation member 16 is adapted to be placed in communication with a drive system for advancing actuation member 16 within confinement structure 12 between a first position (FIG. 44) in which actuation member 16 is adjacent proximal end 20 of confinement structure 12 and a second position (FIGS. 49 and 50) in which actuation member 16 is adjacent distal end 22 of confinement structure 12. In this manner, with container 14 positioned within confinement structure 12, as actuation member 16 moves from the first position towards the second position, actuation member 16 deforms container 14 thereby expelling substance 50 from container 14. In one embodiment, the drive system may be a hydraulic drive system including a hydraulic cylinder in communication with shaft portion 62 of actuation member 16. However, it is envisioned that other drive systems may be used. For example, the drive system could include other mechanical and electrical drive systems. In one embodiment, a drive system of substance dispensing system 10 could be part of a hydraulic drive system in accordance with the hydraulic drive system described in the U.S. patent application Ser. No. 13/837,504, filed Mar. 15, 2013, entitled "Substance Dispensing System", the entire disclosure of which is hereby expressly incorporated herein by reference.

Head portion 60 of actuation member 16 includes exterior wall 64. Referring to FIGS. 43-51, exterior wall 64 of actuation member 16 defines an exterior profile 66. In one embodiment, exterior profile 66 of actuation member 16 is shaped to substantially correspond to interior profile 28 of confinement structure 12. In this manner, actuation member 16 and confinement structure 12 together allow for substance 50 to be completely expelled from container 14 with actuation member 16 in the second position as shown in FIG. 50, i.e., substance 50 is expelled from container 14 such that no significant portion of substance 50 remains within container 14 and is not expelled from container 14. Additionally, actuation member 16 is configured with confinement structure 12 to provide a substance dispensing system 10 that allows for controllable deformation of a container 14 such that a portion of the container 14 acts as a wiping means to empty a substance from the container 14 as described in more detail in U.S. patent application Ser. No. 13/834,921, filed Mar. 15, 2013, entitled "Container and Substance Dispensing System", the entire disclosure of which is hereby expressly incorporated herein by reference.

Fluid dispensing system 10 provides for controllable deformation of a container 14 such that a portion of the container 14 acts as a wiping means to empty a fluid or substance 50 from the container 14. In this manner, substance dispensing system 10 provides a more efficient process of dispensing a fluid or substance 50 from a container 14.

Figure 44:
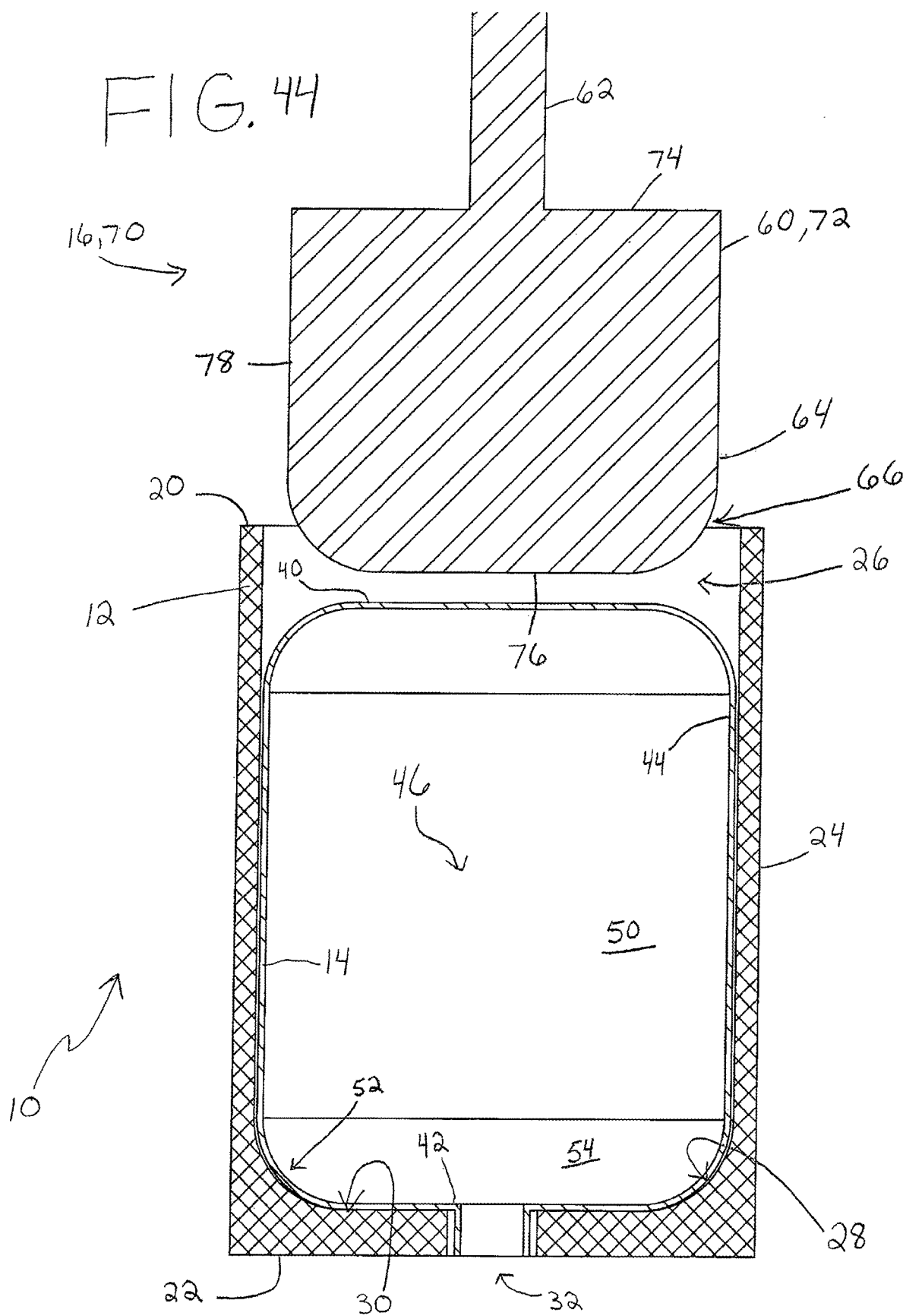
FIG. 44 is an assembled, cross-sectional view of the substance dispensing system of FIG. 43 with an actuation member in a first position in accordance with an embodiment of the present invention.

Referring to FIG. 43, head portion 60 of actuation member 16 defines an actuation member diameter 68. In one embodiment, actuation member diameter 68 is less than container diameter 48 and container diameter 48 is less than confinement structure diameter 34 as shown in FIG. 44. In this manner, substance dispensing system 10 allows for controllable deformation of a container 14 such that a portion of the container 14 acts as a wiping means to empty a substance from the container 14.

Referring to FIGS. 43-51, in one embodiment, actuation member 16 comprises a plunger 70. Plunger 70 includes plunger head portion 72 having a proximal wall 74, a distal wall 76, and a plunger sidewall 78 extending between proximal wall 74 and distal wall 76. In one embodiment, plunger sidewall 78 has a constant diameter between proximal wall 74 and distal wall 76 to control deformation of a container 14 such that a portion of the container 14 acts as a wiping means to empty a substance from the container 14 as described in more detail below. In one embodiment, exterior profile 66 of actuation member 16 is defined by distal wall 76 of plunger 70.

Referring to FIGS. 5, 6, 9, and 10, in one embodiment, the confinement structure 12, the container 14, and the actuation member 16 may be disposed on a portion of a carrier 17. In an exemplary embodiment, the carrier 17 includes a housing portion 83 and a motion portion 85 and the carrier 17 is movable over a surface. In this manner, the carrier 17 allows the confinement structure 12, the container 14, and the actuation member 16 to be easily and conveniently transported over a surface to easily dispense a fluid or substance 50 over a surface. In an exemplary embodiment of the present disclosure, the confinement structure 12, the container 14, and the actuation member 16 each are removably disposable relative to the carrier 17, e.g., connectable relative to a portion of the carrier 17. In one embodiment, the carrier 17 includes a handle 99 to help a user maneuver a system 10 and a carrier 17 of the present disclosure.

Figure 17:
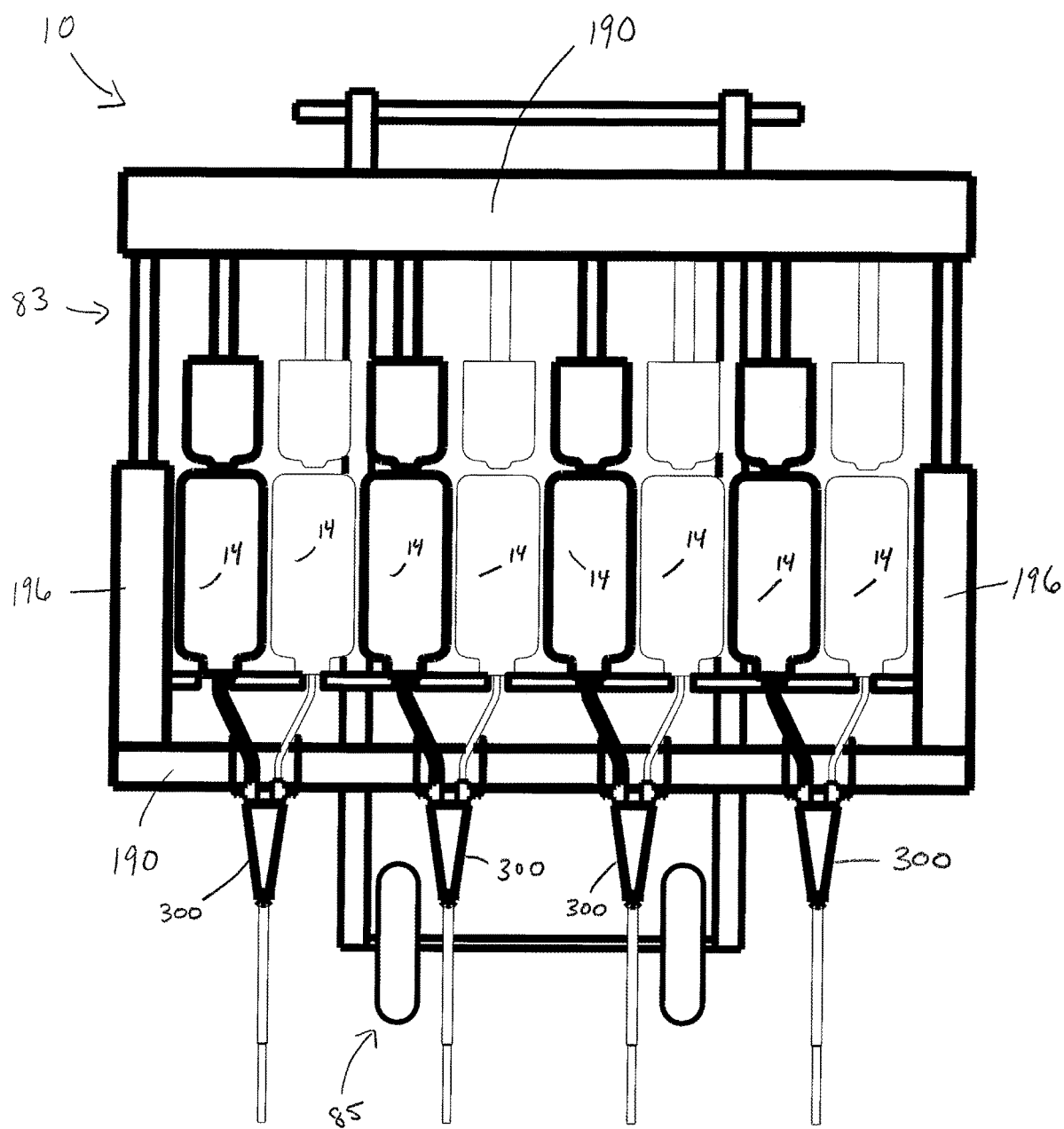
FIG. 17 is a perspective view of a fluid dispensing system with eight containers in accordance with another embodiment of the present invention.
Figure 18:
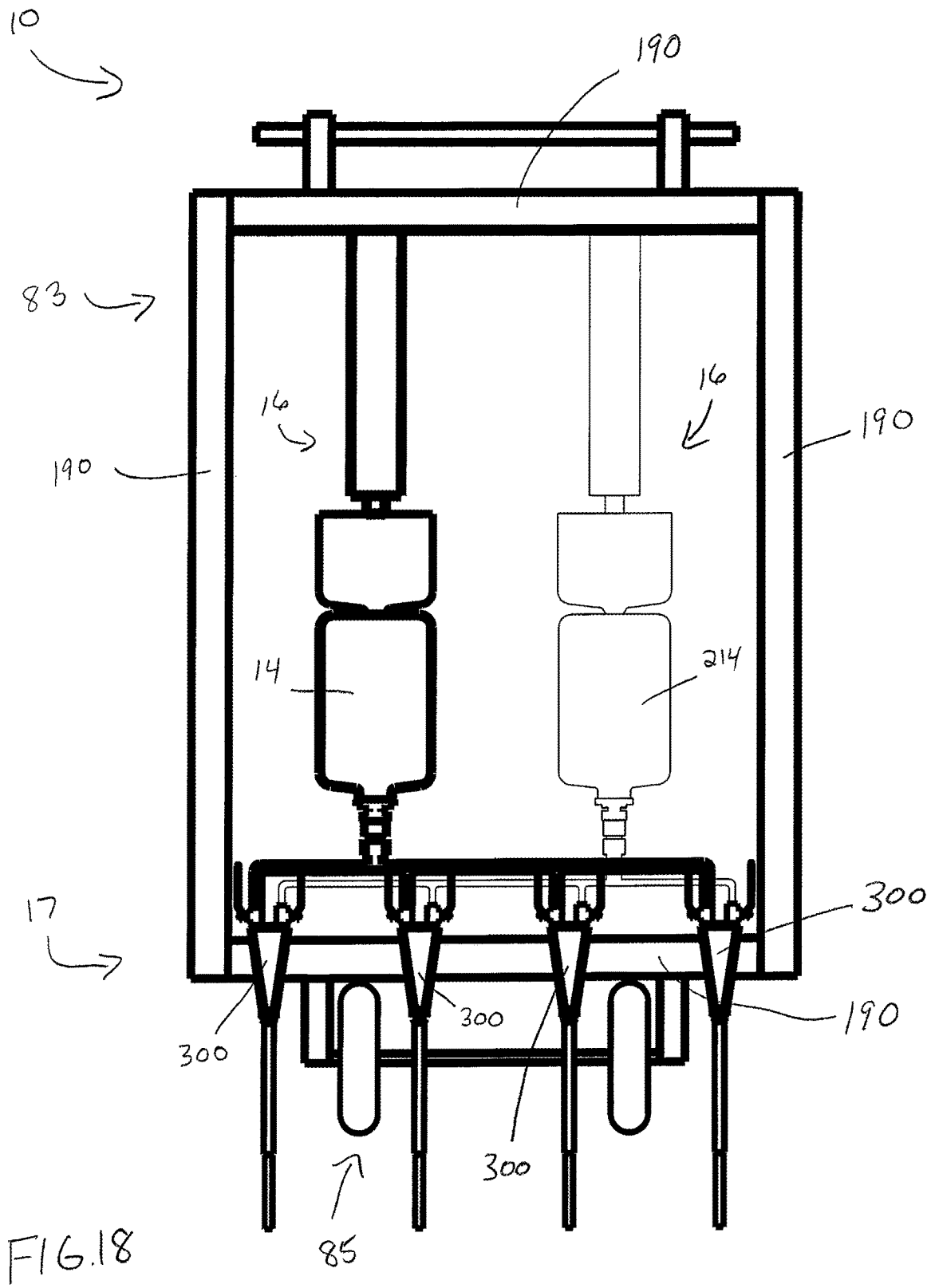
FIG. 18 is a perspective view of an integral fluid dispensing system with two containers in accordance with another embodiment of the present invention.
Figure 19:
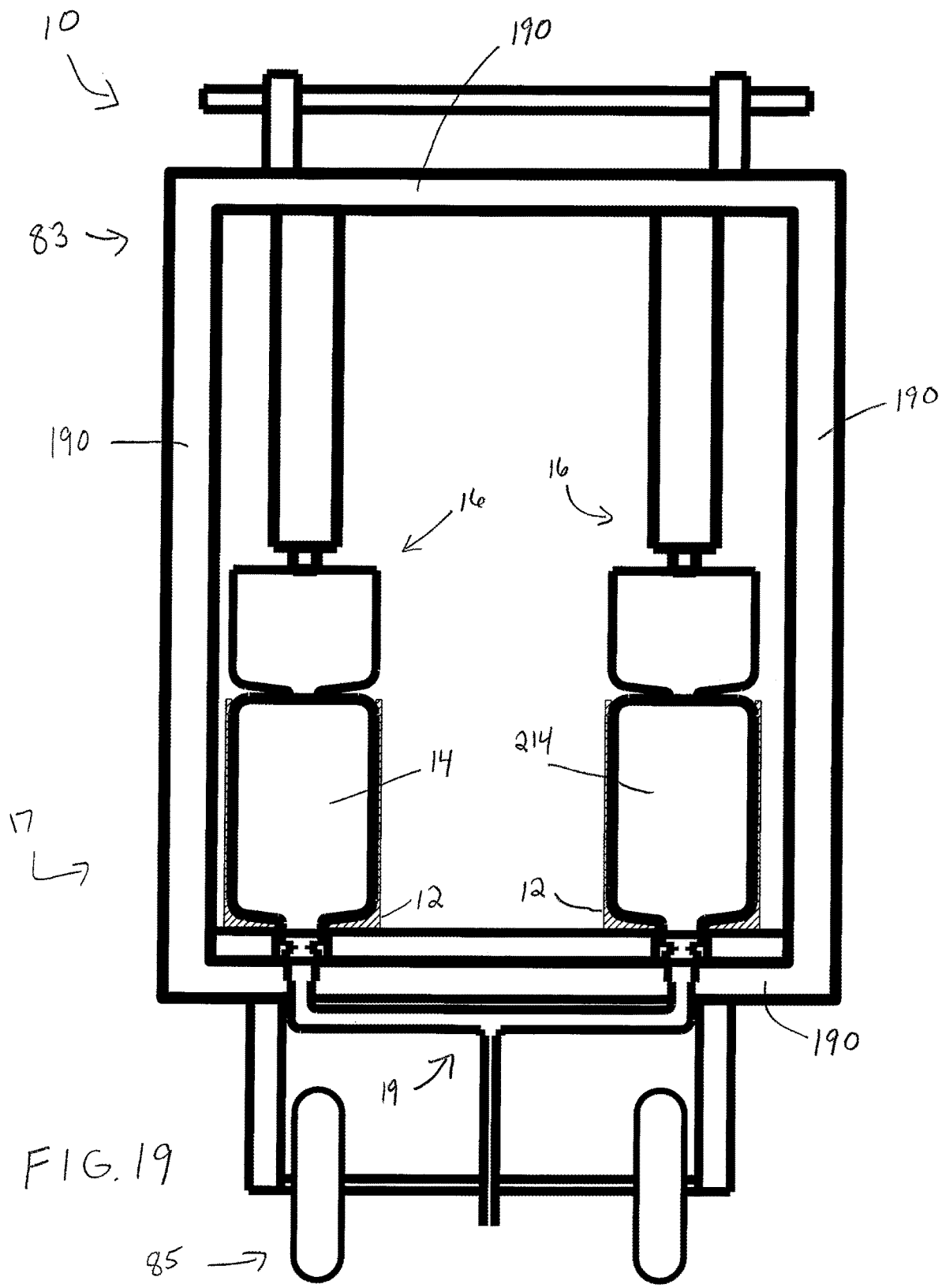
FIG. 19 is a perspective view of an integral fluid dispensing system with two containers in accordance with another embodiment of the present invention.
Figure 30:
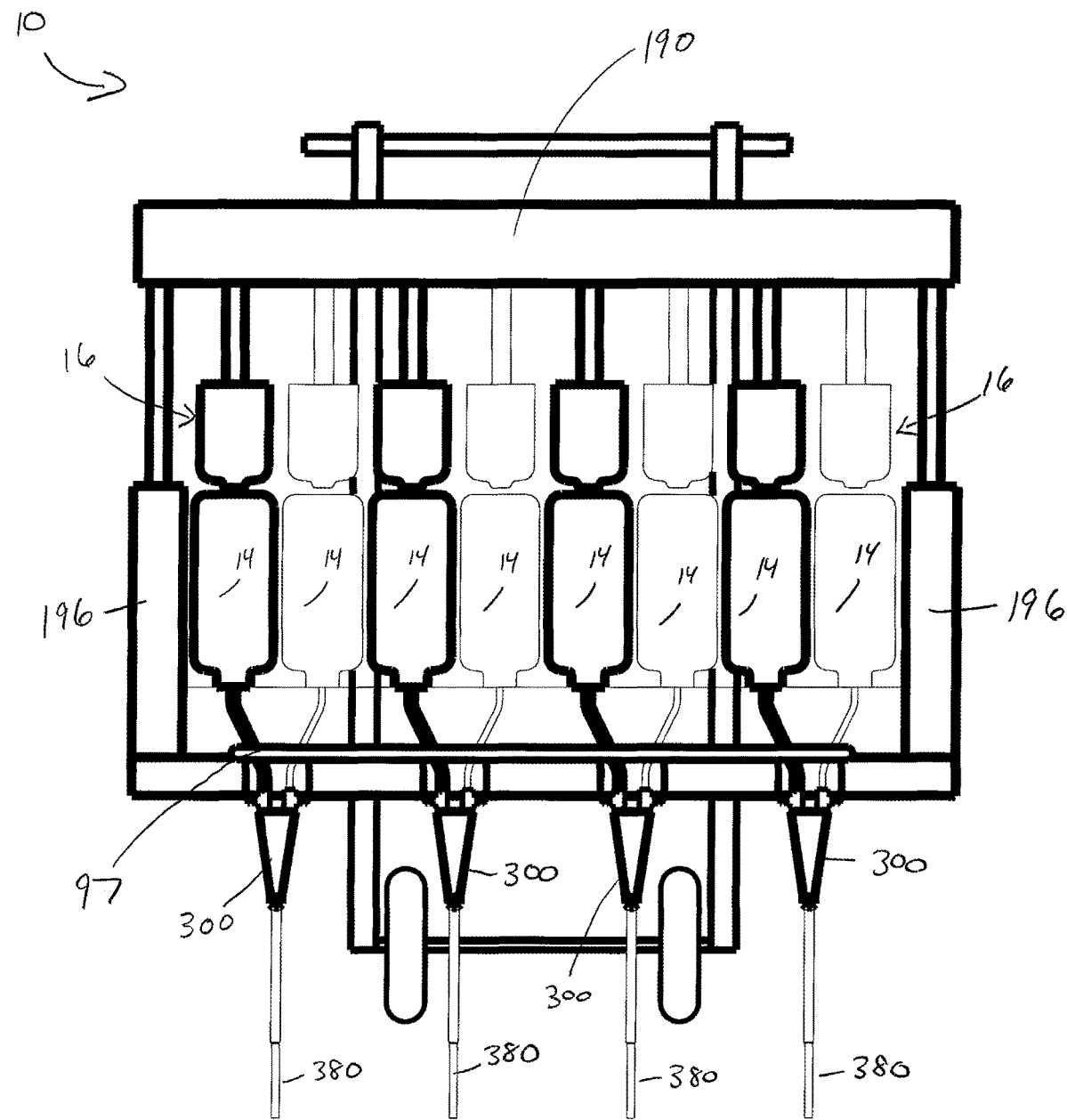
FIG. 30 is a perspective view of a fluid dispensing system in accordance with an embodiment of the present invention.

In one exemplary embodiment, a single force generation system 90, such as a hydraulic pump, is mounted on the carrier 17 in a convenient location to be out of the way of the functionality of the dispensing system. Referring to FIG. 5, a force resistance structure 190 is also mounted on the carrier 17. In one exemplary embodiment, the force resistance structure 190 includes reinforced structure 192 and hydraulic cylinders 196 (FIG. 17). The force resistance structure 190 is designed to have a sufficient size and shape to hold and align the confinement structure 12, a deformable container 14, and actuation member 16 as well as to have sufficient structural integrity to resist the force of the actuation member 16. The confinement structure 12 is removable and positionable to be located axially centered in alignment with a deformable container 14, and the actuation member 16 all within the confines of the force resistance structure 190. In one embodiment, the second end of the confinement structure 12 is slotted on two sides. These slots (FIGS. 39 and 41) provide the positional orientation of the confinement structure 12 within the confines of the force resistance structure 190. In one embodiment, referring to FIG. 30, a system 10 of the present disclosure includes a connecting yoke 97 that allows ball valve handles.

The frame of the present disclosure must be sufficient in structural integrity to resist the forces necessary to dispense fluids as described herein. The outer structure of the frame must be reinforced. Conventional dispensing tools utilize a rack or frame to hold canisters. The force resistance design requirements of prior art and/or conventional frames have been minimal due to the low pressure at which a friction fit seal fails. Friction fit canisters and caulking type packaging can only withstand about 40 pounds of pressure before the seal will fail and blow-by will occur. Some very well constructed canisters may withstand up to 70 pounds of pressure before the fluid spurts out of the slidable friction seal and onto the plunger plate. For this reason, conventional dispensing technology has been limited to about 3" inch diameter. 70 pounds of pressure in a 3" inch diameter container requires a dispensing force of only about 500 pounds. This force can easily be constrained with a simple frame such as a thin metal caulking gun or other material holding rack. The goal of the present disclosure is to dispense fluids in multiple configurations such as hoses and manifolds that utilize a deformable container to prevent blow-by. The dispensing forces required to press out fluids necessitate a structure to withstand the advancing forces of the actuator. For example, the force required to create internal fluid pressures of 300 psi in a deformable container of about 10" inch diameter is over 23,000 pounds. When dispensing 2 deformable containers, for applications such as epoxies, the force requirement doubles to over 46,000 pounds. A holding rack or flimsy caulking gun cannot withstand these forces. The force resistance structure 190 of the present disclosure must be designed to not only hold the container and store the fluid, but it must also have sufficient reinforcement to constrain the force. The force resistant structure must be strong enough to not yield to the pushing force of the actuator and at the same time restrain the confinement structure during dispensing. Conventional racks fail to provide the structure to accomplish this force resistance. The force generation method of the present disclosure utilizes a recirculating valve hydraulic method. The valve's pressure settings can be adjusted to allow the operator controlled dispensing options thereby increasing or decreasing the speed and volume of fluid being applied to a work area.

When the confinement structure 12 is slid over the deformable container 14 then the second end 42 of the deformable container 14 is sized and shaped to provide precise linear alignment with the confinement structure 12. The deformable container 14 does not require additional securement. The confinement structure 12, with the deformable container 14 inside, can then be slid into position on the force resistance structure 190 and is held in place by gravity. The size and shape of the force resistance structure 190 is fashioned to precisely locate the confinement structure 12 and thereby the deformable container 14 in linear alignment with the actuation member 16. As the carrier 17 is relocated to a position appropriate for dispensing, the force resistance structure 190, confinement structure 12, deformable container 14, and actuation member 16 are also moved accordingly.

If the deformable container 14 were to be placed into the force resistance structure 190 without the confinement structure 12 the deformable container 14 would neither be aligned with the actuation member 16 nor would it deform as desired. The confinement structure 12 is a necessary component of dispensing from a deformable container 14.

In one embodiment, referring to FIGS. 5, 6, 9, and 10, the motion portion 85 of the carrier 17 includes a front wheel 87 and two rear wheels 89. In one embodiment, the two rear wheels 89 are larger than the front wheel 87.

Referring to FIGS. 1-4 and 7-16, in an exemplary embodiment, the fluid dispensing system 10 of the present disclosure provides a variety of dispensing manifolds 19 which are removable connectable to a single container 14 having a single exit portion 55. The dispensing manifolds 19 of the present disclosure provide a single container 14 having a single exit portion 55 with one or more outlets from which a fluid or substance can be controllably dispensed.

Figure 2:
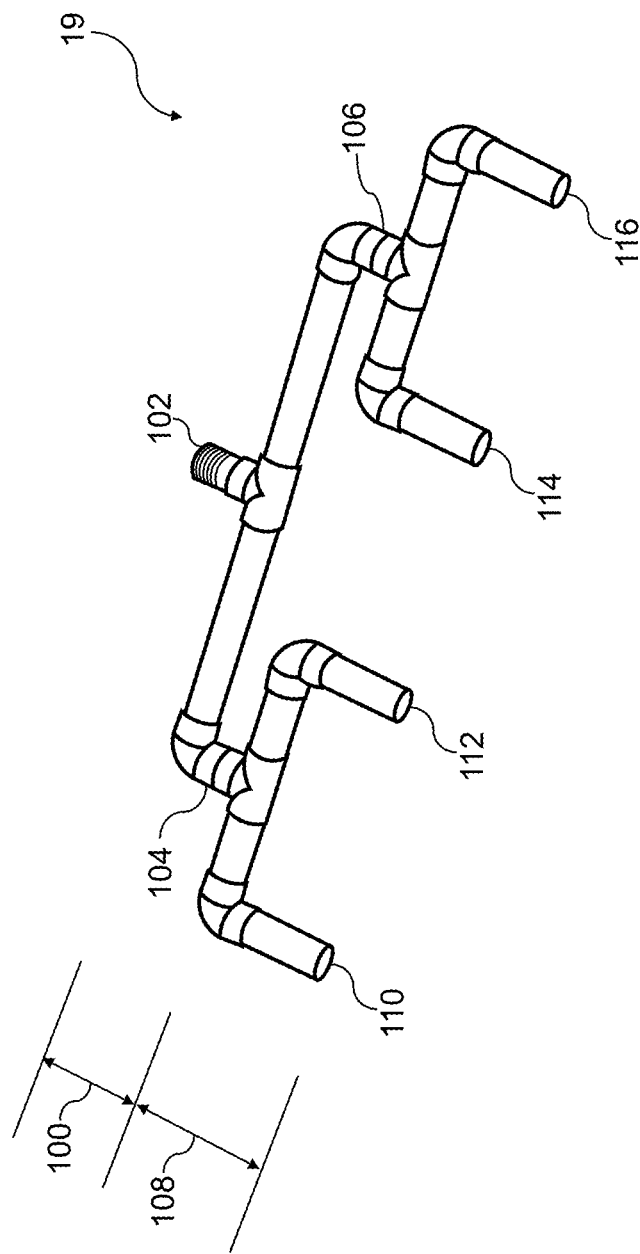
FIG. 2 is a perspective view of a dispensing manifold in accordance with an embodiment of the present invention.
Figure 13:
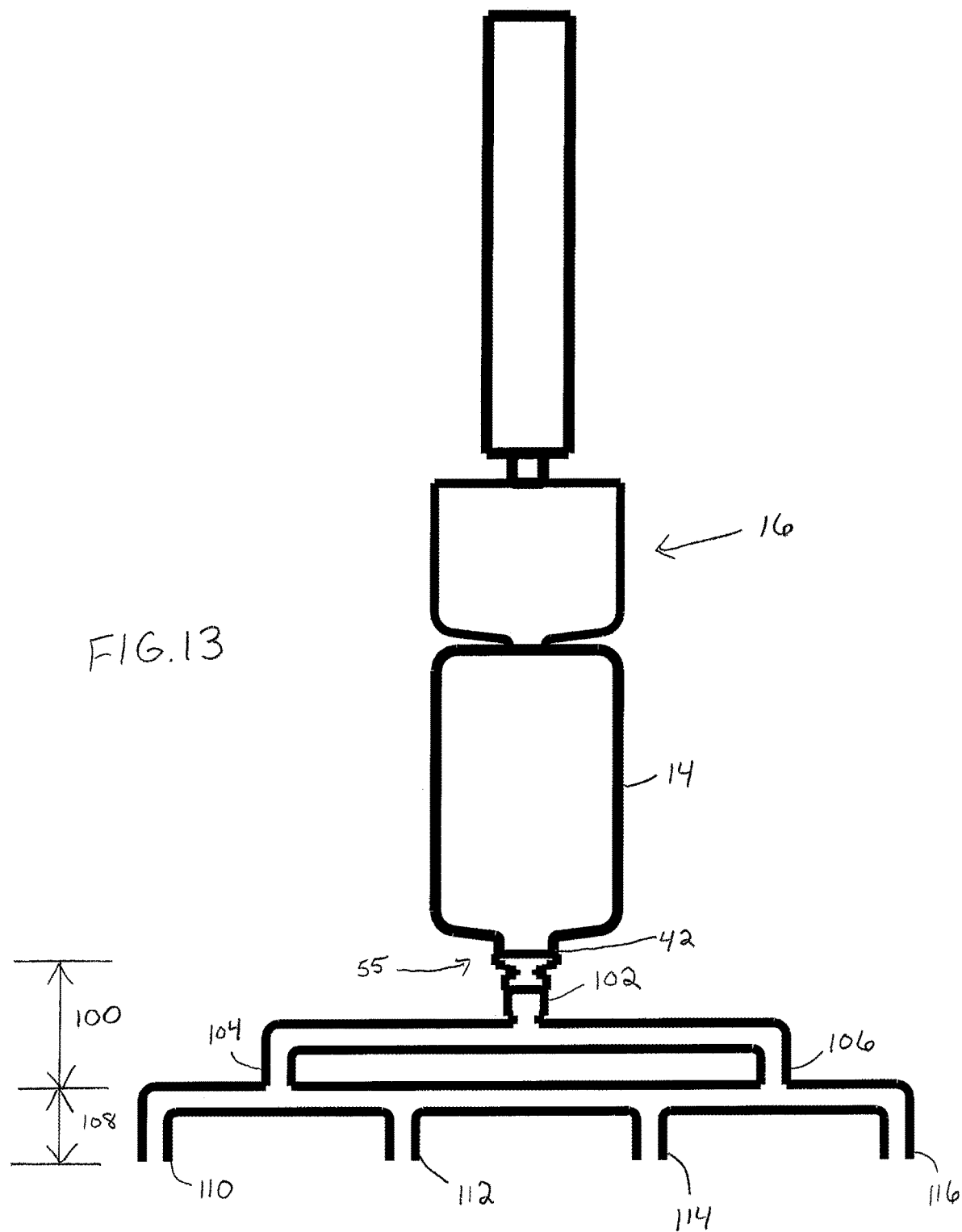
FIG. 13 is a perspective view of an integral fluid dispensing system with a dispensing manifold in accordance with another embodiment of the present invention.
Figure 14:
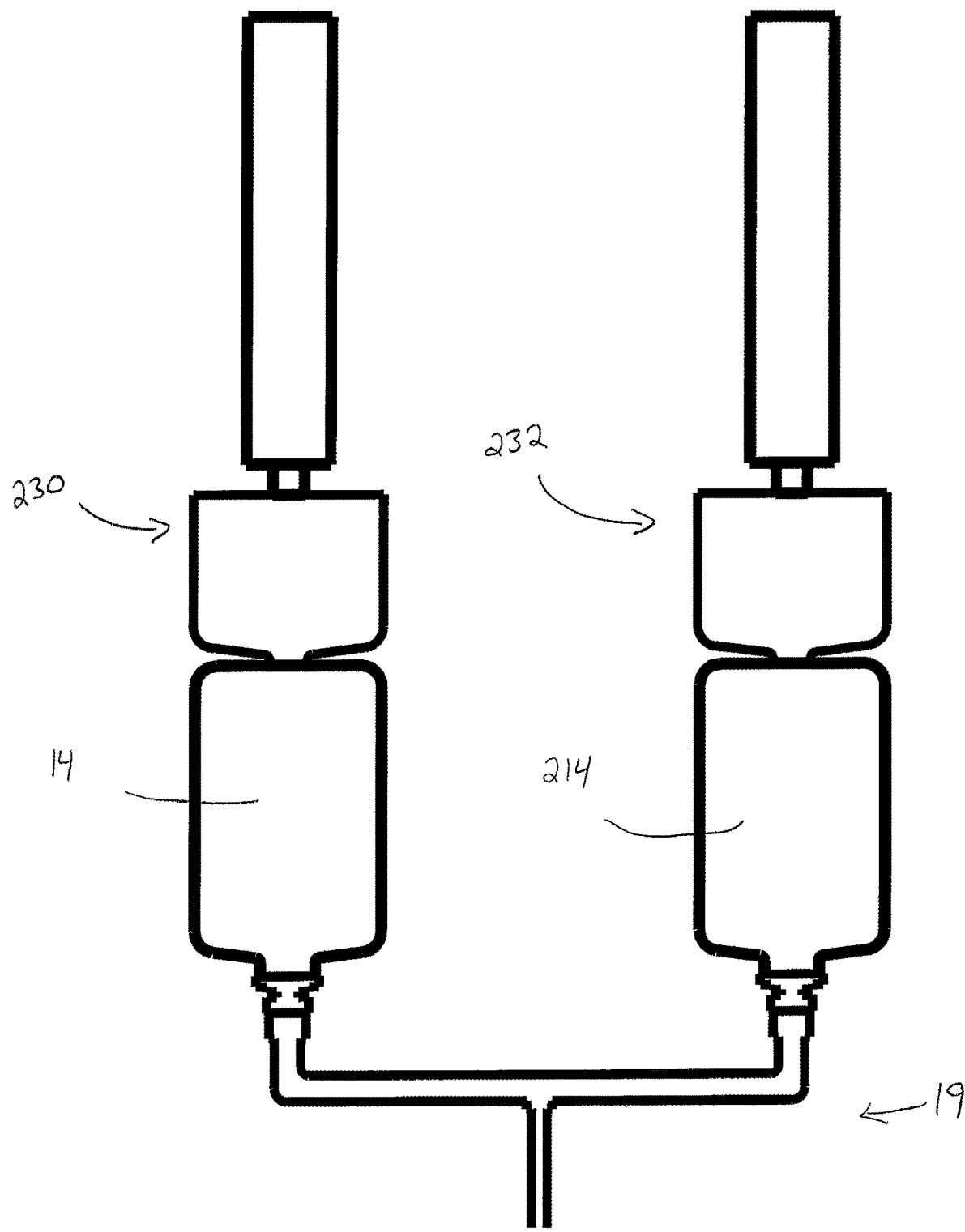
FIG. 14 is a perspective view of a fluid dispensing system in accordance with an embodiment of the present invention.

Referring to FIG. 2, in a first exemplary embodiment of the present disclosure, a dispensing manifold 19 includes a first tier 100 having a connection portion 102, a first port 104, and a second port 106; and a second tier 108 having a first exit 110, a second exit 112, a third exit 114, and a fourth exit 116. Referring to FIGS. 2 and 13, the second tier 108 is in fluid communication with the first tier 100 and the connection portion 102 is removably connectable to the second end 42 of the container 14. The first port 104 and the second port 106 are in fluid communication with portions of the second tier 108. For example, referring to FIG. 2, the first port 104 is in fluid communication with the first exit 110 and the second exit 112 and the second port 106 is in fluid communication with the third exit 114 and the fourth exit 116.

Referring to FIG. 13, with the connection portion 102 of the dispensing manifold 19 connected to the second end 42 of the container 14, the dispensing manifold 19 provides the container 14 having a single exit portion 55 with four dispensing outlets, 110, 112, 114, 116 from which a fluid or substance 50 can be controllably dispensed.

For example, with the dispensing manifold 19 connected to the second end 42 of the container 14, the first exit 110 of the dispensing manifold 19 is an outlet for a first bead or pattern 120 of the fluid 50 and the second exit 112 of the dispensing manifold 19 is an outlet for a second bead or pattern 122 of the fluid 50. In this manner, the first exit 110 and the second exit 112 of the dispensing manifold 19 simultaneously dispense the first bead 120 and the second bead 122 on a surface. Additionally, with the dispensing manifold 19 connected to the second end 42 of the container 14, the third exit 114 of the dispensing manifold 19 is an outlet for a third bead or pattern 124 of the fluid 50 and the fourth exit 116 of the dispensing manifold 19 is an outlet for a fourth bead or pattern 126 of the fluid 50. In this manner, the first exit 110, the second exit 112, the third exit 114, and the fourth exit 116 of the dispensing manifold 19 simultaneously dispense the first bead 120, the second bead 122, the third bead 124, and the fourth bead 126 on a surface. Advantageously, the dispensing manifold 19 of the present disclosure is designed such that the first bead 120, the second bead 122, the third bead 124, and the fourth bead 126 flow evenly to the first exit 110, the second exit 112, the third exit 114, and the fourth exit 116, respectively.

Figure 55:
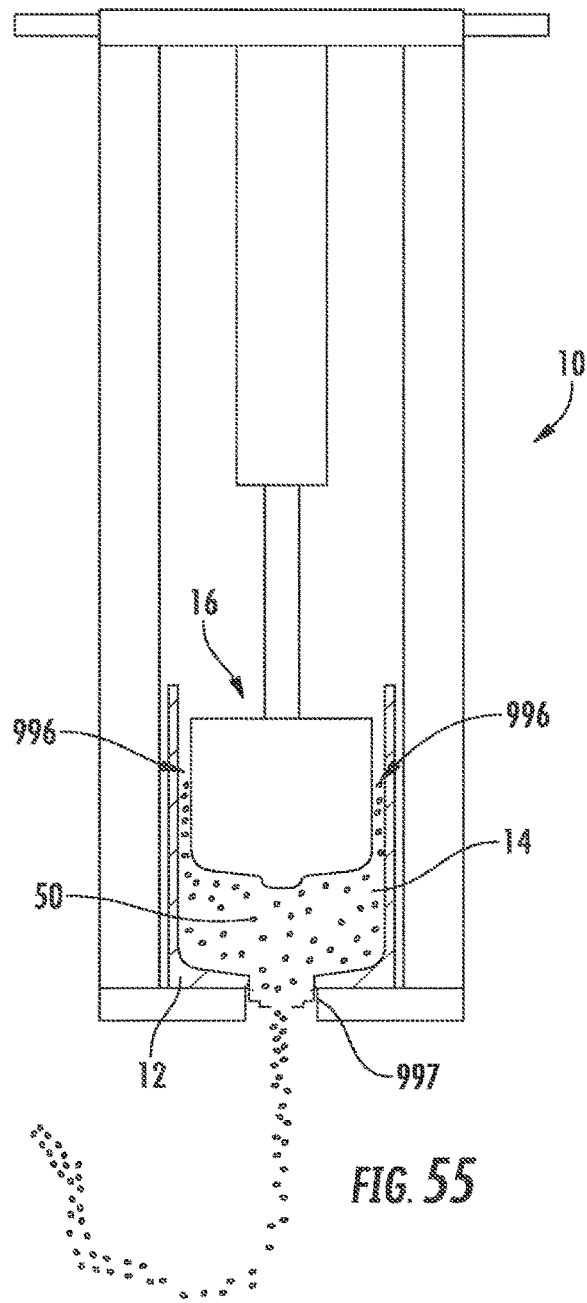
FIG. 55 is a cross-sectional view of a fluid dispensing system in accordance with an embodiment of the present invention.

Connecting a dispensing manifold 19 to the second end 42 of the deformable container 14 provides several benefits. FIG. 55 which illustrates a system 10 of the present disclosure and FIG. 56 which illustrates a conventional or prior art system 900 will now be discussed for comparison. The secure connection 997 of a container 14 of the present disclosure with a confinement structure 12 and/or to a dispensing manifold 19 of the present disclosure eliminates the messes and breakdowns associated with conventional packaging such as sausage packs 1003 or other flexible membranes having no preformed shape. Sausage packaging does not have a means of attaching directly to a manifold, but rather the end 1011 of the flimsy flexible container is cut and the package is placed into a separate caulk barrel 1004. During dispensing, the fluid 1002 in the package is then free to flow inside thereby contaminating the barrel 1004 and the plunger 1005. The caulking barrel 1004 may have an attachment means but the fluid 1002 will contaminate the inside of the caulking gun prior to exiting the barrel 1004.

Figure 56:
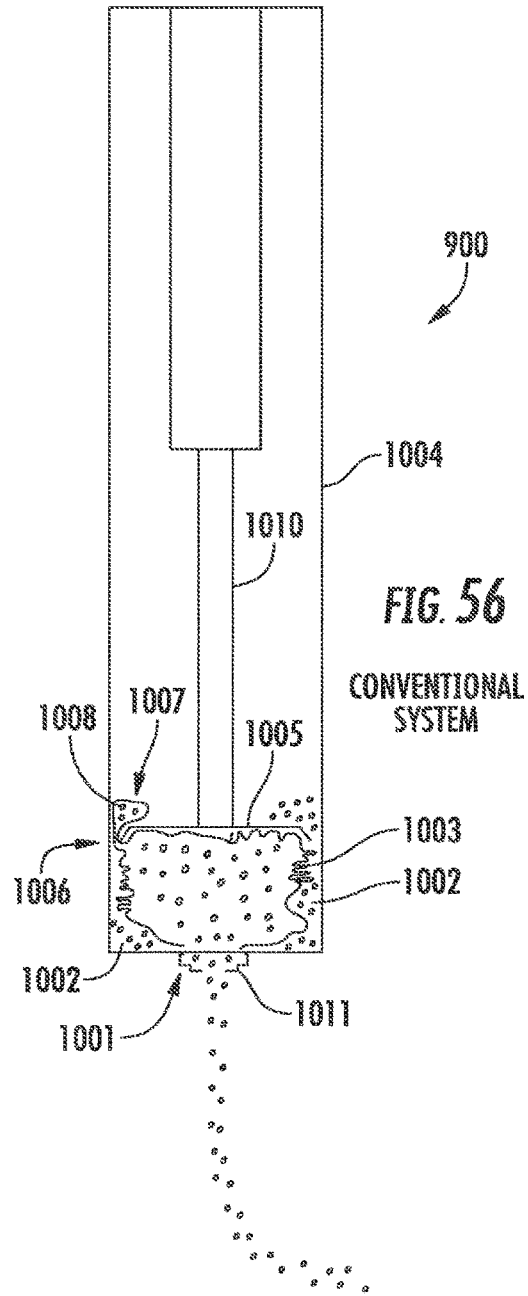
FIG. 56 is a cross-sectional view of a conventional system.

Furthermore, referring to FIG. 56, conventional flexible films and sausage packaging 1003 have several disadvantages. The packaging is not connected directly to a fitting for dispensing. This open connection is amplified when the fluid pressure is increased. With dispensing nozzles like those of a caulking cartridge the substance pressure rises only enough to force the fluid to travel a few inches. When adding a hose and a manifold the fluid pressure increases. Due to the open connection 1001 of such flexible package 1003, the fluid 1002 leaks out of the package thereby contaminating the barrel 1004 and plunger or plunger cup 1005. The flexible package 1003 can also be forced past the friction seal 1006 of the advancing plunger 1005 creating a bulge 1007 of fluid 1008 on the back side of the plunger cup 1005. Fluid 1002 that escapes outside of the package 1003, but remains inside the barrel leaks past the friction seal 1006 of the plunger cup and contaminates the back side of the plunger 1005, the plunger rod 1010, and the inside of the barrel 1004. Fluid 1002 that travels past the friction seal 1006 of the plunger cup 1005 is no longer usable. If the flexible packaging were to be placed in series with a second cartridge for example when applying two component epoxies the ratio of part A to part B would be off by the amount of leakage in either barrel.

The present disclosure provides a monolithic deformable container that contains all the fluid inside the container preventing contamination of the confinement structure 12 and the actuator 16. This complete and accurate dispensing also allows for two component fluids to be dispensed with an accurate ratio. The seal 996 of the present disclosure utilizes the wall of the deformable container to prevent leakage of the fluid. This method allows the outer diameter of the actuation member to be less than the inner diameter of the deformable container which has an outer diameter that is less than the inner diameter the confinement structure. This gap is one of the numerous advantages of the present disclosure that differentiates the present disclosure from conventional systems (FIG. 56). Conventional systems 900 (FIG. 56) attempt to seal the fluid 1002 into a tube or cartridge 1004 with a slidable friction fit seal 1006. The friction fit seal 1006 is unreliable to hold fluids, especially as fluid pressures increase with an advancing plunger 1005 as shown in FIG. 56. A deformable container 14 of the present disclosure prevents the fluid 50 from escaping the container 14 and does not rely on a slidable friction seal, but rather provides a homogeneous flexible wall to keep fluid 50 constrained. This seal 996 created by a system 10 of the present disclosure enables the fluid 50 to reach higher pressures which enables more dispensing options such as hoses over 150 feet in length as well as multiple port manifolds. These dispensing methods are not possible with conventional thin film flexible packaging 1003 as shown in FIG. 56. A seal 996 of the present disclosure also allows positive displacement dispensing from packages that hold a larger volume of material. In a conventional system 900 (FIG. 56), positive displacement by and advancing actuator utilizing flexible film packaging 1003 is limited to about 3" inch diameters. Certainly, larger flexible packaging can be made to hold a fluid, but the fluid cannot be dispensed via positive displacement. The present disclosure allows the fluids to be dispensed from packaging which is larger than conventional positive displacement packaging. This larger packaging of the present disclosure increases application efficiencies by reducing packaging costs and reducing labor to change empty cartridges. The contained fluid 50 in a system 10 of the present disclosure reduces the mess of contaminated parts. Larger packaging options at higher pressures also increase the volume of fluid which can be dispensed. Conventional smaller packages generally extrude materials at a rate of about ⅛ of a gallon per minute. Conventional larger packages can dispense about ½ gallon per minute. Present disclosure packaging has controllably dispensed fluids at a rate of 9 gallons per minute. Such production is not conceivable with conventional systems and methods. The higher volume and pressure of the fluid also opens the opportunity for spray applications. Some thinner viscosities, such as less than 15,000 centipoise can be sprayed using the fluid pressures created by the advancing actuator. Heavier viscosity fluid of 15,000 to about 100,000 centipoise can be sprayed with air assistance. Spraying these heavy viscosities has been, in the past, limited to fluids being pressurized to about 3,000-7,000 psi rather than the 200 psi of the present disclosure. The present disclosure allows for systems and applications that have not been possible.

Connecting a manifold 19 directly to a deformable container 14 of the present disclosure also eliminates extra fittings. It is common for flexible packaging and even some rigid packaging to have a second part or piece of a structural member with threads to provide a connecting means to a manifold. Having a connecting means as part of a deformable container 14 has the benefit of sealing the deformable container 14 for shipment to a jobsite with a lid. Many packages have to add a secondary seal for shipment. These seals are often foil that has to be punctured prior to use, or are crimped in place seals that must be cut off. The connecting means on the deformable container can be utilized for both shipment sealing and dispensing connections.

Once the connection is made to the manifold 19 a fluid can be dispensed as desired. The proper manifold can be selected to coordinate with the requirements of fluid application specifications. A single outlet manifold can be selected for caulking concrete construction joints or single bead adhesive applications. A simple wye manifold can split the flow of the fluid for either a two bead application or two separate hoses can be attached. Four bead application is common for insulation adhesives. The spacing of the manifold apertures will necessarily determine the spacing of the beads for the application. Six (6) or twelve (12) inch spacing is common. Seven bead application is also a common configuration. The manifold can also be fitted with ball valves to selectively provide various bead applications during construction process.

Dispensing directly from a deformable container 14 to a manifold 19 has a significant advantage over dispensing out of a container and through a hose. As a fluid passes through a hose friction reduces both the pressure and the speed of flow. This is often not a problem for fluids of less than about 10,000 centipoise, but as viscosity increases flow decreases. A fluid that is 1,000,000 centipoise and is pressurized to about 200 psi may only travel about 15 feet through a 1" hose. A fluid that is about 500,000 centipoise at the same 200 psi may travel 30' through a 1" hose. The fluid flow comes to a complete stop. When using a manifold 19 directly connected to a deformable container 14 the distance of travel is only about 12" to 18". At this shorter distance, the same 500,000 centipoise fluid will dispense out of a multiple port manifold at about ½ gallon per minute operating under the same 200 psi.

Attaching a manifold 19 directly to a deformable container 14 that is in a confinement structure 12 and is being deformed by an actuation member 16 which is moved by a single force generation system and supported by a force resistance structure 190 all moving over a substrate on a carrier 17 allows the carrier 17 to be situated directly at the location of the desired fluid application. Additionally, an operator of the carrier 17 can also simultaneously be dispensing the fluid. When operating a hose the carrier 17 must be moved by one operator and the hose by a second person. Pulling the entire dispensing system and manifold on a carrier 17 allows the operator to apply parallel lines of fluid to a substrate as the carrier is being pulled along.

Figure 4:
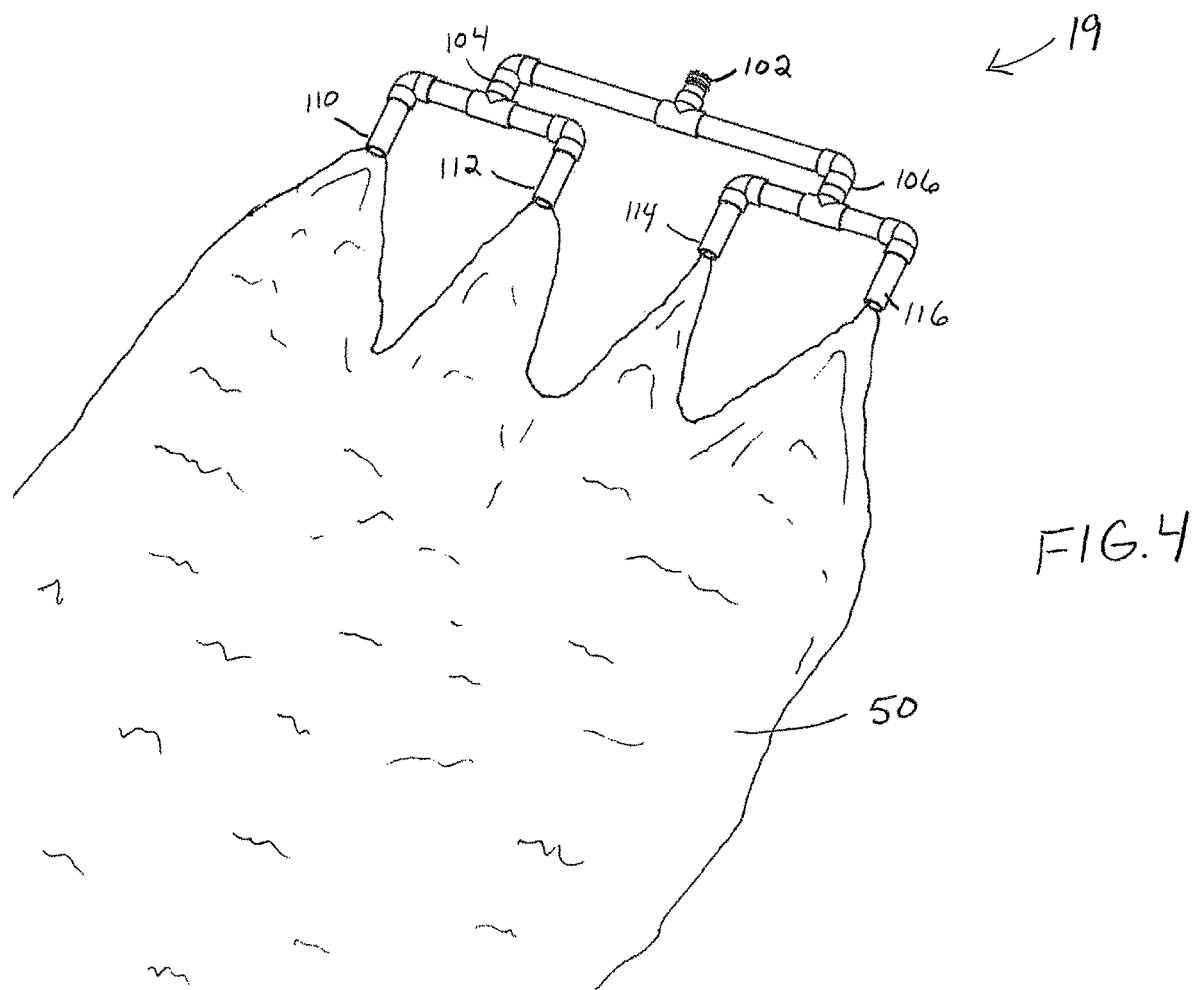
FIG. 4 is a perspective view of a dispensing manifold in accordance with an embodiment of the present invention.

Referring to FIGS. 2, 4, and 13, in one embodiment, the dispensing manifold 19 is connected to the second end 42 of the container 14 via a mechanical connection. For example, the dispensing manifold 19 and the second end 42 of the container 14 may be connected via a threaded connection, a quick connect coupling, or other mechanical connection mechanism. In other embodiments, the dispensing manifold 19 and the second end 42 of the container 14 may be connected via other types of connection mechanisms.

In an exemplary embodiment of the present disclosure, the second end 42 of the container 14 is rigid. Advantageously, a container 14 of the present disclosure having a rigid second end 42 allows for the above described quick connection mechanisms to allow for easy, quick and secure connections between a connection portion 102 of a dispensing manifold 19 of the present disclosure with a rigid second end 42 of the container 14 of the present disclosure.

Figure 3:
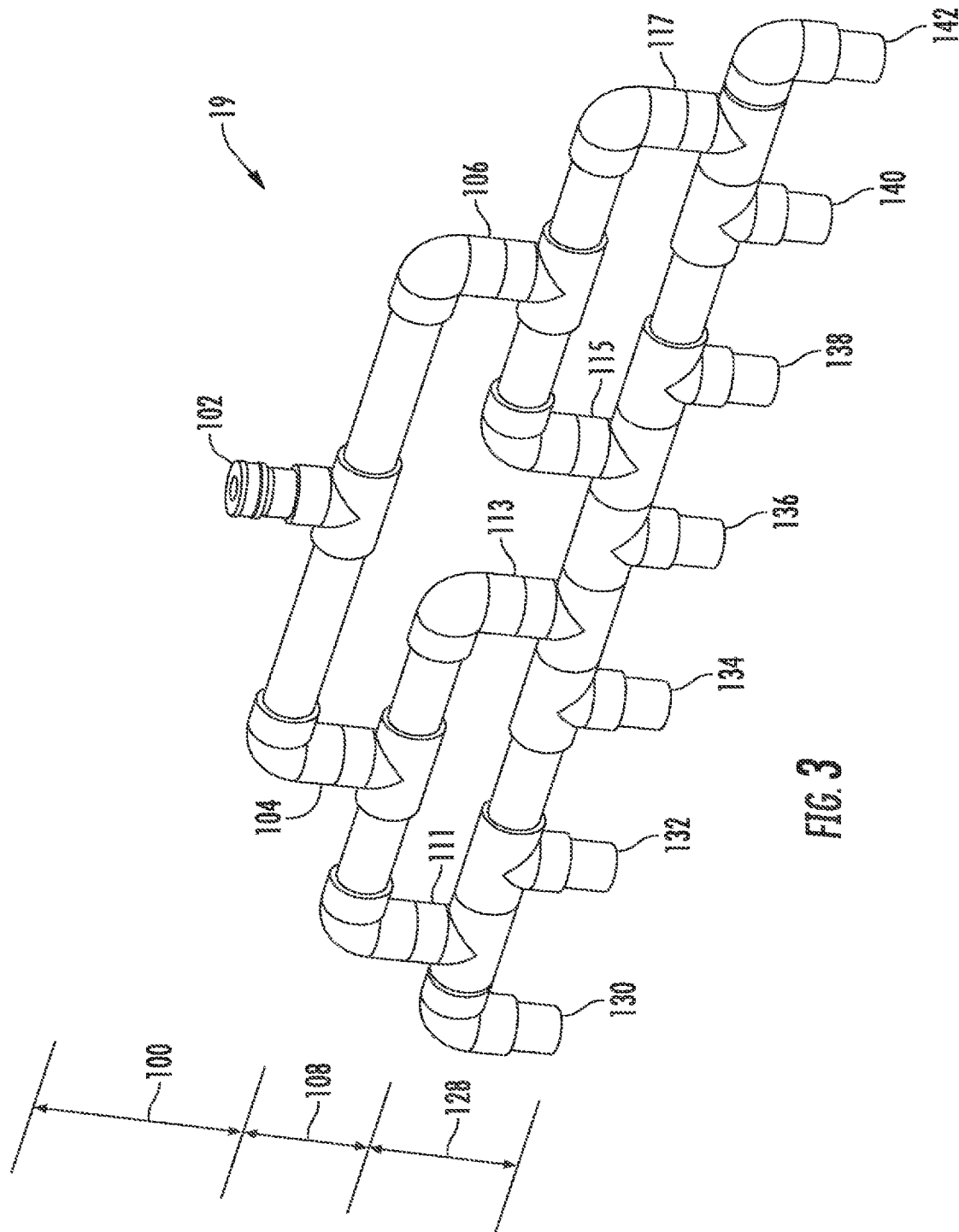
FIG. 3 is a perspective view of a dispensing manifold in accordance with an embodiment of the present invention.

In other exemplary embodiments, it is contemplated that a dispensing manifold 19 of the present disclosure may include any number of configurations and any number of outlets for a particular application. For example, referring to FIG. 3, in another exemplary embodiment of the present disclosure, a dispensing manifold 19 includes a third tier 128 having a first exit 130, a second exit 132, a third exit 134, a fourth exit 136, a fifth exit 138, a sixth exit 140, and a seventh exit 142. Referring to FIG. 3, the second tier 108 includes a third port 111, a fourth port 113, a fifth port 115, and a sixth port 117.

Referring to FIG. 3, in one embodiment, the third port 111 is located between the first exit 130 and the second exit 132; the fourth port 113 is located between the third exit 134 and the fourth exit 136; the fifth port 115 is located between the fourth exit 136 and the fifth exit 138; and the sixth port 117 is located between the sixth exit 140 and the seventh exit 142. In other embodiments, the ports and the exits of the tiers may have alternative configurations for a particular application.

Referring to FIG. 10, with the connection portion 102 of the dispensing manifold 19 connected to the second end 42 of the container 14, the dispensing manifold 19 provides the container 14 having a single exit portion 55 with seven dispensing outlets, 130, 132, 134, 136, 138, 140, 142 from which a fluid or substance 50 can be controllably dispensed.

For example, with the dispensing manifold 19 connected to the second end 42 of the container 14, the first exit 130 of the dispensing manifold 19 is an outlet for a first bead or pattern 120 of the fluid 50, the second exit 132 of the dispensing manifold 19 is an outlet for a second bead or pattern 122 of the fluid 50, the third exit 134 of the dispensing manifold 19 is an outlet for a third bead or pattern 124 of the fluid 50, the fourth exit 136 of the dispensing manifold 19 is an outlet for a fourth bead or pattern 126 of the fluid 50, the fifth exit 138 of the dispensing manifold 19 is an outlet for a fifth bead or pattern 144 of the fluid 50, the sixth exit 140 of the dispensing manifold 19 is an outlet for a sixth bead or pattern 146 of the fluid 50, and the seventh exit 142 of the dispensing manifold 19 is an outlet for a seventh bead or pattern 148 of the fluid 50. In this manner, the seven exits 130, 132, 134, 136, 138, 140, 142 of the dispensing manifold 19 simultaneously dispense the seven patterns or beads 120, 122, 124, 126, 144, 146, 148, respectively, on a surface.

Referring to FIGS. 1, 7, 8, and 12, in another exemplary embodiment of the present disclosure, a dispensing manifold 19 includes a single exit 160.

Examples of single bead applications include caulking concrete joints, serpentine patterns for adhesives, and applying a flood coat on a substrate such as a concrete floor coating. On the exterior of buildings single beads work well around window, metal seams, and screw heads. Single bead applications are also used to apply adhesives in manufacturing processes. It is desirable to apply multiple beads for applications that either require a flood coat of material or when 3' to 4' wide rolls, sheet goods, or boards are to be adhered by applying spaced out beads. The distance between the outlets determines the distance of the beads.

As discussed above, in other exemplary embodiments, it is contemplated that a dispensing manifold 19 of the present disclosure may include any number of configurations and any number of outlets for a particular application. For example, FIGS. 11A-11I illustrate other exemplary embodiments of a dispensing manifold 19 of the present disclosure.

Referring to FIG. 1, in some embodiments, the fluid dispensing system 10 also includes a hose 170 having a first hose end 172 and a second hose end 174.

In one embodiment, the first hose end 172 is removably connectable to the second end 42 of the container 14 and the second hose end 174 is removably connectable to the connection portion 102 of a dispensing manifold 19 of the present disclosure. In another embodiment, with the connection portion 102 of the dispensing manifold 19 connected to the second end 42 of the container 14, the first hose end 172 is removably connectable to any of the exits of the dispensing manifold.

Referring to FIG. 1, in one embodiment, the first hose end 172 includes a connection portion 176 that is removably connectable to a portion of dispensing cap 56 or to the second end 42 of the container 14 via a mechanical connection. For example, the connection portion 176 and the second end 42 of the container 14 may be connected via a threaded connection, a quick connect coupling, or other mechanical connection mechanism. In other embodiments, the connection portion 176 and the second end 42 of the container 14 may be connected via other types of connection mechanisms.

Advantages of using a hose 170 with a system of the present disclosure includes not just the advantages associated with the hose 170 itself, but also with the advantages associated with the entire system of the present disclosure allowing a hose 170 to be used in new ways. Conventional dispensing through a hose has been accomplished by creating a force of either air pressure that is generally less than 150 psi or by utilizing a fluid pump to generate fluid pressures of 3,000 to 7,000 psi material pressure. Thin fluids such as primers, and some paints can be moved by pressurizing a container that holds a liquid. Thicker viscosity materials such as high solid sealants, coatings, and caulks do not move through a hose at these lower pressures. Additionally, air pressure can compress, thereby making flow control difficult. When utilizing a fluid pump some materials flow well, but the pump is touching the fluid being dispensed. This contamination of the parts of a pump requires specialized training and a keen awareness to prevent materials from curing inside the system. Additionally, pumps tend to aerate fluids into particles that become airborne and land in undesirable locations. Switching between materials is not quick nor easy as it requires a full flush of the pump, fittings and other components. The systems of the present disclosure can extrude heavier viscosity adhesives, sealants and coatings of about 150,000 centipoise through hoses of 20' to 200'. This hose length is very workable in most applications of these products. The hose itself is less expensive than the hoses that are several thousand psi ratings. This lower cost allows switching out of hoses to a new container with a different adhesive, sealant, or coating without a high financial barrier. Many applications such as flooring, siding, and roofing require a sealant be applied prior to a coating application and several different types, colors and viscosities of materials may need to be applied. The hose application with a pump or air pressure system is just not practical to accomplish all these different functions. The systems of the present disclosure provide a simple and cost effective solution for this array of application requirements. Once the fluid reaches the outlet of the hose a variety of application tools can be utilized. In exemplary embodiments, referring to FIG. 9, some of these include brushes, rollers, air assisted sprayers, spreaders, bead tools, various configurations of coating pads, squeegees, daubers, manifolds, and cleaning tools. Furthermore, referring to FIG. 8, a system of the present disclosure includes a roller 98.

Referring to FIGS. 17-30 and 34-35, in exemplary embodiments of the present disclosure, a system of the present disclosure provides a single force generation mechanism, a container holding a fluid or substance, and dispensing mechanisms all on one machine, i.e., a carrier.

A carrier 17 of the present disclosure conveniently holds the components of a fluid dispensing system of the present disclosure so that a user is able to conveniently apply multiple beads of a substance 50 (FIG. 10) simultaneously to a substrate. The carrier 17 of the present disclosure includes a housing portion 83 and a motion portion 85 or motive supports, e.g., wheels, and allows a user to be able to conveniently and easily maneuver a fluid dispensing system of the present disclosure to apply a single bead or pattern or multiple beads or patterns of a fluid or substance simultaneously to a substrate.

Figure 25:
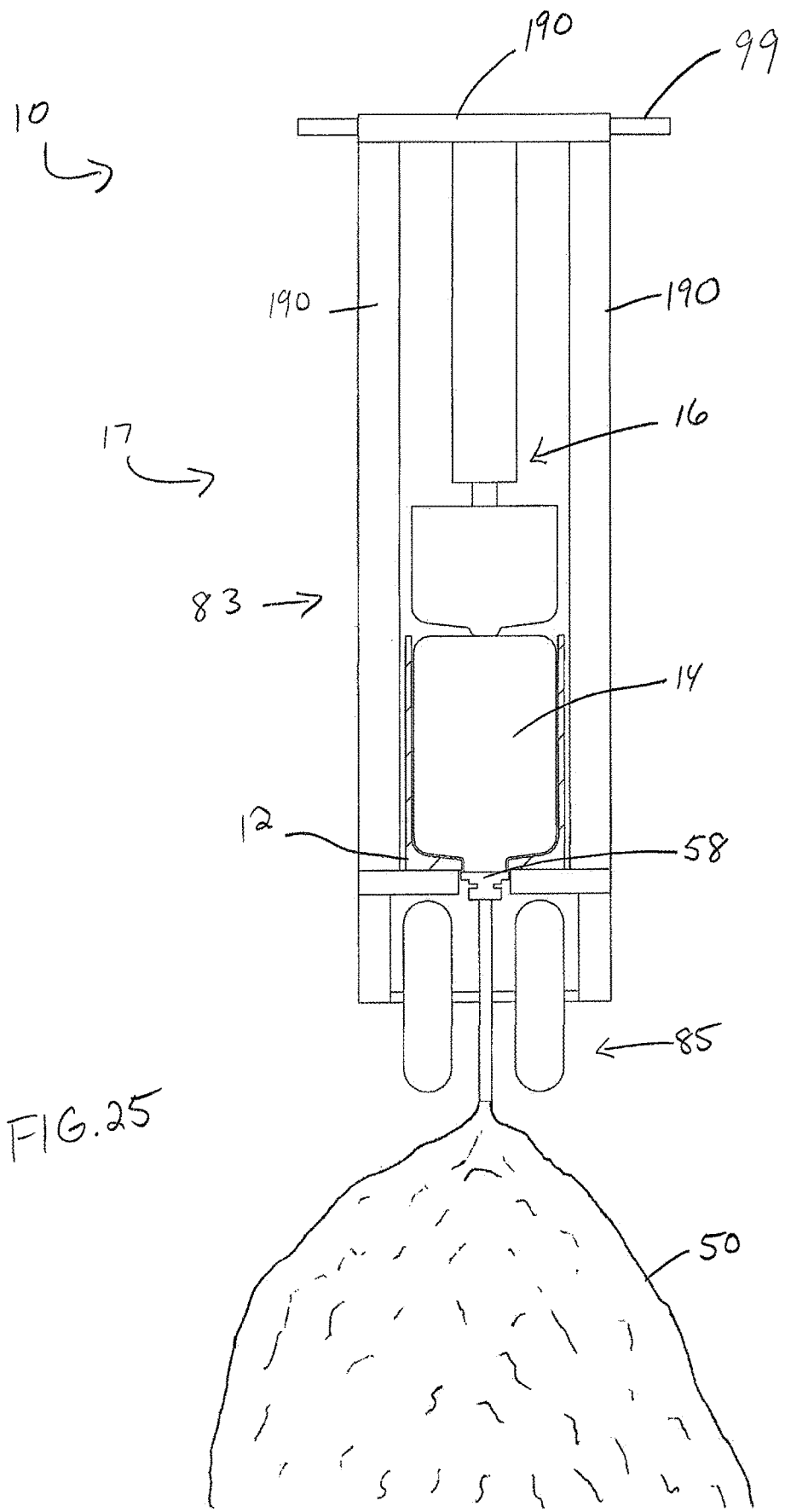
FIG. 25 is a perspective view of a fluid dispensing system in accordance with an embodiment of the present invention.
Figure 26:
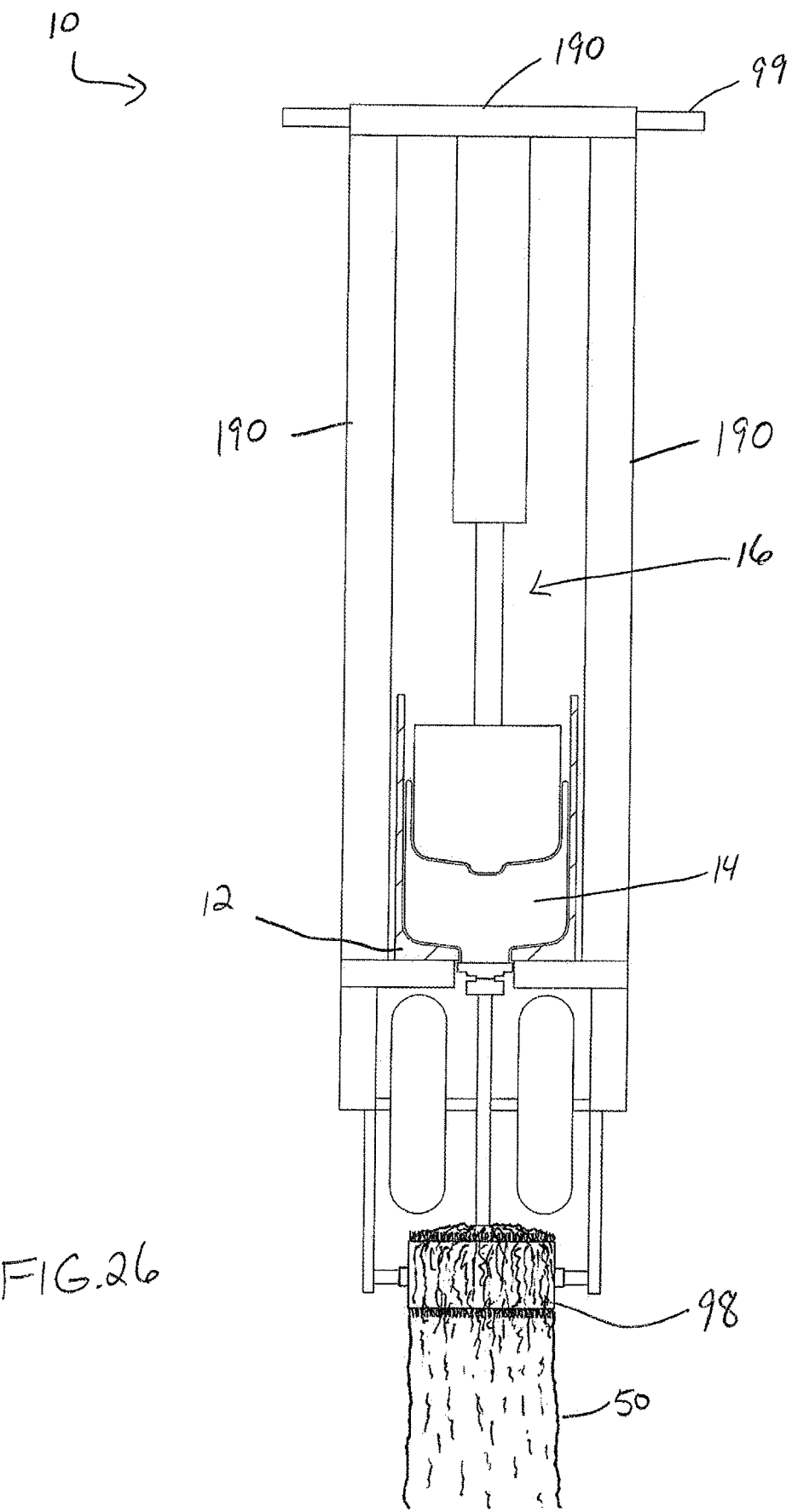
FIG. 26 is a perspective view of a fluid dispensing system in accordance with an embodiment of the present invention.

For example, in an exemplary embodiment, referring to FIG. 25, a container 14 is disposed on a first portion 250 of the carrier 17 and a single force generation system 90 is disposed on a second portion 252 of the carrier 17. The force generation system 90 is disposed on the carrier 17 in communication with the container 14 via a first actuator 16 for a controlled dispensing procedure. The force generation system 90 is transitionable between a first setting (FIG. 44) in which the container 14 holds a fluid 50 and a second setting (FIGS. 25-29 and 45-50) in which the force generation system 90 actuates a first actuator 16 which exerts a force deforming a portion of the container 14 thereby expelling the fluid 50 from the container 14.

Referring to FIG. 25, a fluid or substance dispensing system 10 having a single force generation mechanism 90, a deformable container 14 holding a fluid or substance, and dispensing mechanisms all on one machine, i.e., a carrier 17, to controllably deform a container 14 has many advantages over conventional dispensing systems. The structural resistance frame 92 of the carrier 17 contains the actuation member 16, the confinement structure 12, the deformable container 14, and the connecting fitting at exit portion 55 of the deformable container 14. The wheels 87, 89 of the carrier 17 make this unit mobile. The carrier 17 holds a single force generation system 90, e.g., a hydraulic pump, which can be run by an electric generator. This self-contained mobile machine allows fluids to be dispensed free of entanglement of cords and hoses. The flow of fluid is very fast and free since the distance of travel from the second end 42 of the container 14 to an aperture is short and does not have the resistance of a hose. In one exemplary embodiment, a connecting fitting or connection portion 102 of a manifold 19 is adapted to fit onto the connecting fitting 57 at exit portion 55 of the deformable container 14. The structural resistance frame 92 of the carrier 17 is fashioned to receive the removable confinement structure 12 and provides the resistance to the force that is necessary for the actuation member 16 to displace the fluid. The second end 42 of the container 14 is precisely fashioned so that the outer contour of the second end 42 of the container 14 matches the inner contour of the second end of the confinement structure 12. The first end 40 of the container 14 receives and is contacted by the actuation member 16 during a deformation process. In one exemplary embodiment, a protrusion at an end of the actuation member 16 contacts and is received within an indentation in the first end 40 of the container 14 for a controlled deformation process. The actuation member 16 moves from its first position to its second position by the mechanical advance of a hydraulic actuator system of the present disclosure. The actuation member 16 is mounted to the force resistance structure 190 and the actuation member 16 receives its pressurized hydraulic fluid from a hydraulic pump. The hydraulic pump is mounted to the carrier 17 and the carrier 17 may also hold an electric generator. With this complete self-contained dispensing system all mounted on one carrier 17 the operator can take advantage of pressurized fluid dispensing.

The deformable container 14 of the present disclosure combined with the collection of the exit nozzle, the fitting, the confinement structure 12, the uniquely shaped actuation member 16, and the actuator system positioned inside the force resistant structure, and all mounted on a carrier 17 with a single force generation member 90, provide a unique method of dispensing a fluid heretofore unanticipated. The embodiment shown in FIG. 25 also shows a ratio of one deformable container 14 to one exit aperture. While such a direct ratio is not always necessary for accurate dispensing the one to one ratio prevents fluid from choosing the various paths provided by a splitting manifold. One deformable container 14 with one exit aperture removes the variability of the dispensing volume and makes dispensing volumes exact and dependable.

FIG. 17 further illustrates the present disclosure in conjunction with multiple deformable containers and two component fluids mixing together to create a third fluid. Utilizing deformable containers in this application provides a clean dependable mixing of two component mixtures. This embodiment also provides accurate mixing. Actuation members 60 of the same size are used for deforming the same size containers. This results in positive displacement of both plunger displacing and extruding the two components at the same volume.

Conventional canister dispensing utilizes plungers traveling into the inside of the canister. As the plunger enters into the inside of the canister the interior walls of the canister are exposed and can be observed. In an attempt to minimize the contact of the plunger with the fluid being held inside the canister, a cup is used as a separating member. The exterior of this cup is designed to provide some degree of a seal between the cup and the inside wall of the canister. This friction fit seal frequently fails, especially when the fluid provides resistance from the cold viscous material or from a clog in the exit path of the fluid that is intended to be dispensed out the other end. The leakage of the fluid is not only messy but produces a mismatch in the third fluid. Differing amounts of part A and part B are mixed to become a third fluid that does not meet the manufacturer's specifications.

The deformable containers 14 and the systems of the present disclosure prevent leakage of one component thereby ensuring accuracy of fluid mixtures. The embodiment of the present disclosure shown in FIG. 17 further ensures accuracy by utilizing the one deformable container to one fluid outlet. Referring to FIG. 17, in one embodiment, eight deformable containers are disposed on a single carrier 17 with four of the containers holding a first component of a fluid or substance and the other four containers holding a second component of a fluid or substance. By connecting the eight actuation members 16 the dispensing of four mixed liquid streams is accurate as all actuation members 16 dispense all fluids from each respective deformable container simultaneously and in matching volumes. Devices that are remotely located at a distance from the deformable container have the disadvantage of slower dispensing speeds. In addition, devices that have one or more splitting manifolds located at a distance from the deformable container can provide off ratio dispensing.

Referring to FIGS. 25-29 and 43-51, use of a fluid or substance dispensing system 10 having a single force generation mechanism, a container holding a fluid or substance, and dispensing mechanisms all on one machine, i.e., a carrier, to controllably deform a container 14 such that a portion of the container 14 acts as a wiping means to empty a substance 50 from the container 14 will now be described.

A variety of different containers 14 containing various fluids or substances are compatible with the fluid or substance dispensing system 10 of the present disclosure. Actuation member 16 and confinement structure 12 provide a system 10 that allows for controllable deformation of a variety of different containers all on one machine, i.e., a carrier. With a particular container 14 containing a desired fluid or substance 50 to be expelled selected, the container 14 may be positioned within the interior 26 of confinement structure 12, as shown in FIG. 44, and with the container 14 and confinement structure 12 all on one machine, i.e., a carrier.

In some embodiments, it may be desirable for the substance 50 to exit container 14 adjacent or approximately adjacent exit aperture 32 of confinement structure 12. For example, it may be desirable for the substance 50 within container 14 to be expelled from container 14 not more than approximately three (3) inches from second end 42 of container 14. When a substance 50 such as an adhesive is to be placed on small easily movable parts that are to be assembled, the parts can be moved in close proximity to the exit aperture 32. As the adhesive is expelled, it is applied to the parts being assembled and held together by the adhesive. In some embodiments, this immediate dispensing on to a part that is easily moved to the exit aperture requires no other fitment.

Figure 49:
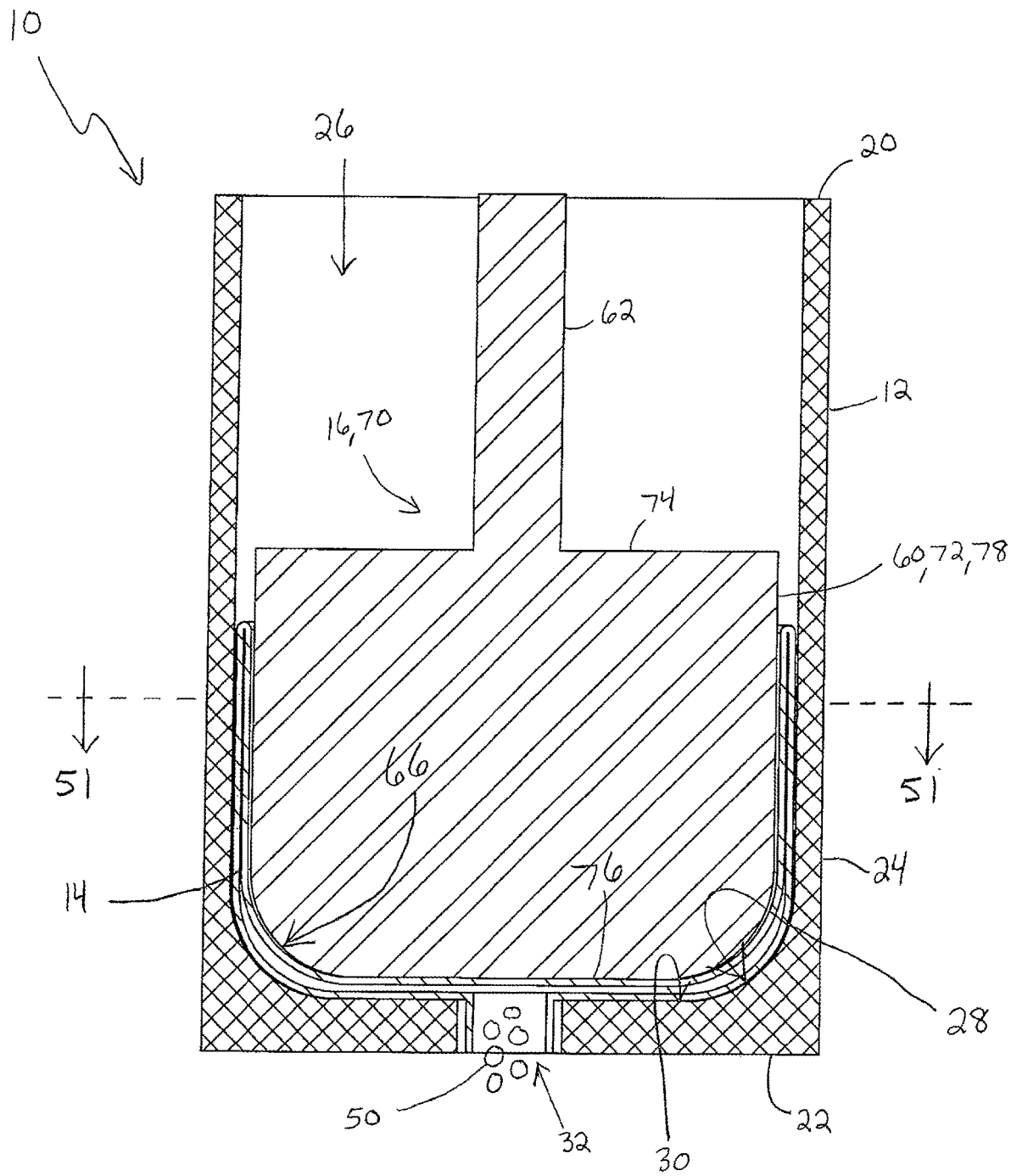
FIG. 49 is an assembled, cross-sectional view of the substance dispensing system of FIG. 43 with an actuation member in a second position deforming a portion of a container in accordance with an embodiment of the present invention.
Figure 50:
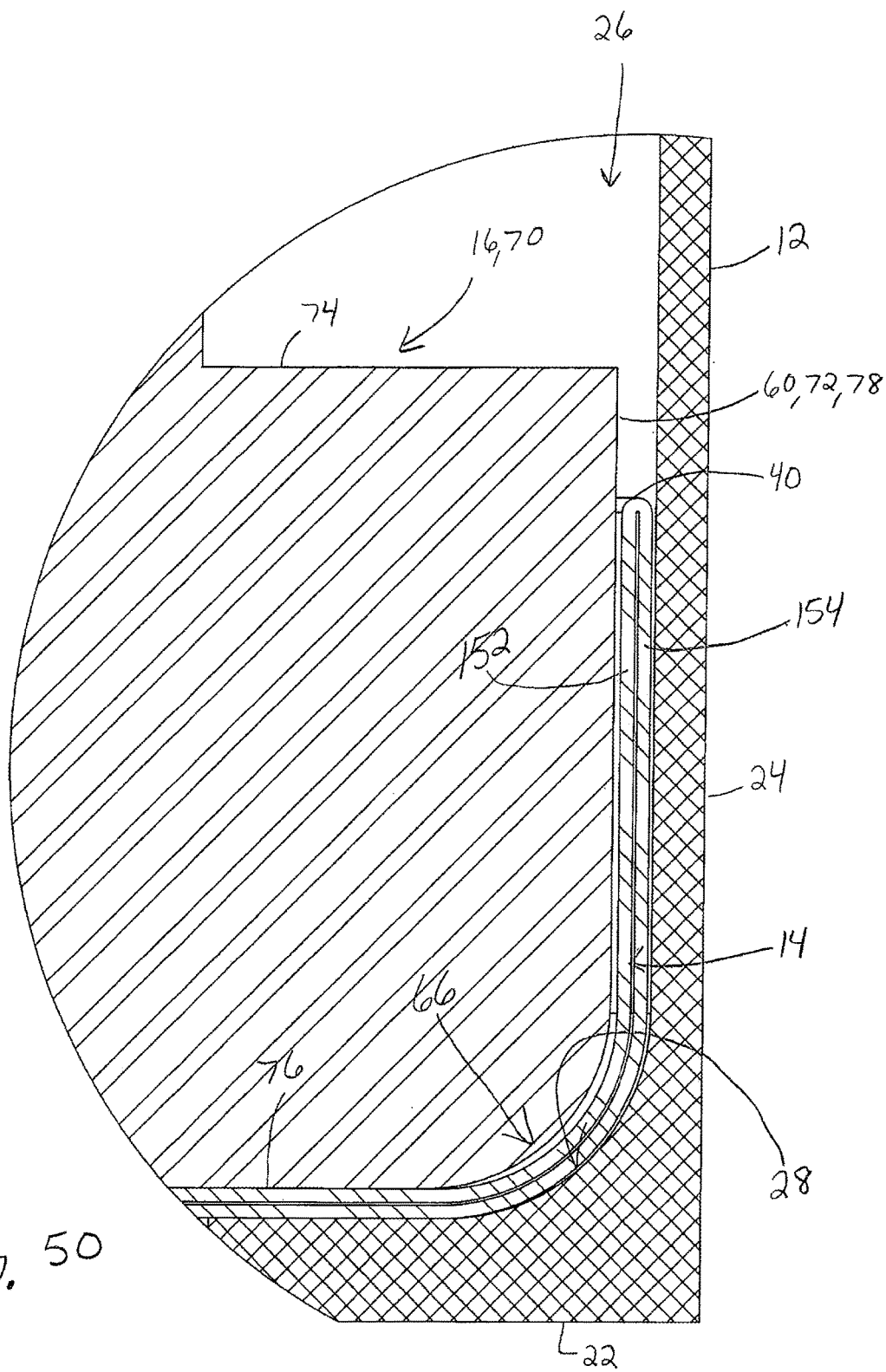
FIG. 50 is an enlarged, partial cross-sectional view of the substance dispensing system of FIG. 49 with an actuation member in a second position deforming a portion of a container in accordance with an embodiment of the present invention.

In one embodiment, referring to FIG. 49, a substance 50 may be expelled from container 14 and out exit aperture 32 of confinement structure 12. Advantageously, the carrier 17 and system 10 of the present disclosure allows the system 10 to be easily moved to a desired location for a dispensing procedure. In another embodiment, referring to FIG. 47, a nozzle 180, or other device, may be placed in communication with second end 42 of container 14. For example, when placing a substance 50 on a substrate either the substance 50 or the substrate or both must be movable and positionable to allow for the mating of the substance 50 to the substrate. Advantageously, the carrier 17 and system 10 of the present disclosure allows the system 10 to be easily moved to a desired location for a dispensing procedure. When a substance 50, such as a caulking, is to be placed in an expansion joint of a concrete substrate, the location of the expansion joint is neither movable nor positionable. The components of substance dispensing system 10 can be fitted with a nozzle 180 and can be placed on movable carrier 17 of the present disclosure. The movable carrier 17 holding the dispensing system 10 may be situated so that the tip opening of the nozzle 180 may be placed in the opening of the expansion joint. The nozzle 180 directs the caulking to be expelled into the expansion joint opening. As the movable carrier 17 is moved along in a direction parallel to the expansion joint, the tip of the nozzle 180 is capable of moving and/or sliding in the opening. The caulking is expelled out of the nozzle 180 and fills the expansion joint. When a smaller opening in the concrete requires less caulking, a smaller nozzle 180 with a smaller tip opening can be utilized to reduce the size of the bead diameter.

In some embodiments, it may be desirable for the substance 50 to exit container 14 and travel through a channel or flexible tubing, such as hose 170, for a distance before being dispensed as shown in FIG. 25. In one embodiment, it may be desirable for the substance 50 within container 14 to be expelled from container 14 more than approximately three (3) inches from second end 42 of container 14. For example, at a construction site, it is often desirable to drill multiple holes in concrete and then fill those holes with an adhesive to hold a fastener. Placing the components of the substance dispensing system 10 and the actuating drive system to the exact location of each hole would be cumbersome. Advantageously, the carrier 17 and system 10 of the present disclosure allows the system 10 to be easily moved to a desired location for a dispensing procedure. Holes are frequently required in vertical surfaces such as when mounting guardrails. It is not practical to maneuver all the components of the substance dispensing system 10 into a position to dispense adhesive into each hole. It is advantageous to attach a flexible hose, such as hose 170, to the dispensing container. The flexible tubing can be easily positioned at the exact location of each hole and thereby expel the adhesive into the hole. The present disclosure provides a substance dispensing system 10 that needs only be in the vicinity of the holes and the adhesive can then travel a distance in the tubing to reach the exact location of each hole. Furthermore, advantageously, the carrier 17 and system 10 of the present disclosure allows the system 10 to be easily moved to a desired location for a dispensing procedure.

In one embodiment, referring to FIGS. 1 and 25, a hose 170 may be placed in communication with second end 42 of container 14 such that container interior 46 is in fluid communication with an exit portion or second hose end 174 of hose 170 via the hose 170. In this manner, a substance 50 may travel a desired distance away from substance dispensing system 10 before being dispensed. For example, when applying a roofing system, many adhesives and coatings are dispensed onto a large substrate. Frequently, adhesive manufacturers specify exact patterns of application for their adhesives. Insulation adhesive, for instance, must be applied in a ribbon or bead pattern with exact spacing. A common pattern requires that a 4 foot by 4 foot insulation board be adhered by placing ribbons or beads of adhesive no more than twelve (12) inches apart. Frequently, a serpentine pattern is used to place the adhesive in a continuous bead over the surface of a substrate. It is not practical to move the entire substance dispensing system 10 and the drive system in this serpentine pattern to dispense the adhesive per the manufacturers' specifications. By attaching a flexible hose 170 to the container 14, the adhesive can travel a distance from the components of the substance dispensing system 10 to the desired location. As the operator moves the exit portion 174 of hose 170 in the specified pattern, the adhesive exits the exit portion 174 and is placed in the pattern as specified. The addition of the flexible hose which requires the adhesive to travel a distance before exiting the dispensing system requires more force from the actuating member and the drive system. The increased force causes the pressure against the container interior 46 and the confinement structure 12 to increase. Conventional systems fail when this pressure is applied and the conventional systems are therefore not sufficient to perform such operations. Furthermore, advantageously, the carrier 17 and system 10 of the present disclosure allows the system 10 to be easily moved to a desired location for a dispensing procedure.

Referring to FIG. 44, with container 14 positioned within interior 26 of confinement structure 12 on carrier 17, actuation member 16 may be placed relative to container 14, on carrier 17, such that actuation member 16 is slidable or movable between a first position (FIG. 44) in which actuation member 16 is adjacent first end 40 of container 14 and a second position (FIGS. 49 and 50) in which actuation member 16 is adjacent second end 42 of container 14. In one embodiment, the first position is an initial position and the second position is a position in which container 14 has been fully deformed and substance 50 has been completely expelled from container 14, i.e., substance 50 is expelled from container 14 such that no significant portion of substance 50 remains within container 14 and is not expelled from container 14.

Advantageously, the systems of the present disclosure provide a deformable container and a method of dispensing wherein, during dispensing, an actuation member is continuously free of contact with the fluid or substance within the container and the actuation member only contacts the exterior surface of the deformable container.

Figure 45:
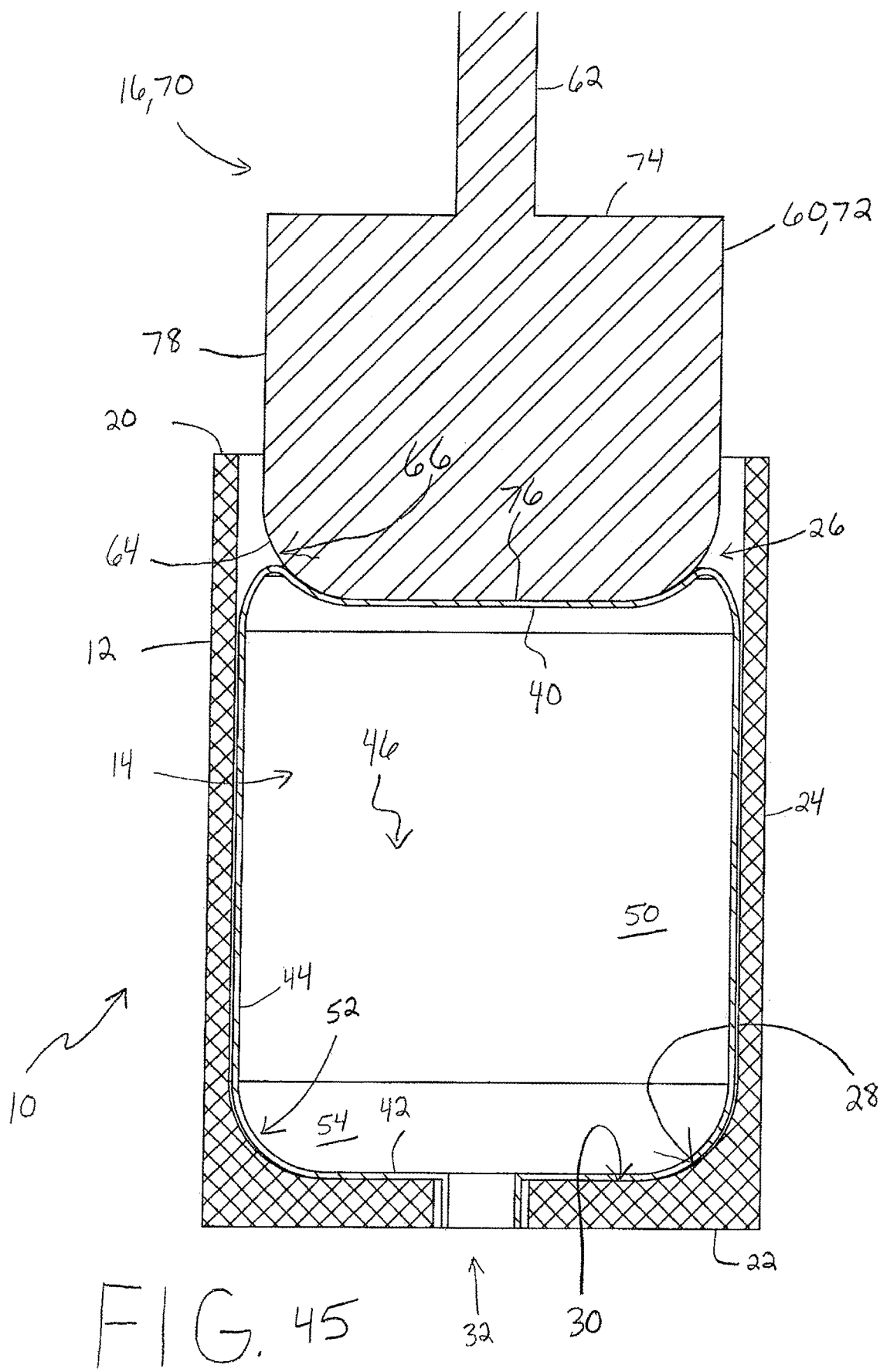
FIG. 45 is an assembled, cross-sectional view of the substance dispensing system of FIG. 43 with an actuation member in a first intermediate position deforming a portion of a container in accordance with an embodiment of the present invention.
Figure 46:
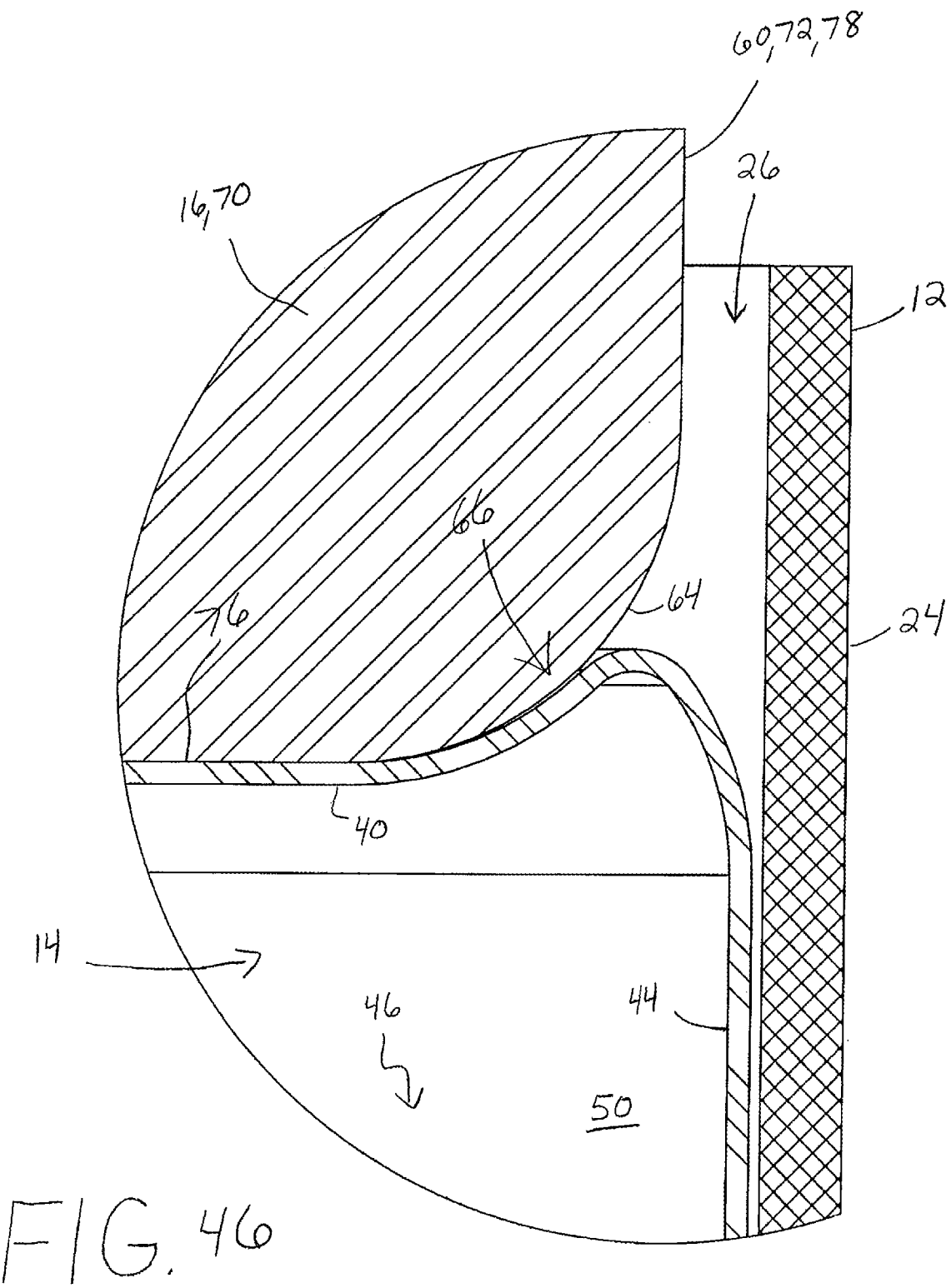
FIG. 46 is an enlarged, partial cross-sectional view of the substance dispensing system of FIG. 45 with an actuation member in a first intermediate position deforming a portion of a container in accordance with an embodiment of the present invention.

Next, referring to FIGS. 44-46, a drive system may be used to begin advancing actuation member 16 from the first position (FIG. 44) towards the second position. As actuation member 16 moves from the first position towards the second position, actuation member 16 deforms container 14 to begin expelling substance 50 from container 14. Advantageously, a system 10 of the present disclosure ensures that the actuation member 16 is continuously free of contact with a fluid 50. Advantageously, a system 10 of the present disclosure ensures that the actuation member 16 only contacts an exterior surface of the container 14.

In one embodiment, a valve may be placed in communication with second end 42 of container 14. The valve may be operable between an open position in which substance 50 is able to flow out container 14 and a closed position in which substance 50 is maintained within container 14.

Figure 47:
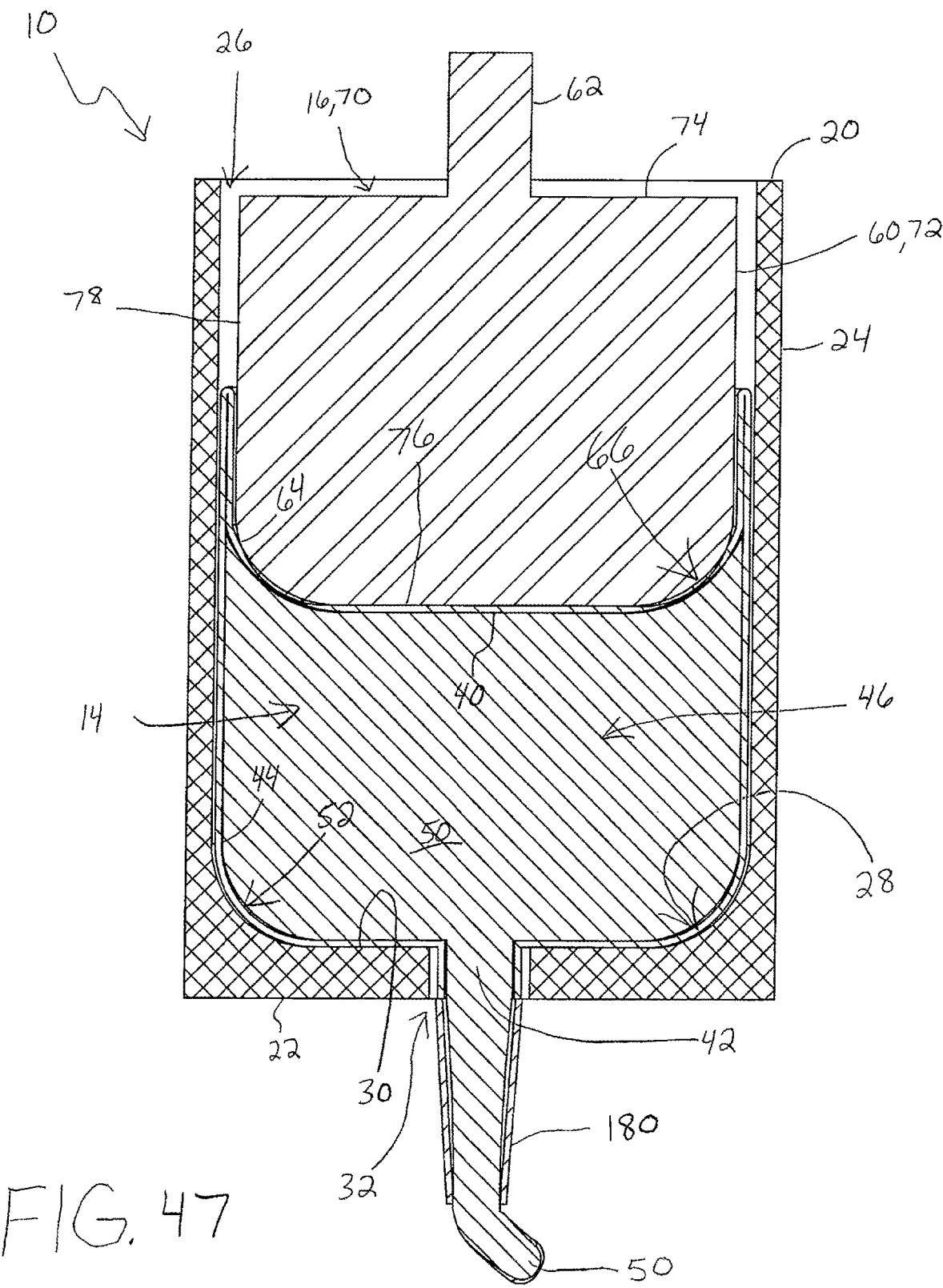
FIG. 47 is an assembled, cross-sectional view of the substance dispensing system of FIG. 43, with an actuation member in a second intermediate position deforming a portion of a container, illustrating a nozzle in fluid communication with the container in accordance with an embodiment of the present invention.
Figure 48:
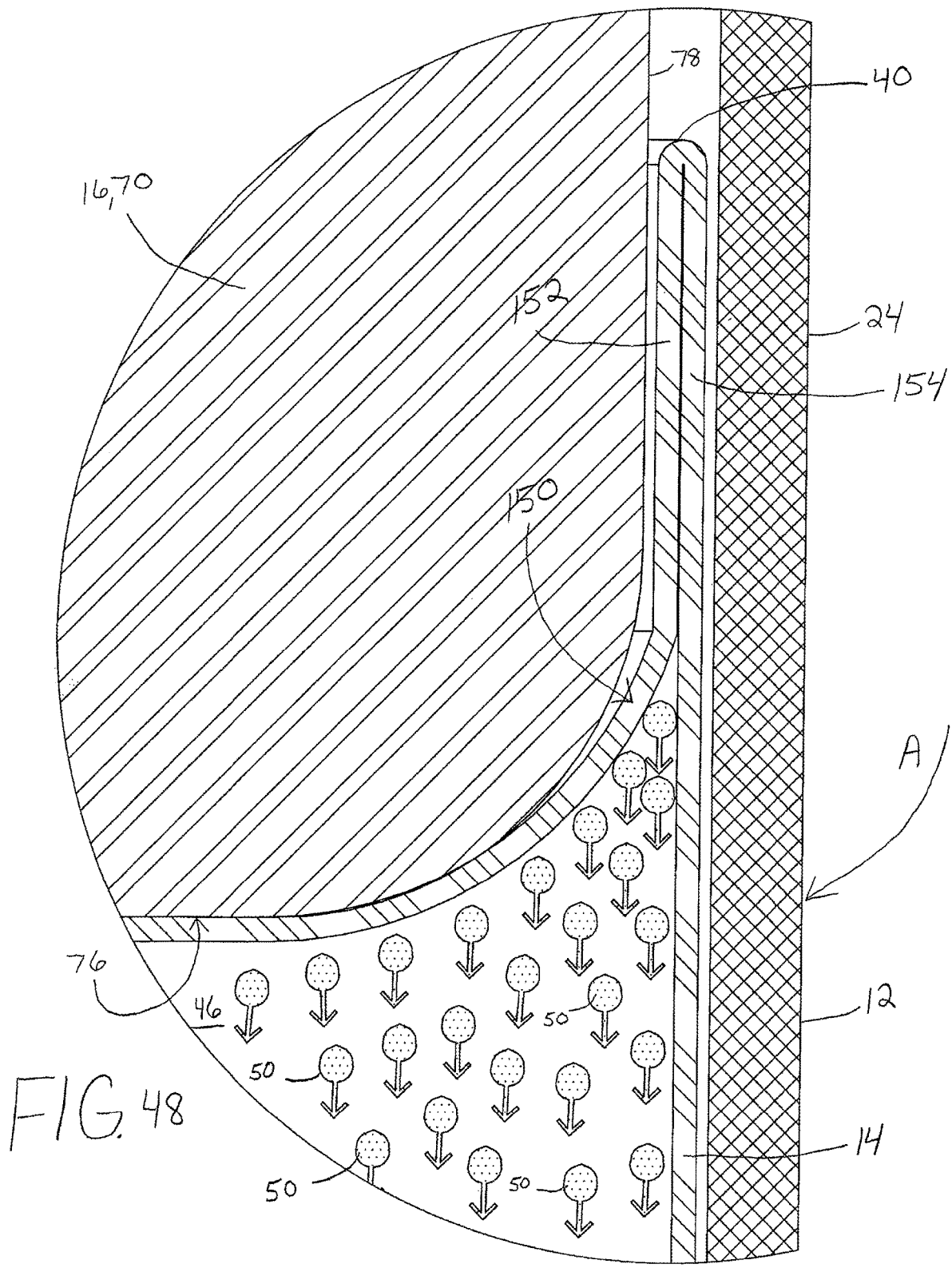
FIG. 48 is an enlarged, partial cross-sectional view of the substance dispensing system of FIG. 47, with an actuation member in a second intermediate position deforming a portion of a container, illustrating the actuation member controllably deforming the container such that a deformed portion of the container acts as a wiping means to empty a substance from the container in accordance with an embodiment of the present invention.

Referring to FIGS. 47 and 48, as actuation member 16 continues to slide or move from the first position towards the second position, actuation member 16 controllably deforms container 14 such that a portion of first end 40 of container 14 extends past actuation member 16 and acts as a wiping means to empty substance 50 from container 14. For example, in one embodiment, a portion of first end 40 of container 14 extends past distal wall 76 of plunger 70 towards proximal wall 74 of plunger 70 as shown in FIGS. 47 and 48.

The portion of first end 40 of container 14 that extends past distal wall 76 of plunger 70 towards proximal wall 74 of plunger 70 is disposed between sidewall 24 of confinement structure 12 and plunger sidewall 78 as shown in FIGS. 47 and 48. With the portion of first end 40 of container 14 extending past distal wall 76 of plunger 70 towards proximal wall 74 of plunger 70, first end 40 of container 14 includes a concave shape 150. Concave shape 150 of first end 40 of container 14 acts as a wiping means to empty substance 50 from container 14. For example, first end 40 of container 14 is deformed by actuation member 16 such that first end 40 includes a first deformed wall portion 152 and a second wall portion 154. Sidewall 24 of confinement structure 12 provides a stable wall surface which maintains second wall portion 154 in a configuration as shown in FIGS. 44-50 as actuation member 16 moves from the first position to the second position.

In this manner, first deformed wall portion 152 is deformed by actuation member 16 such that first deformed wall portion 152 folds up upon second wall portion 154 as shown in FIGS. 47-50. First deformed wall portion 152 is brought in direct contact with second wall portion 154 such that there is no space between first deformed wall portion 152 and second wall portion 154. In this manner, all of substance 50 is forced in a direction generally along arrow A (FIG. 48) and away from concave shape 150 towards second end 42 of container 14. Furthermore, such controlled deformation of container 14 as described above ensures that no substance 50 is lost in the deformed corners of container 14. In this manner, with actuation member 16 in the second position (FIGS. 49 and 50), substance 50 is completely, efficiently, and in a controlled manner expelled from container 14.

In one embodiment, exterior profile 66 of actuation member 16 is shaped to substantially correspond to interior profile 28 of confinement structure 12. In this manner, actuation member 16 and confinement structure 12 together allow for substance 50 to be completely expelled from container 14 with actuation member 16 in the second position as shown in FIG. 50, i.e., substance 50 is expelled from container 14 such that no significant portion of substance 50 remains within container 14. Additionally, actuation member 16 and confinement structure 12 together provide a system that allows for controllable deformation of a container 14 such that a portion of the container 14 acts as a wiping means to empty a substance from the container 14.

In one embodiment, as discussed above, plunger sidewall 78 has a constant diameter between proximal wall 74 and distal wall 76 to control deformation of a container 14 such that a portion of the container 14 acts as a wiping means to empty a substance from the container 14 as described above. Referring to FIG. 50, the constant diameter of plunger sidewall 78 between proximal wall 74 and distal wall 76 of plunger 70 ensures that first deformed wall portion 152 and second wall portion 154 of container 14 are maintained in concave shape 150 and disposed between sidewall 24 of confinement structure 12 and plunger sidewall 78. In this manner, with actuation member 16 in the second position (FIGS. 49 and 50), substance 50 is completely, efficiently, and in a controlled manner expelled from container 14 such that a portion of the container 14 acts as a wiping means to empty a substance from the container 14. Additionally, referring to FIG. 50, in this manner, actuation member 16 and confinement structure 12 provide a system that allows for controlled and consistent deformation of a container, i.e., each and every container is deformed in the same, controlled manner to completely expel a substance from the container.

As discussed above, sidewall 24 of confinement structure 12 provides a stable wall surface which maintains second wall portion 154 in a configuration as shown in FIGS. 44-50 as actuation member 16 moves from the first position to the second position. In this manner, first deformed wall portion 152 is deformed by actuation member 16 such that first deformed wall portion 152 folds up upon second wall portion 154 as shown in FIGS. 47-50. First deformed wall portion 152 is brought in direct contact with second wall portion 154 such that there is no space between first deformed wall portion 152 and second wall portion 154.

Figure 51:
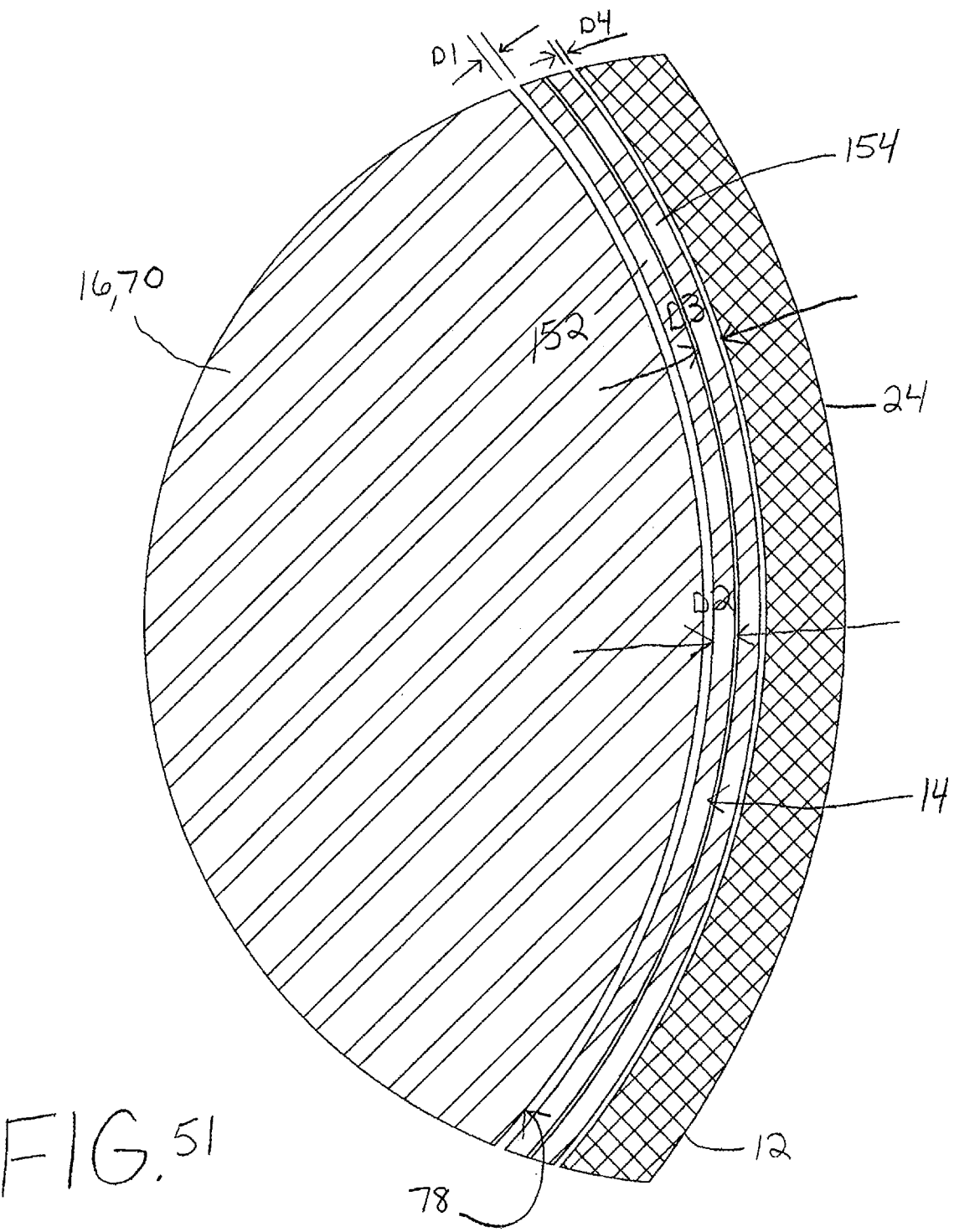
FIG. 51 is an enlarged, partial cross-sectional view taken along line 51-51 of FIG. 49 in accordance with an embodiment of the present invention.

Referring to FIG. 51, in one embodiment, the interspace between actuation member 16 and confinement structure 12 will now be discussed. A first portion of this interspace is a distance between plunger sidewall 78 and first deformed wall portion 152 of container 14, e.g., distance D1. In some embodiments, distance D1 is approximately zero as the pressure of the substance 50 inside container 14 acts on first deformed wall portion 152 to resist the advancing force of actuation member 16. As actuation member 16 advances, first deformed wall portion 152 of container 14 continues to fold up upon second wall portion 154 as shown in FIGS. 47-50 such that first deformed wall portion 152 is brought in direct contact with second wall portion 154 such that there is no space between first deformed wall portion 152 and second wall portion 154. In one embodiment, a second portion of the interspace between actuation member 16 and confinement structure 12 is the thickness of first deformed wall portion 152, e.g., distance D2. Another portion of the interspace between actuation member 16 and confinement structure 12 is the thickness of second wall portion 154, e.g., distance D3. In one embodiment, another portion of the interspace is a distance between second wall portion 154 and sidewall 24 of confinement structure 12, e.g., distance D4. In one embodiment, the sum of distances D1-D4 is approximately four (4) to seven (7) times the thickness of deformable wall 44 of container 14.

In an exemplary embodiment, a drive system of a fluid dispensing system 10 of the present disclosure could be part of a hydraulic drive system in accordance with the hydraulic drive system described in the U.S. patent application Ser. No. 13/837,504, filed Mar. 15, 2013, entitled "Substance Dispensing System", the entire disclosure of which is hereby expressly incorporated herein by reference.

In an exemplary embodiment, actuation member 16 is configured with confinement structure 12 to provide a substance dispensing system 10 that allows for controllable deformation of a container 14 such that a portion of the container 14 acts as a wiping means to empty a substance from the container 14 as described in more detail in U.S. patent application Ser. No. 13/834,921, filed Mar. 15, 2013, entitled "Container and Substance Dispensing System", the entire disclosure of which is hereby expressly incorporated herein by reference.

Figure 27:
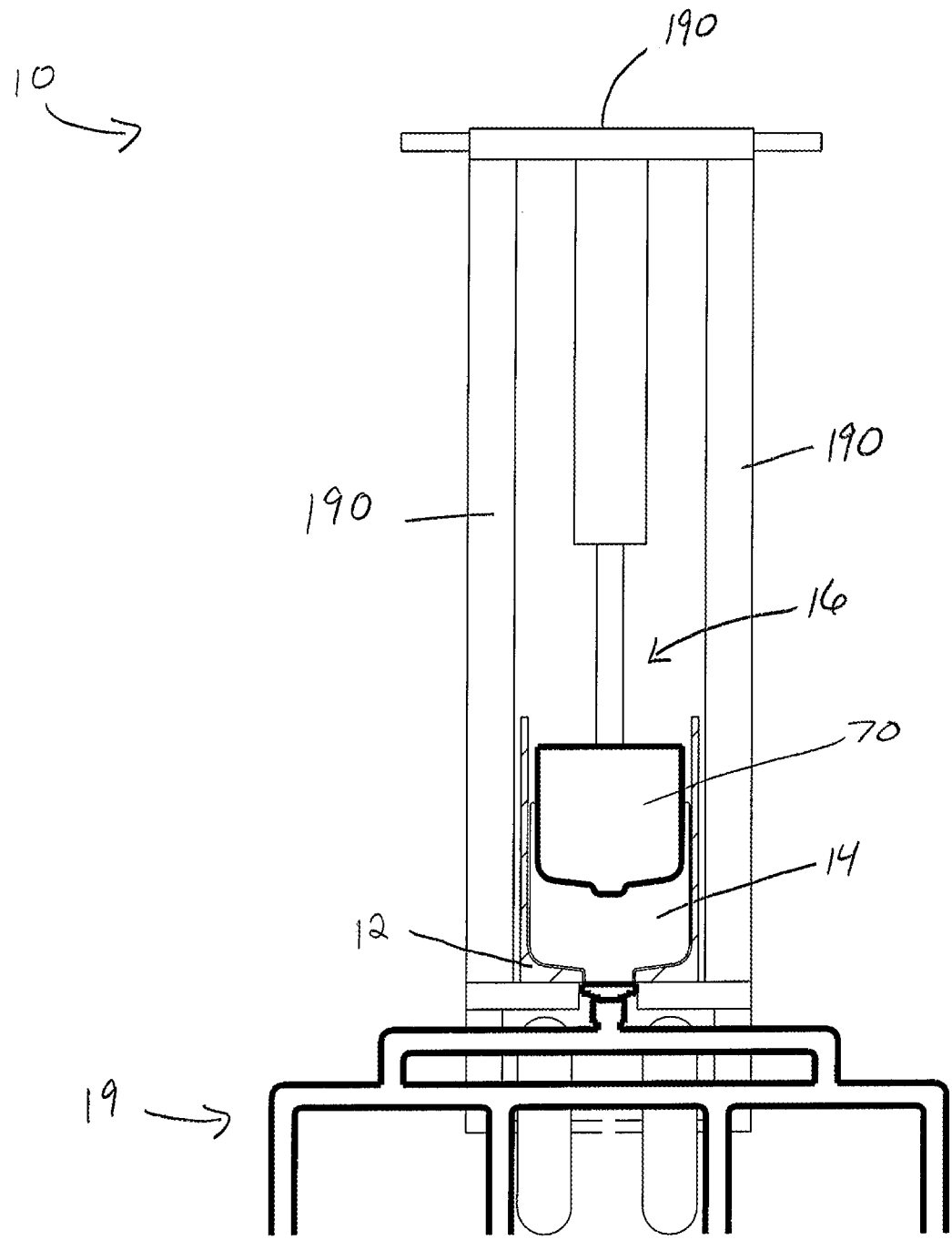
FIG. 27 is a perspective view of an integral fluid dispensing system with a dispensing manifold in accordance with another embodiment of the present invention.
Figure 28:
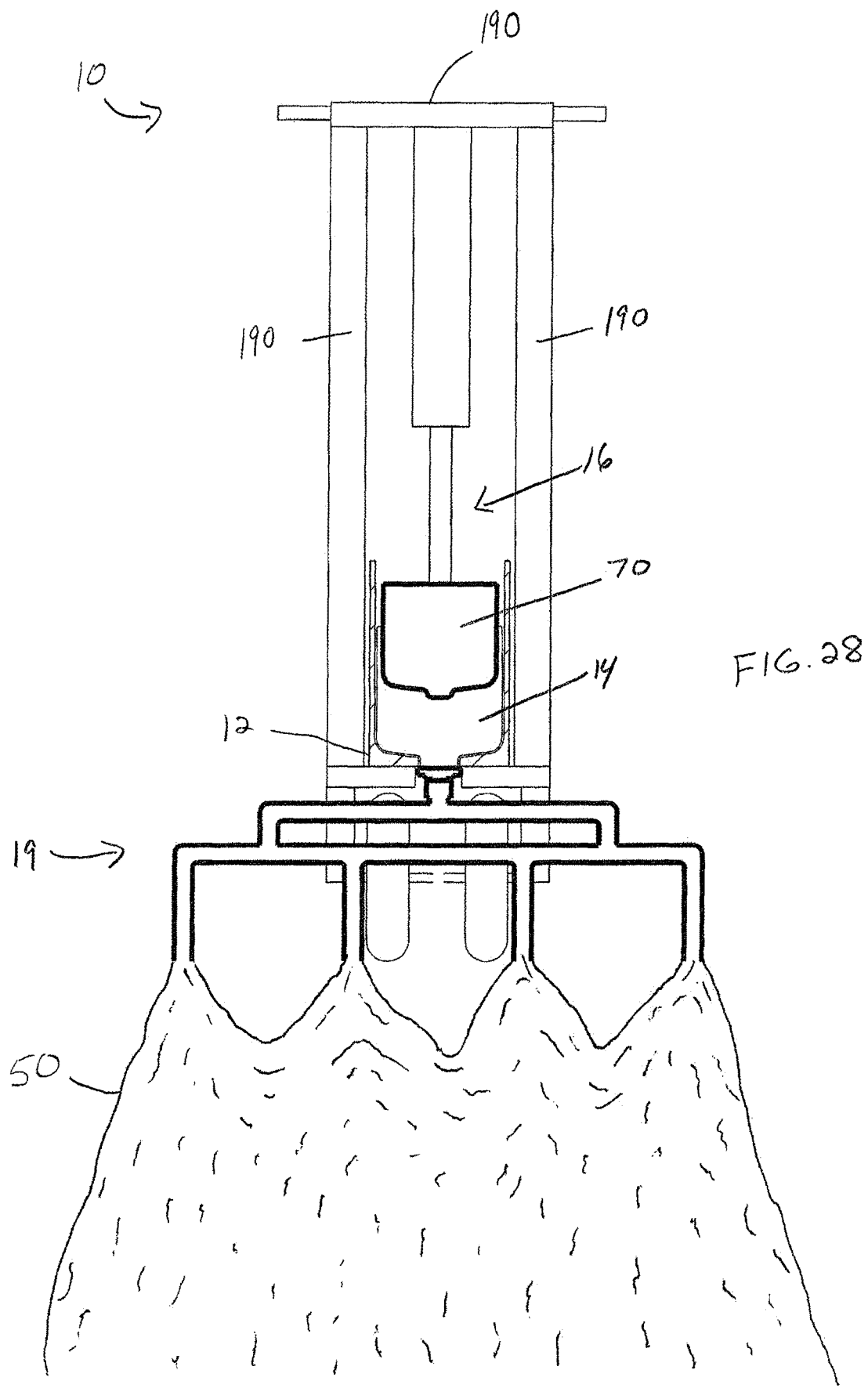
FIG. 28 is a perspective view of an integral fluid dispensing system with a dispensing manifold in accordance with another embodiment of the present invention.
Figure 29:
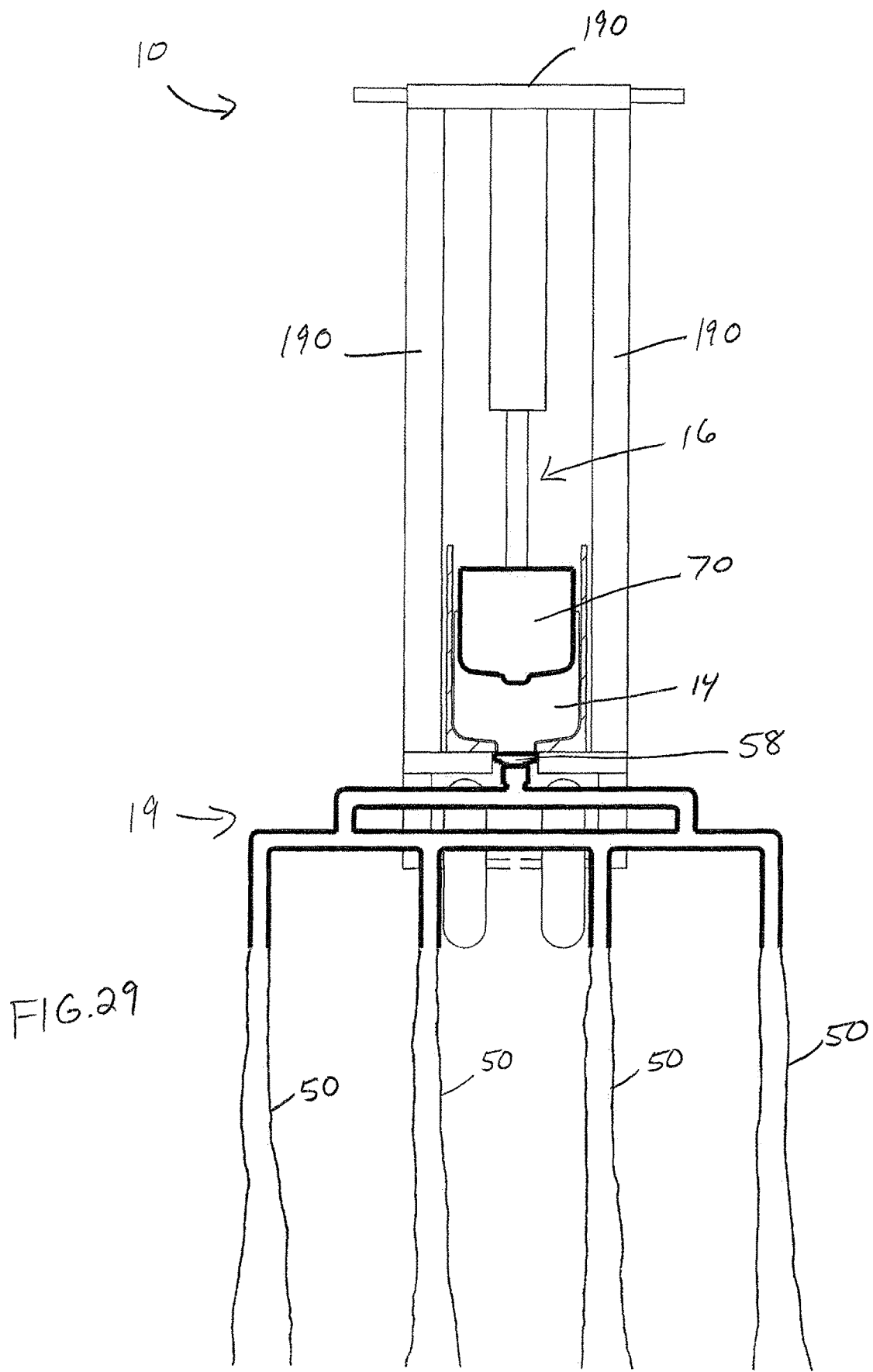
FIG. 29 is a perspective view of an integral fluid dispensing system with a dispensing manifold in accordance with another embodiment of the present invention.

Referring to FIGS. 27-29, in an exemplary embodiment, a system of the present disclosure provides a single force generation mechanism, a container holding a fluid or substance, and dispensing mechanisms all on one machine, i.e., a carrier 17, and includes a dispensing manifold 19 of the present disclosure that is removable connectable to a single container 14 having a single exit portion 55. The dispensing manifolds 19 of the present disclosure provide a single container 14 having a single exit portion 55 with one or more outlets from which a fluid or substance can be controllably dispensed as described above.

Referring to FIGS. 18-24, the force generation system 90 is also in communication with the second deformable container 214. The force generation system 90 is transitionable between the first setting in which the second deformable container 214 holds the second fluid and the second setting in which the force generation system 90 actuates a second actuator which exerts a force deforming the second deformable container 214 thereby expelling the second fluid from the second deformable container 214.

Figure 20:
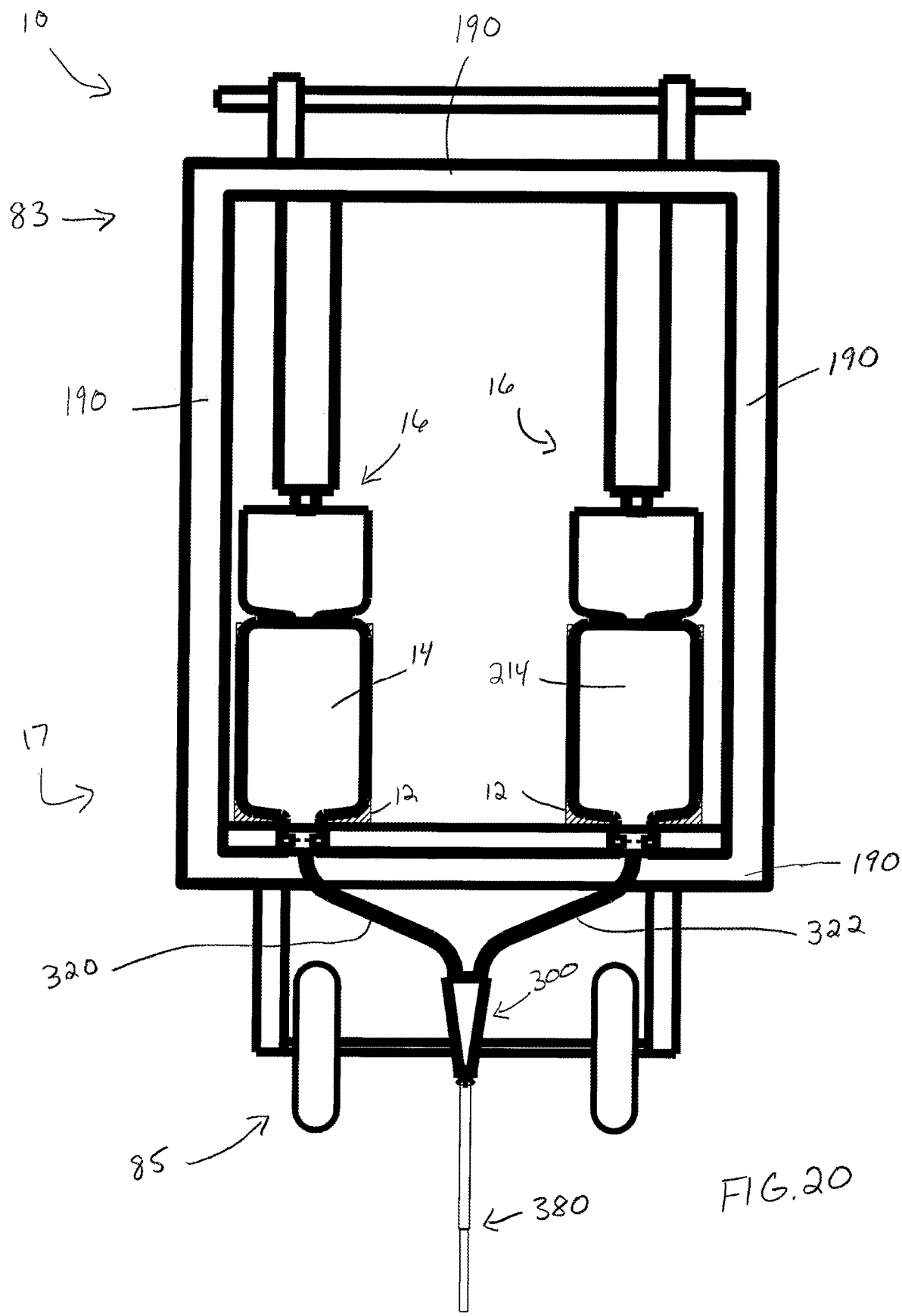
FIG. 20 is a perspective view of an integral fluid dispensing system with two containers in accordance with another embodiment of the present invention.
Figure 21:
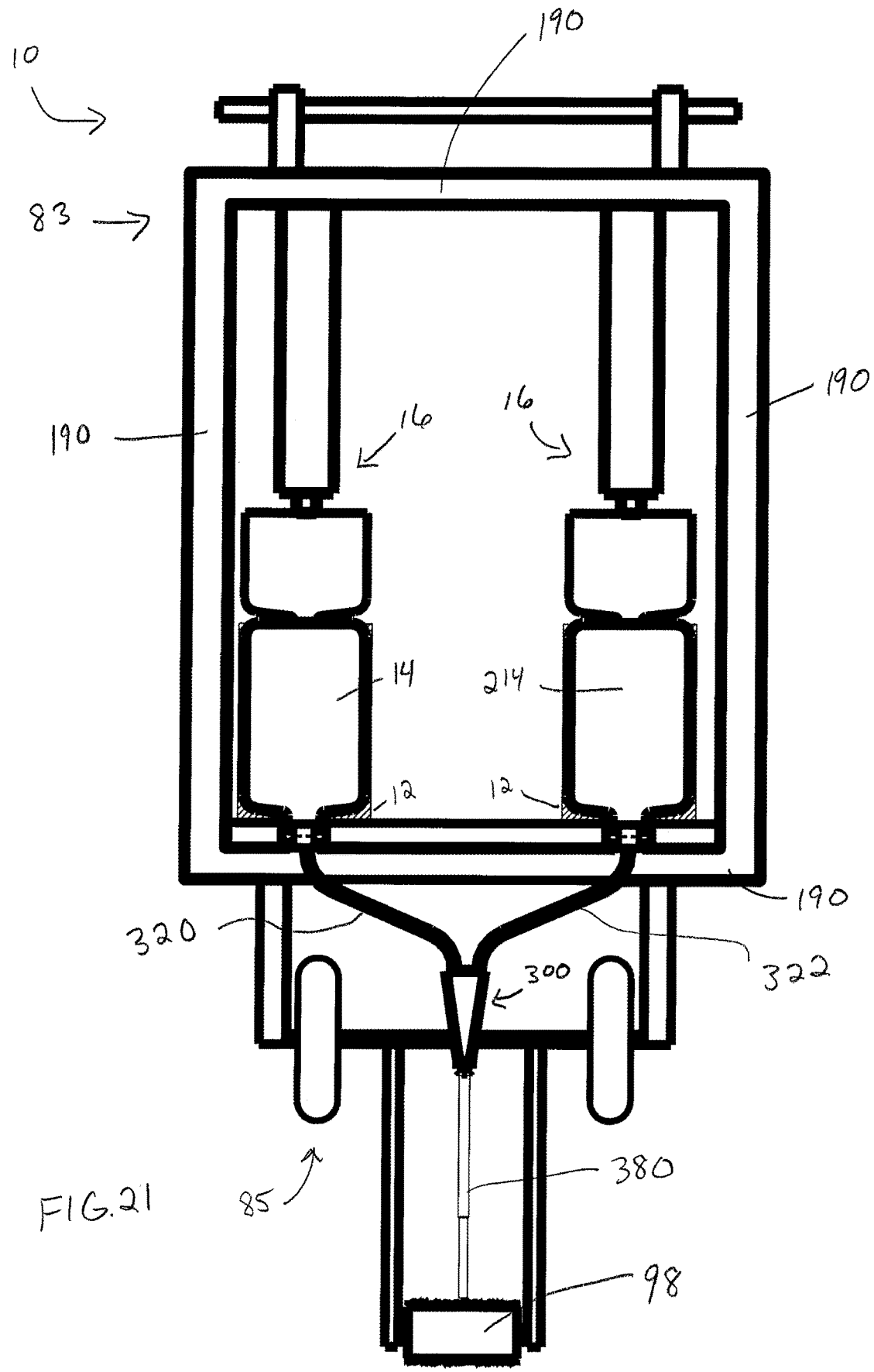
FIG. 21 is a perspective view of an integral fluid dispensing system with two containers in accordance with another embodiment of the present invention.
Figure 22:
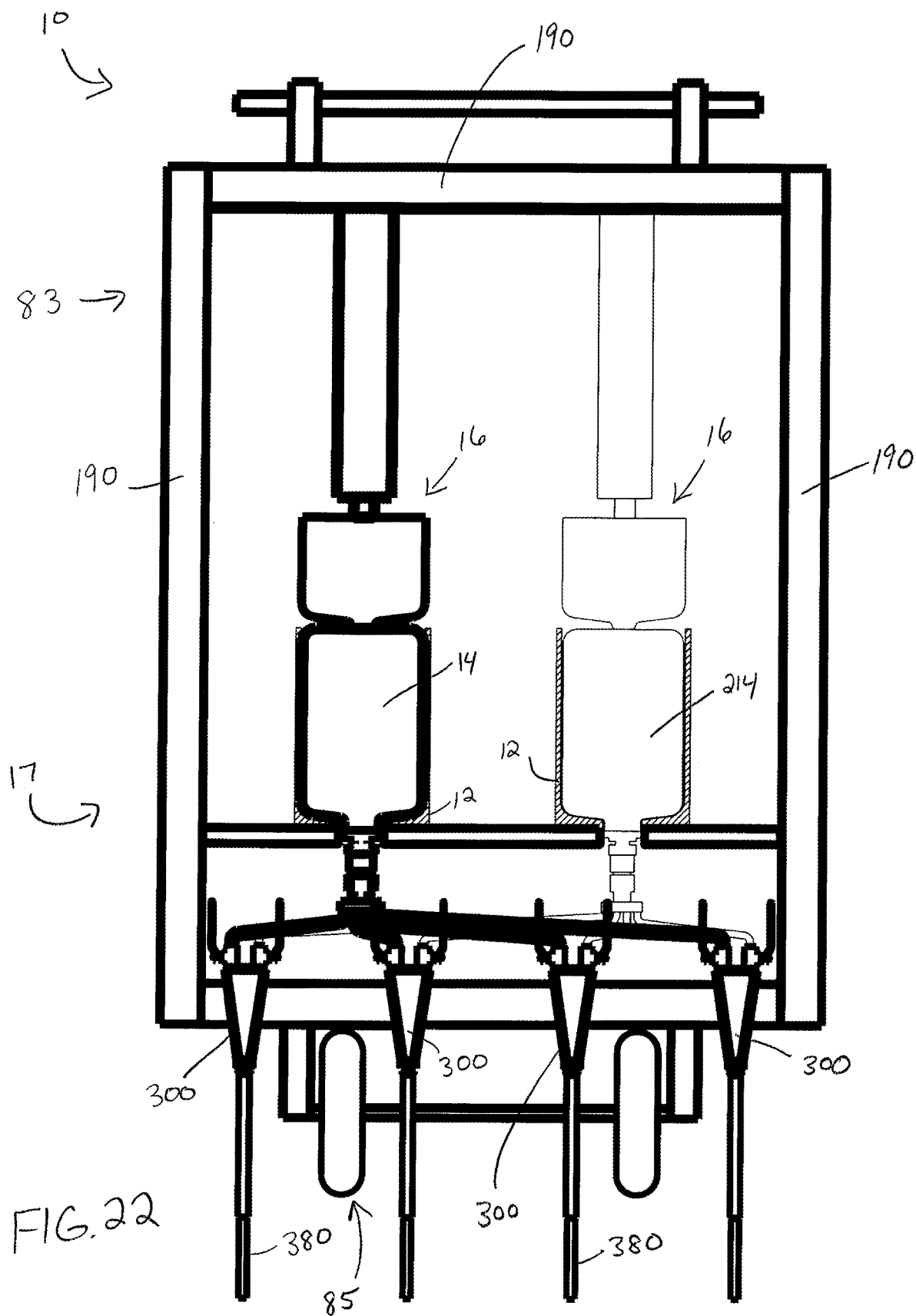
FIG. 22 is a perspective view of an integral fluid dispensing system with two containers in accordance with another embodiment of the present invention.
Figure 23:
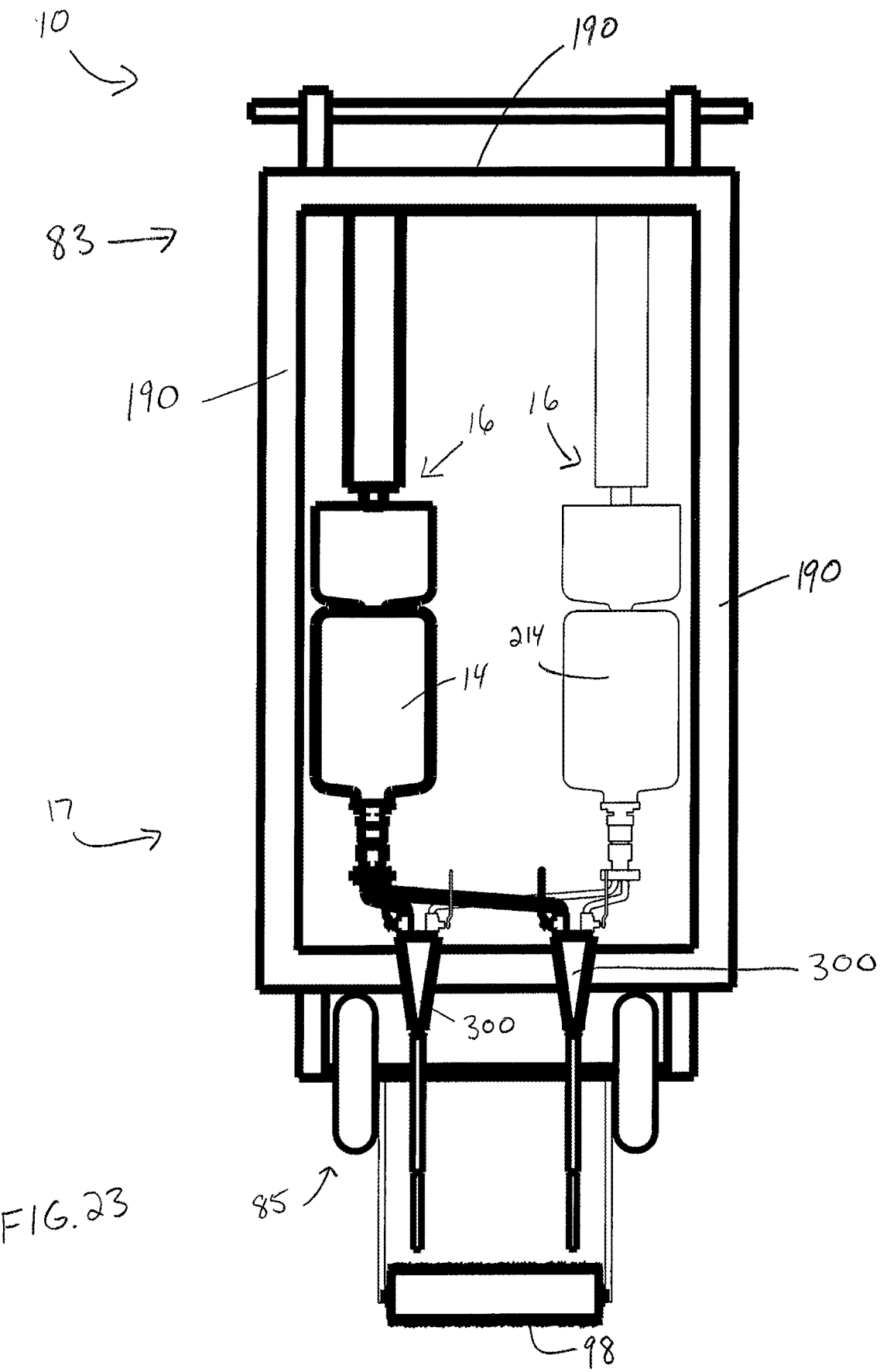
FIG. 23 is a perspective view of an integral fluid dispensing system with two containers in accordance with another embodiment of the present invention.
Figure 24:
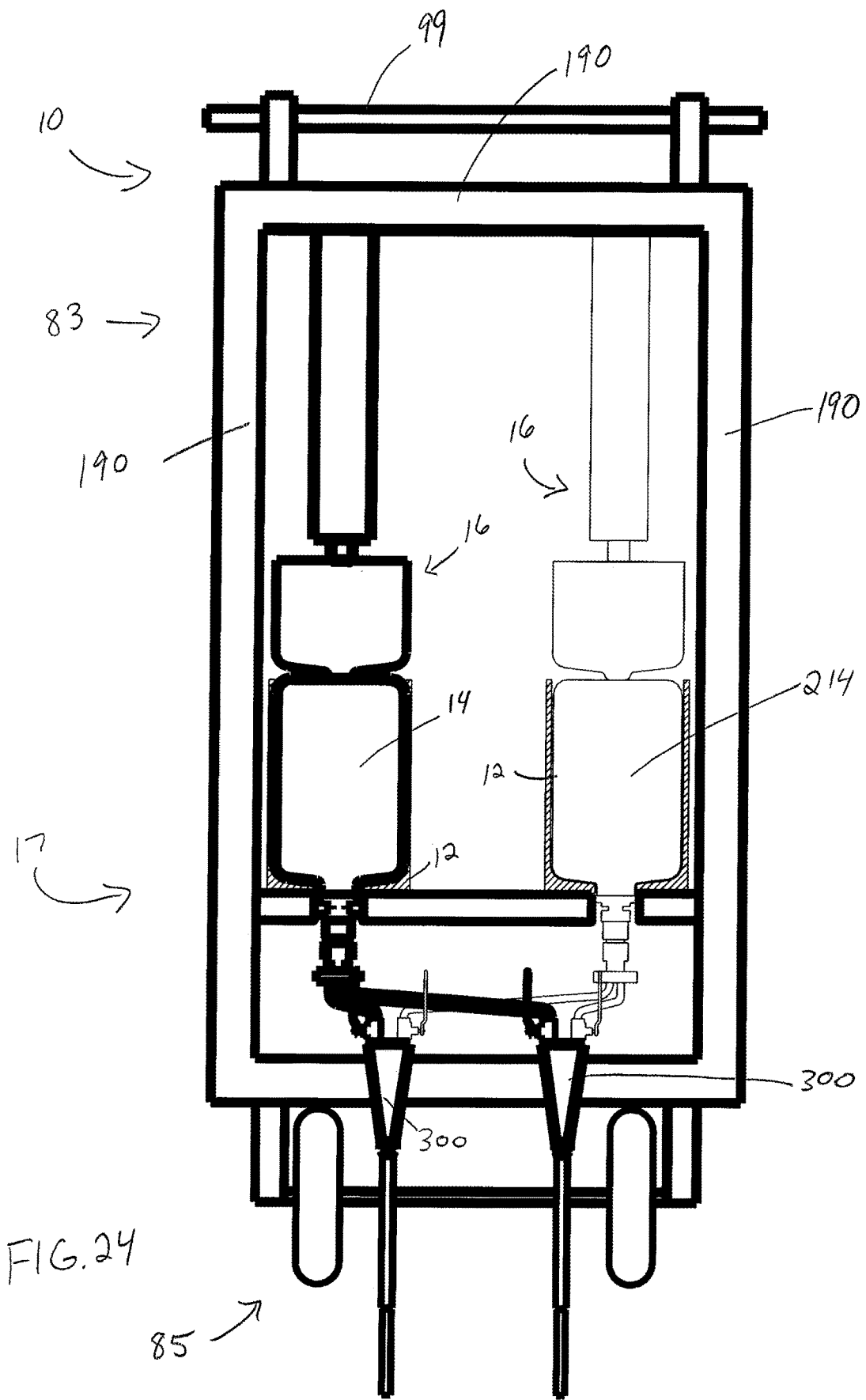
FIG. 24 is a perspective view of an integral fluid dispensing system with two containers in accordance with another embodiment of the present invention.
Figure 52:
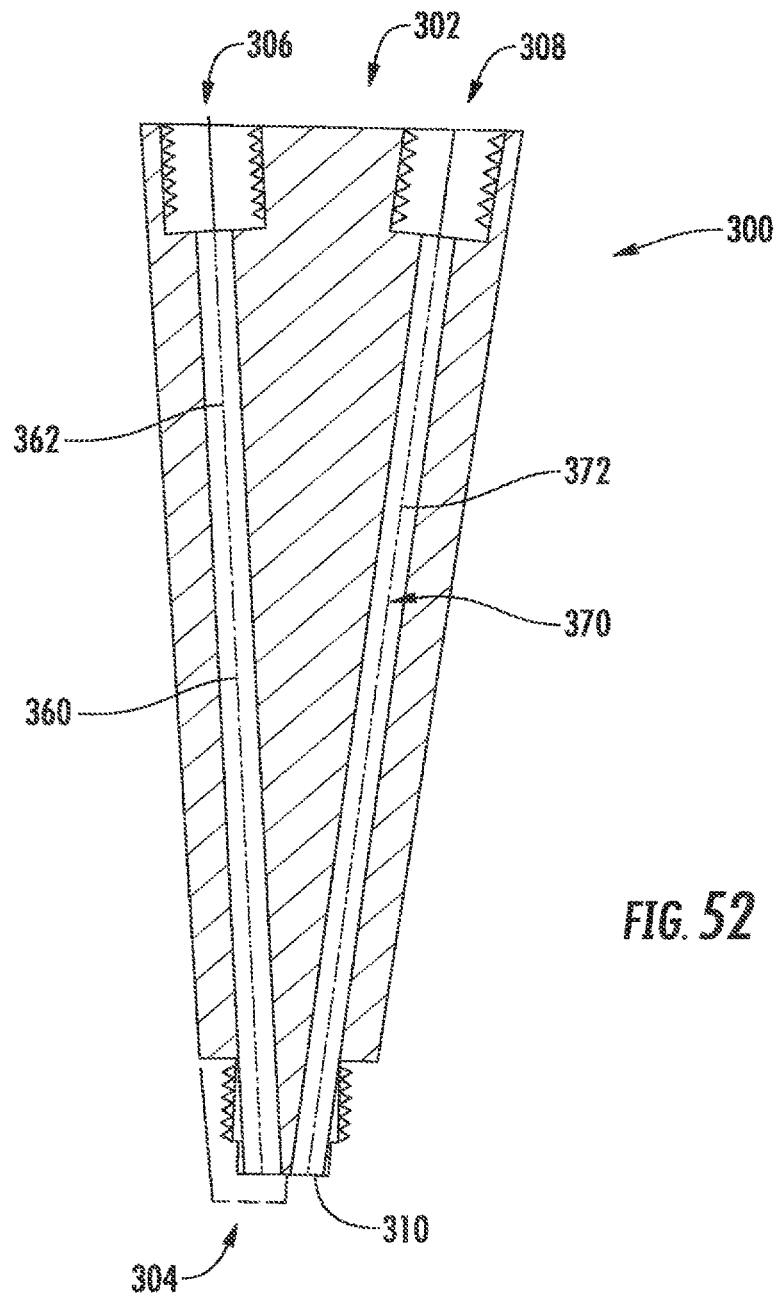
FIG. 52 is a cross-sectional view of an embodiment of a vee manifold in accordance with an embodiment of the present invention.

Referring to FIGS. 20 and 52, in an exemplary embodiment of the present disclosure, a system of the present disclosure includes a first receiving portion 300 having a first end 302 and a second end 304. In one embodiment, the first end 302 includes a first inlet 306 and a second inlet 308 and the second end 304 includes an outlet 310.

Referring to FIG. 20, a first line 320 connects the second end 42 of the first container 14 to the first inlet 306 of the first receiving portion 300. In this manner, the first receiving portion 300 receives a first fluid 50 from the first container 14 via the first line 320. Furthermore, referring to FIG. 20, a second line 322 connects the second end 242 of the second container 214 to the second inlet 308 of the first receiving portion 300. In this manner, the first receiving portion 300 receives a second fluid 248 via the second line 322.

In one exemplary embodiment, the first receiving portion 300 is a vee manifold having a first channel 360 (FIG. 52) and a second channel 370 (FIG. 52). In such embodiments, the first line 320 is in fluid communication with the first channel 360 and the second line 322 is in fluid communication with the second channel 370 of the vee manifold. In one embodiment, a first part of a fluid or first fluid 50 flows through the first channel 360 and the second part of a fluid or second fluid 248 flows through the second channel 370 of the vee manifold and are mixed within a mixing portion 380, e.g., a static mixing tip or mixing nozzle or other mixing portion, that is attachable at the outlet or second end 304 of the first receiving portion 300, to create a first mixed fluid.

In one embodiment, a mixing nozzle or portion 380 is removably connected to the outlet 310 of the first receiving portion 300. In such an embodiment, the first channel 360 and the second channel 370 of the first receiving portion 300 flow into the mixing portion 380 and the mixing portion 380 mixes the first fluid 50 and the second fluid 248 to create a first mixed fluid.

In one embodiment, the first receiving portion 300 includes a first channel 360 defining a first channel longitudinal axis 362 that is linear and a second channel 370 defining a second channel longitudinal axis 372 that is linear. For example, referring to FIG. 52, in one exemplary embodiment, a first channel longitudinal axis 362 is linear and a second channel longitudinal axis 372 is linear of the first receiving portion 300. In other embodiments, the first receiving portion 300 can be other receiving portions, mixing devices, and/or manifolds.

Advantageously, a system of the present disclosure is compatible with additional containers holding additional fluids and additional fluid receiving portions. For example, referring to FIG. 17, in one exemplary embodiment, a single carrier 17 of the present disclosure supports eight separate containers, eight actuation members, eight dispensing units, four receiving portions, e.g., four vee manifolds, and a single force generation system.

FIG. 17 further illustrates one of the unique dispensing systems and methods of the present disclosure by employing a system that conveniently utilizes the advantages of the present disclosure with multiple deformable containers. Two component fluids mix together to create a third fluid. Utilizing deformable containers provides a clean dependable mixing of two component mixtures. This embodiment also provides accurate mixing as the plungers for fluid one are the same size as the plungers of fluid thereby necessarily displacing and extruding the two components in the same volume. Conventional canister dispensing utilizes plungers traveling into the canister and in contact with the fluid or substance. The leakage of one of the fluids is not only messy but produces a mismatch in the third fluid. The deformable containers prevent leakage of one component thereby ensuring accuracy of fluid mixtures. The embodiment of FIG. 17 further ensures accuracy by utilizing the one deformable container to one fluid outlet. FIG. 17 shows eight deformable containers with four of the containers holding a first component and the other four containers holding a second component.

Attempting to dispense fluids which exit one container and then travel through a splitting manifold to multiple outlets provides opportunity for unbalanced dispensing. Fluid always take the path of least resistance therefore a small difference in the flow paths of a fluid will result in more fluid flowing out one aperture than another. This is often not a problem with single component fluids, but when dispensing multiple component materials such as epoxies, two part adhesives, or two part coatings, the off ratio mixture is a significant problem. In floor coating for instance, if one container dispensing a first resin component to four separate mixing manifolds this first component liquid resin will flow to the path of least resistance. One gallon of fluid resin may flow out as 1 pint to the first mixing manifold 1½ pints to the second mixing manifold, 2½ pints to the third mixing manifold, and 3 pints to the fourth mixing manifold. As the second container dispenses one gallon of fluid hardener to cure this floor coating the fluid will also flow to the path of least resistance in which case the first mixing manifold may receive 4 pints, the second mixing manifold receiving 1½ pints, the third manifold receives 2 pints, and the fourth mixing manifold receives ½ pint. While both the fluid containers dispensed 1 gallon of material the ratios of fluid resin to fluid hardener would 4:1, 1:1, 1.25:1, and 6:1 respectively. This would make the floor coating very hard very quickly in some areas and possibly never cure in other areas because of the off-ratio mixture. By maintaining a ratio of one deformable container to one mixing manifold and by keeping the containers, plungers, and speed of displacement the same for all containers, the result is four mixed fluid streams that are at a 1:1 ratio. Certainly, one skilled in this art will recognize that specific off ratio applications can be achieved by utilizing containers that are matched with the desired ratio, but the mix will be dispensed as specified not by chance. The advantage of this multiple mixed fluid streams is speed of application over those systems utilizing a single stream of mixed fluid.

Referring to FIGS. 31, 32, 34, and 35, in some exemplary embodiments, a force generation system of the present disclosure is in selective communication with both a first container 14 and a second container 214. In such an embodiment, the force generation system selectively exerts a force deforming one of the first container 14 and the second container 214.

In such embodiments of the present disclosure, a first deformable container is connected to a first hose and a second deformable container is connected to a second hose whereby both the first deformable container and the second deformable container are in selective fluid communication with a third hose. The first hose has an inline first check valve 422 and the second hose has an inline second check valve 424. The first check valve 422 allows flow of a fluid from the first deformable container and prevents the flow of a fluid from the second or third hoses into the first hose and therefore the first container. The second check valve 424 allows flow of a fluid from the second deformable container and the second hose while preventing flow of a fluid from the first or third hoses into the second hose and therefore the second container. As the first hydraulic cylinder exerts force on the first deformable container the increase of fluid pressure extends from the first hose to the second and third hoses. The increase in pressure on the second hose causes the second check valve 424 to close thereby preventing flow of the fluid to the second container. This blockage of flow into the second hose and the second deformable container allows the second deformable container to be disconnected from the second hose. The empty second deformable container can then be replaced and connected with a full third deformable container. When the first deformable container is fully dispensed of fluid then the second hydraulic cylinder can be actuated to begin dispensing fluid from the second deformable container through the second hose. As the fluid flow moves down the second hose it reaches the second check valve 424 and causes it to open. As fluid pressure extends from the second hose to the first and third hoses the increase in pressure in the first hose causes the first check valve 422 to close thereby preventing flow of the fluid to the first container. This blockage of flow into the first deformable container allows the first deformable container to be disconnected from the first hose. An empty first deformable container can then be replaced and connected with a full forth deformable container. This arrangement eliminates the down time associated with the removal and replacement time of a single deformable container embodiment. Construction sites require much set up time each day to get to the point where actual dispensing of a fluid can occur. The reduction of this dispensing time is extremely valuable. When caulking and sealing side walls and windows for instance, a caulking mechanic is often up in a lift. While it takes time to prepare the operator for safely getting into position, it is also imperative that the operator not be in this precarious position any longer than is necessary. The operator in the lift has the third hose for dispensing the caulking into cracks in a wall and around windows. A second operator stands ready to exchange the empty deformed containers with filled deformable containers. By setting up the deformable containers in this arrangement the time spent on the lift can be reduced and safety increased. Those skilled in the art of such an arrangement will appreciate that the operation of these two separate machines can be automated rather than manual operation by the second operator. This automation would further reduce the downtime associated with the exchange of empty deformed containers for full deformable containers.

Figure 31:
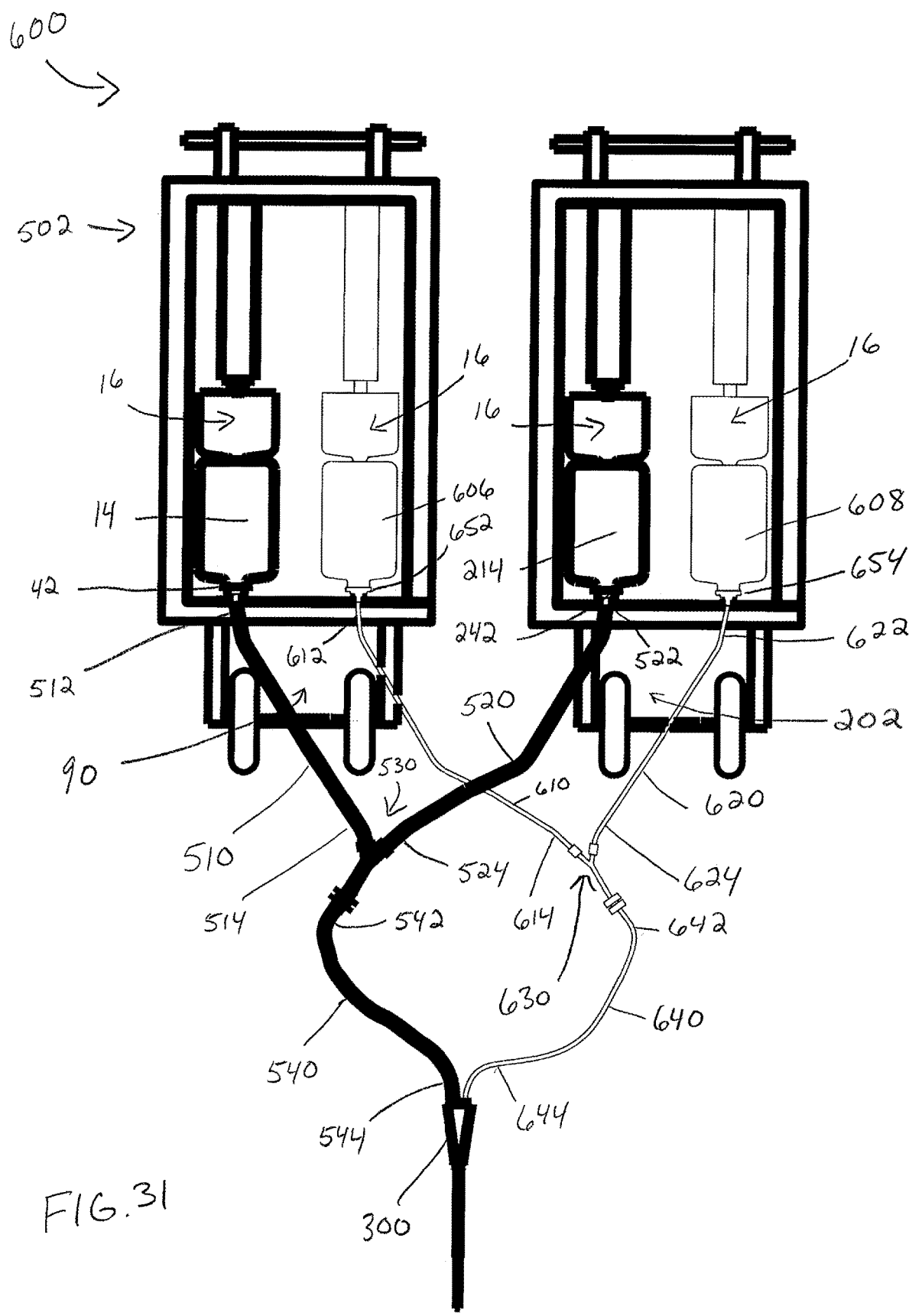
FIG. 31 is a perspective view of a fluid dispensing system in accordance with an embodiment of the present invention.
Figure 32:
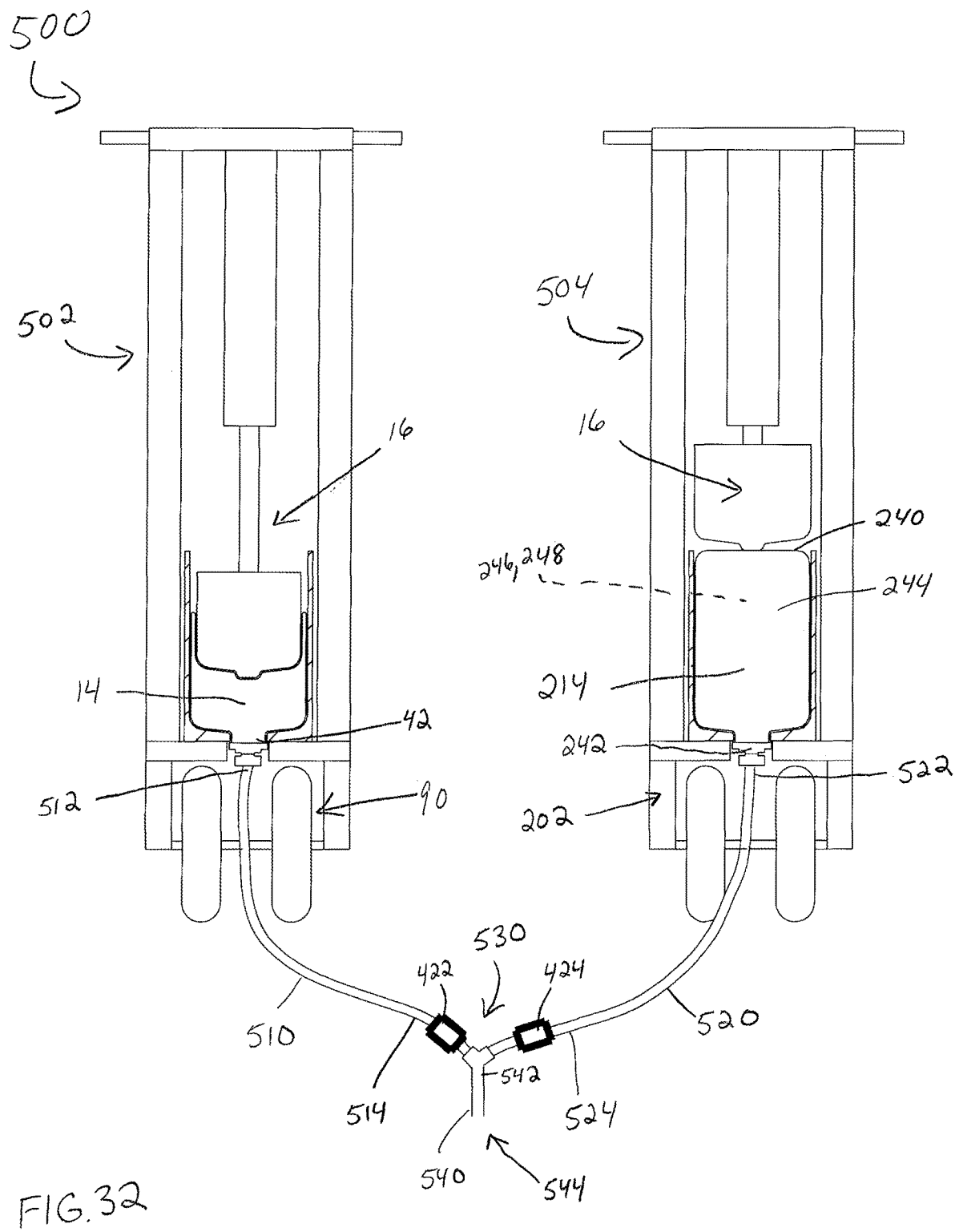
FIG. 32 is a perspective view of a fluid dispensing system in accordance with an embodiment of the present invention.

Referring to FIGS. 31 and 32, in one exemplary embodiment, a system of the present disclosure provides a system that allows for a continuous flow a substance.

Referring to FIG. 32, in one exemplary embodiment, a continuous flow system 500 includes a first container 14 and a second container 214. In one embodiment, the first container 14 is disposed on a first portion of a first carrier 502 and a second container 214 is disposed on a first portion of a second carrier 504. In other embodiments, the first container 14 and the second container 214 are each disposed on the same carrier.

Referring to FIG. 32, the system 500 includes a first hose 510 having a first hose end 512 and a second hose end 514. In one embodiment, the first hose end 512 is removably connectable to the second end 42 of the first container 14. Referring to FIG. 32, the system 500 also includes a second hose 520 having a third hose end 522 and a fourth hose end 524. In one embodiment, the third hose end 522 is removably connectable to the fourth end, i.e., the second end 242, of the second container 214. The system 500 also includes a valve system 530 that is transitionable between a first position and a second position and a dispensing hose 540. In one embodiment, the dispensing hose 540 includes an inlet 542 and an outlet 544 and the inlet 542 of the dispensing hose 540 is in selective communication with the first hose 510 and the second hose 520 via the valve system 530.

In one embodiment, with the valve system 530 in the first position, the first hose 510 is in fluid communication with the dispensing hose 540 and the second hose 520 is not in fluid communication with the dispensing hose 540. In this manner, the first hose 510 provides continuous flow of a fluid or substance 50 from a first container 14 to the dispensing hose 540 for dispensing of the fluid 50 to a surface for a desired application while the second container 214 can be reloaded.

In one embodiment, with the valve system 530 in the second position, the second hose 520 is in fluid communication with the dispensing hose 540 and the first hose 510 is not in fluid communication with the dispensing hose 540. In this manner, the second hose 520 provides continuous flow of a fluid or substance 248 from a second container 214 to the dispensing hose 540 for dispensing of the fluid 248 to a surface for a desired application while the first container 14 can be reloaded.

In this manner, the continuous flow system 500 provides a continuous flow of a fluid or substance to the dispensing hose 540 for dispensing of a fluid to a surface for a desired application. At all times one of the containers provides a continuous flow of a fluid while the other container can be reloaded.

Referring to FIG. 31, in another exemplary embodiment, a continuous flow system 600 includes a third container 606 and a fourth container 608. In one embodiment, the third container 606 is disposed on a second portion of a first carrier 502 and a fourth container 608 is disposed on a second portion of a second carrier 504.

Referring to FIG. 31, the system 600 includes a first hose 610 having a first hose end 612 and a second hose end 614. In one embodiment, the first hose end 612 is removably connectable to a second end 652 of the third container 606. Referring to FIG. 31, the system 600 also includes a second hose 620 having a third hose end 622 and a fourth hose end 624. In one embodiment, the third hose end 622 is removably connectable to a second end 654 of the fourth container 608. The system 600 also includes a valve system 630 that is transitionable between a first position and a second position and a dispensing hose 640. In one embodiment, the dispensing hose 640 includes an inlet 642 and an outlet 644 and the inlet 642 of the dispensing hose 640 is in selective communication with the first hose 610 and the second hose 620 via the valve system 630.

In one embodiment, with the valve system 630 in the first position, the first hose 610 is in fluid communication with the dispensing hose 640 and the second hose 620 is not in fluid communication with the dispensing hose 640. In this manner, the first hose 610 provides continuous flow of a fluid or substance from a third container 606 to the dispensing hose 640 for dispensing of the fluid to a surface for a desired application while the fourth container 608 can be reloaded.

In one embodiment, with the valve system 630 in the second position, the second hose 620 is in fluid communication with the dispensing hose 640 and the first hose 610 is not in fluid communication with the dispensing hose 640. In this manner, the second hose 620 provides continuous flow of a fluid or substance from a fourth container 608 to the dispensing hose 640 for dispensing of the fluid to a surface for a desired application while the third container 606 can be reloaded.

In this manner, the continuous flow system 600 provides a continuous flow of a fluid or substance to the dispensing hose 640 for dispensing of a fluid to a surface for a desired application. At all times one of the containers provides a continuous flow of a fluid while the other container can be reloaded.

Referring to FIGS. 31 and 32, the systems 500, 600 of the present disclosure includes a single force generation system per carrier, containers holding a fluid or substance, and dispensing mechanisms all on one machine, i.e., a carrier, in accordance with the exemplary embodiments discussed above.

Advantageously, the systems of the present disclosure allow an operator to manipulate the systems and dispensing portions of the present disclosure to dispense or expel a fluid over a substrate or surface in any desired pattern or bead or spray for a particular application. For example, referring to FIGS. 10 and 29, in an exemplary embodiment, a system of the present disclosure can be used to expel a bead pattern over a substrate. Also, referring to FIGS. 4, 25, and 28, in other exemplary embodiments, a system of the present disclosure can be used to expel a splatter or spray pattern over a substrate. In other exemplary embodiments, referring to FIG. 33, a system of the present disclosure can be used to expel an air assisted splatter or spray pattern over a substrate.

Referring to FIGS. 31 and 32, in one embodiment, a second force generation system 202 is disposed on a portion of a second carrier 504 and is in communication with a second deformable container 206. The second force generation system 202 is transitionable between a third setting in which the second deformable container 206 holds a second fluid and a fourth setting in which the second force generation system 202 actuates a second actuator 16 which exerts a force deforming the second deformable container 206 thereby expelling the second fluid from the second deformable container 206.

Referring to FIGS. 31 and 32, in one embodiment, the first force generation system 90 is also in communication with a third deformable container 606. The first force generation system 90 is transitionable between the first setting in which the third deformable container 606 holds a third fluid and the second setting in which the first force generation system 90 actuates a third actuator 16 which exerts a force deforming the third deformable container 606 thereby expelling the third fluid from the third deformable container 606.

Referring to FIGS. 31 and 32, in one embodiment, the second force generation system 202 is in communication with a fourth deformable container 608. The second force generation system 202 is transitionable between the third setting in which the fourth deformable container 608 holds a fourth fluid and the fourth setting in which the second force generation system 202 actuates a fourth actuator 16 which exerts a force deforming the fourth deformable container 608 thereby expelling the fourth fluid from the fourth deformable container 608.

Referring to FIGS. 31-32, in an exemplary embodiment of the present disclosure, a system of the present disclosure provides a second force generation mechanism, a second container holding a fluid or substance, and dispensing mechanisms all on one machine, i.e., a second carrier 504.

For example, in an exemplary embodiment, referring to FIGS. 31-32, a second container 214 has a second container first end 240, a second container second end 242, and a second container deformable wall 244 extending therebetween and defining a second container interior 246 adapted to hold a second fluid or substance 248.

Advantageously, a system of the present disclosure includes a single force generation mechanism 90, one or more deformable containers holding a fluid or substance, and dispensing mechanisms all on one machine, i.e., a carrier 17, to controllably deform the one or more deformable containers. In one exemplary embodiment, referring to FIG. 15, a single force generation mechanism 90 is able to actuate a plurality of actuation members, e.g., a first actuation member and a second actuation member, which exert a force deforming the respective deformable containers thereby expelling a fluid from the respective deformable containers.

Figure 15:
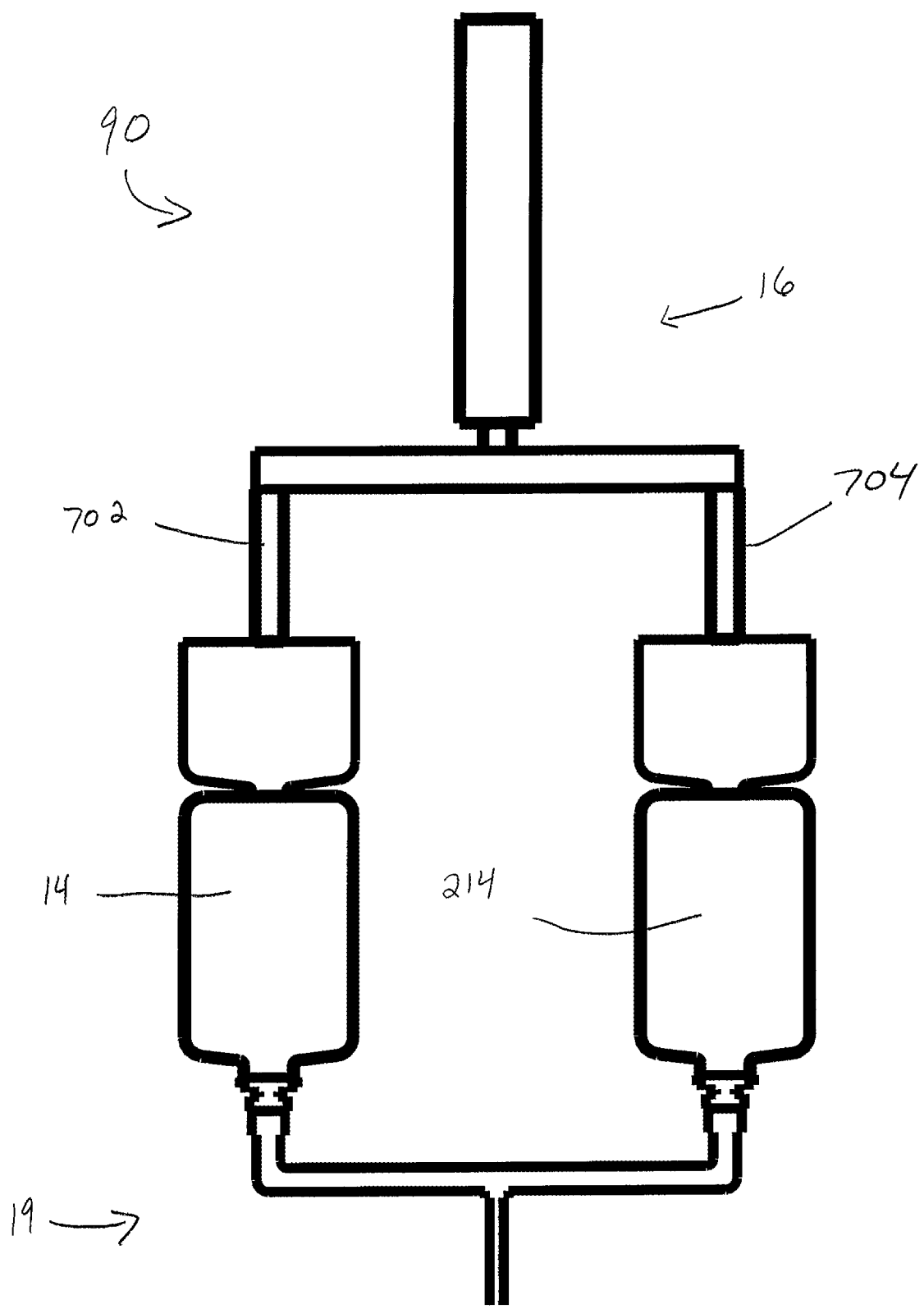
FIG. 15 is a perspective view of a fluid dispensing system in accordance with another embodiment of the present invention.
Figure 16:
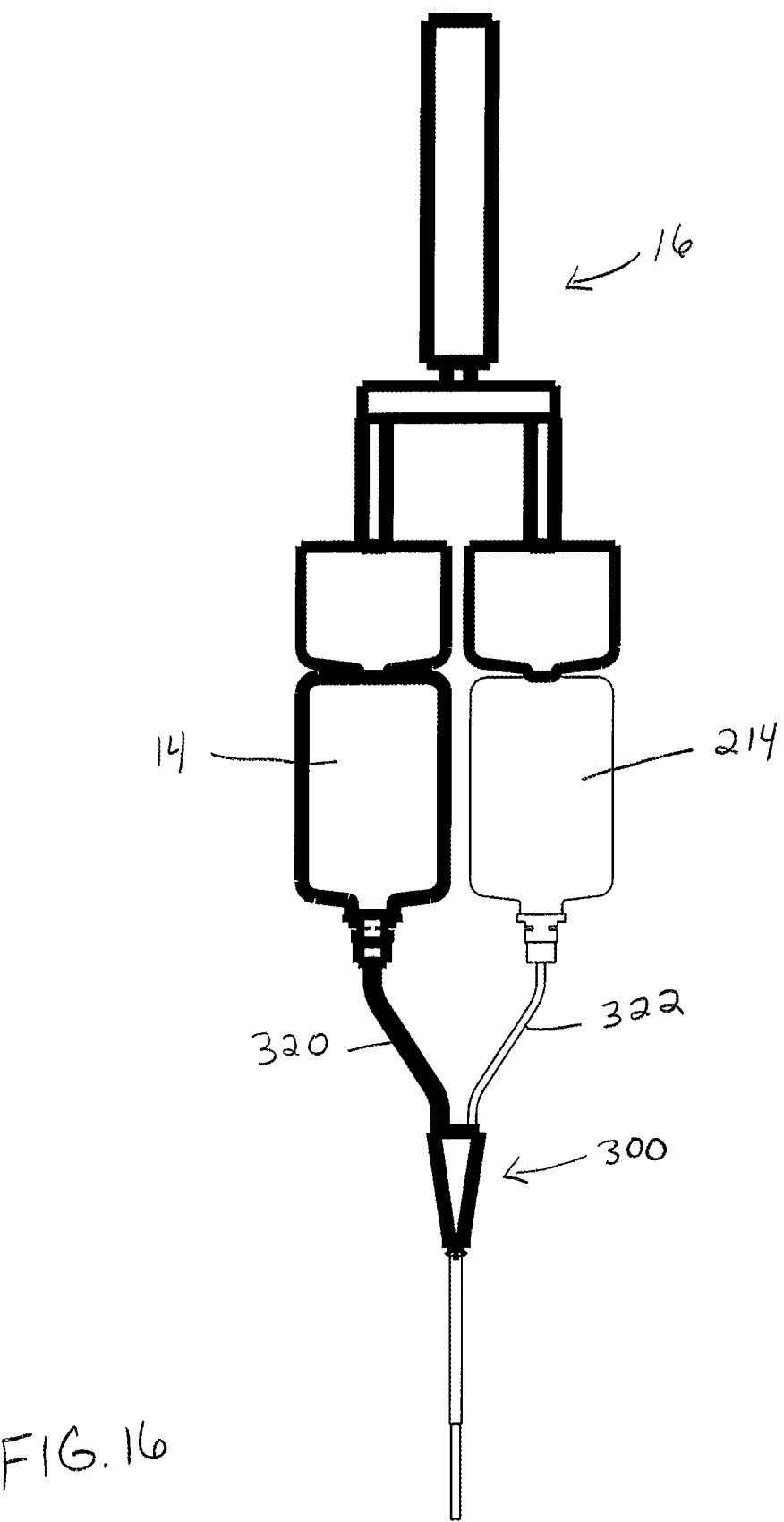
FIG. 16 is a perspective view of a fluid dispensing system in accordance with another embodiment of the present invention.

For example, referring to FIG. 15, a single force generation system 90 can be used to deform a first container 14 and a second container 214 simultaneously. A single force generation system 90 is used to simultaneously advance or move a first actuation member 702 and a second actuation member 704 from a first position towards a second position. As the actuation members 702, 704 simultaneously move from the first position towards the second position, the actuation member 702, 704 simultaneously deform containers 14, 214 to begin simultaneously expelling fluids or substances 50, 248 from containers 14, 214, respectively.

FIG. 15 of the present disclosure illustrates the use of two deformable containers which are plumbed together for the purpose of dispensing one stream of fluid. This configuration is desirable to provide maximum volume of fluid dispensing when utilizing a single component material. Examples of this type of material would include caulking and sealants, one-part moisture cure adhesives and coatings, and simple coatings such as silicone, urethane, or acrylic. While one deformable container could be used in this application the use of two or more containers plumbed together reduces the frequency of changing out emptied containers. For instance, when using a 4.5-gallon deformable container one plunger can be used to deform this one container. Alternatively, two deformable containers totaling 9 gallons could be dispensed with no change out needed after dispensing the first 4.5 gallons. This set up saves time.

Figure 33:
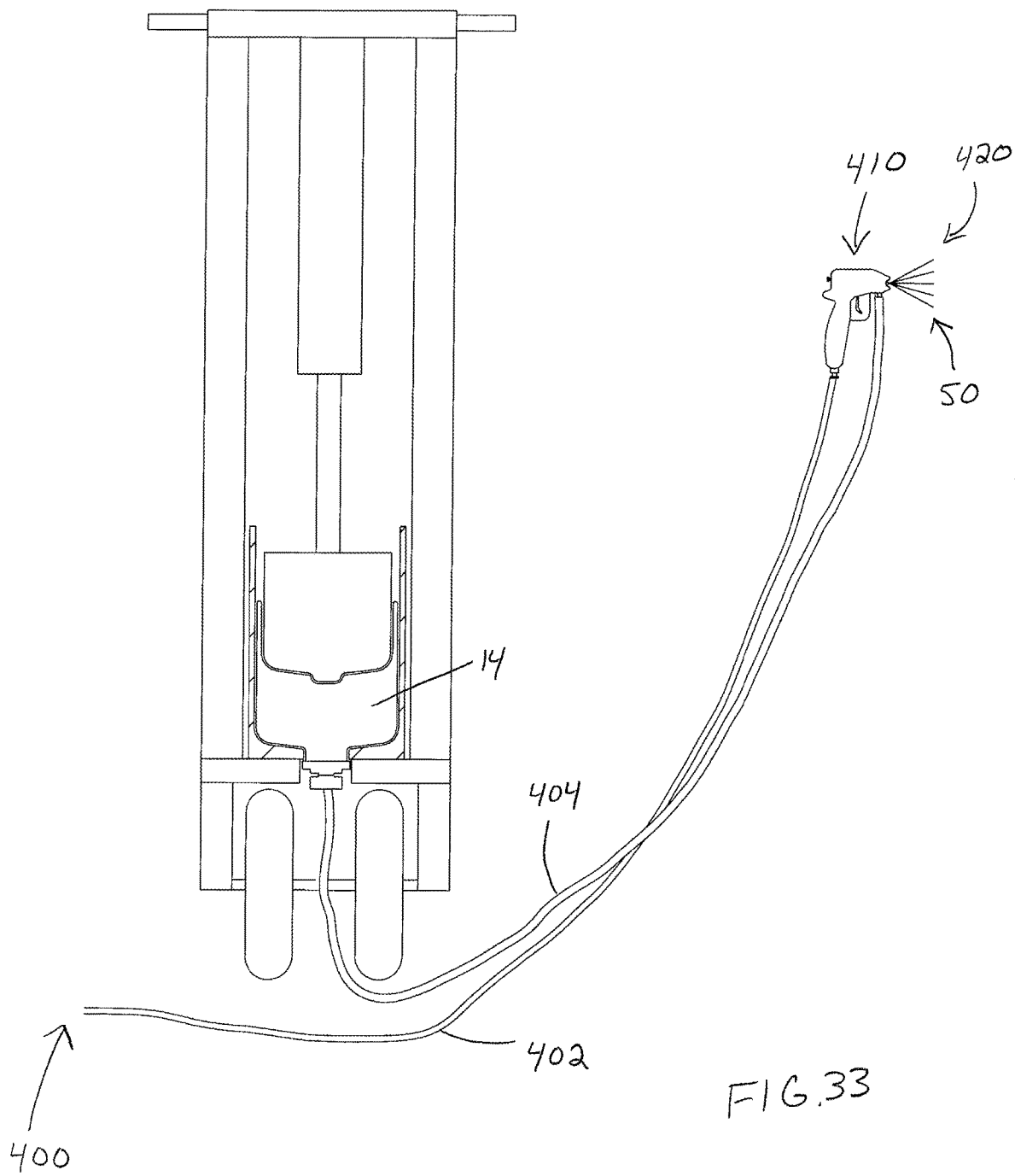
FIG. 33 is a perspective view of a fluid dispensing system in accordance with an embodiment of the present invention.
Figure 34:
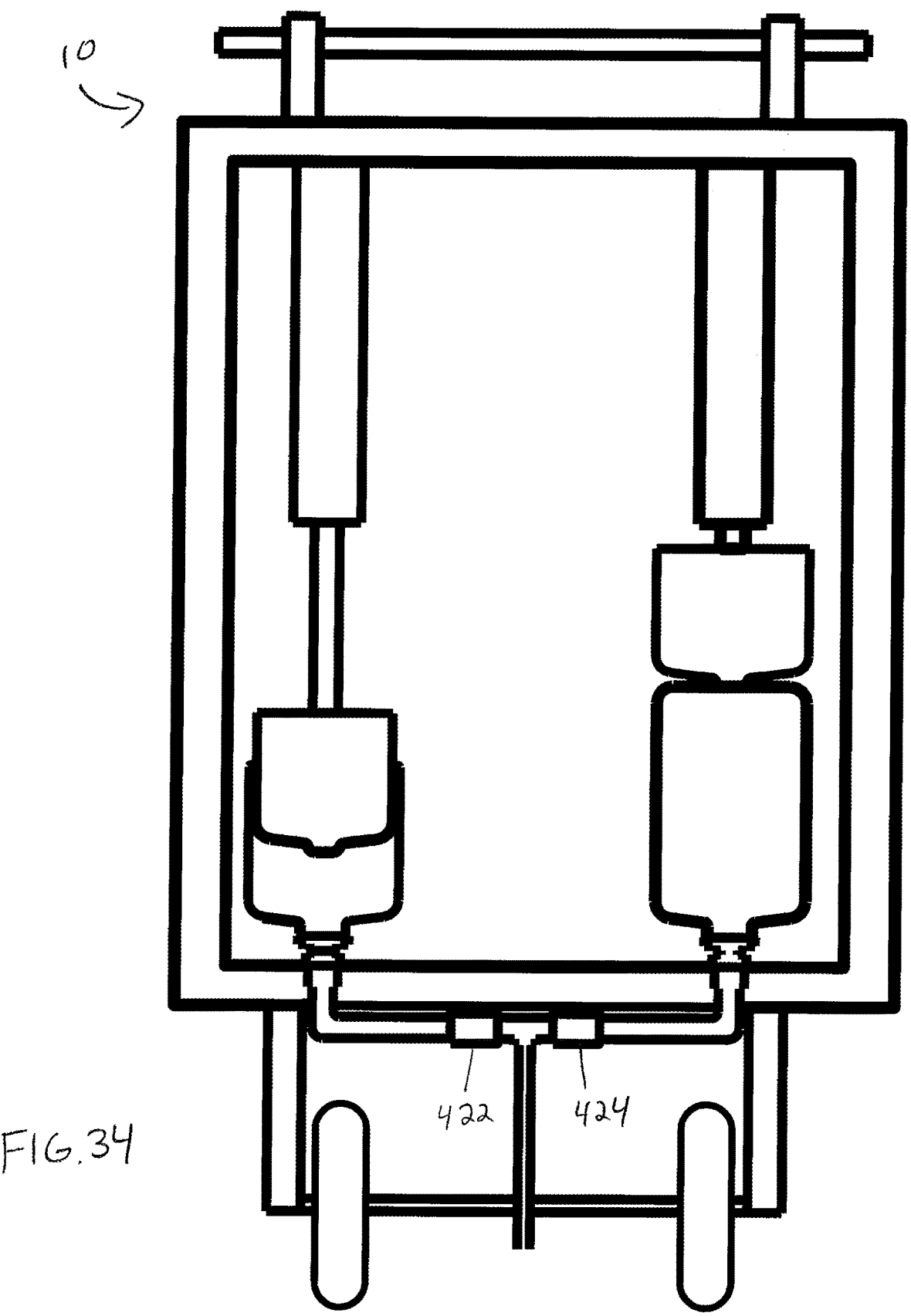
FIG. 34 is a perspective view of a fluid dispensing system in accordance with an embodiment of the present invention.
Figure 35:
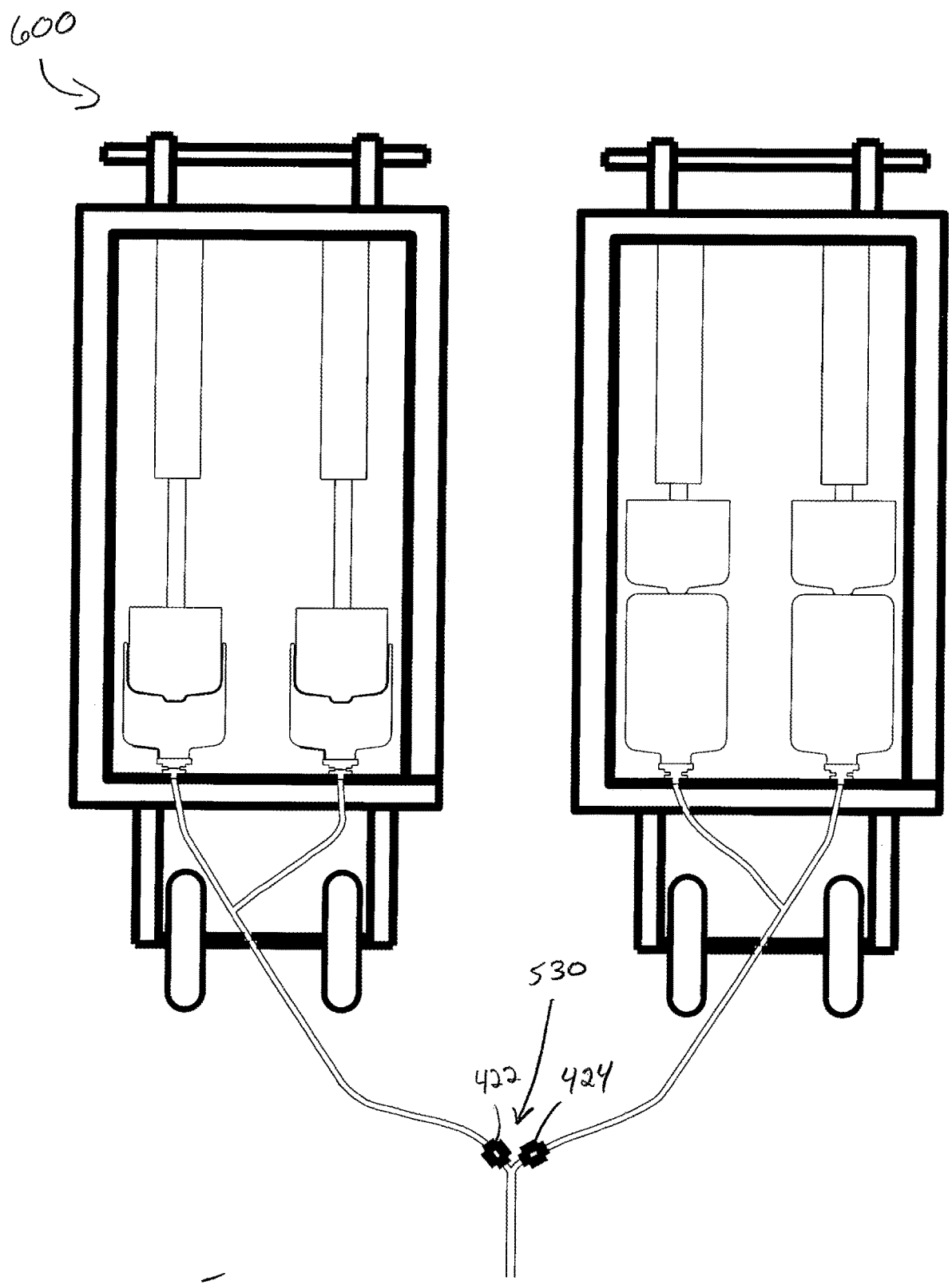
FIG. 35 is a perspective view of a fluid dispensing system in accordance with an embodiment of the present invention.

Referring to FIG. 33, in one exemplary embodiment, a system of the present disclosure includes a pressurized air source 400 that assists a flow of a fluid. Referring to FIG. 33, in one embodiment, a pressurized air source 400 provides a flow of air to a dispensing portion 410 via an air hose 402. A fluid or substance 50 is provided from the container 14 to the dispensing portion 410 via a fluid hose 404. The fluid hose 404 is separate and apart from the air hose 402. In this manner, the air flow provided to the dispensing portion 410 by the pressurized air source 400 streams across the path of the fluid 50 in the dispensing portion 410 to create a spray 420 of the fluid 50 that exits the dispensing portion 410 for a fluid dispensing application onto a surface. In one embodiment, a fluid 50 flows through the fluid hose 404 at a low pressure, e.g., at a pressure of approximately 20 psi to 300 psi.

In an exemplary embodiment of the present disclosure, the air is added to the stream just prior to exiting an opening. The fluid flow without air may be ¼" round stream flowing at ½ gallon per minute. Introducing air pressure of about 30 psi will cause the fluid flow to spread out as it exits the aperture. The volume of material would remain at ½ gallon per minute but the pattern of the fluid flow will become random spreading out in droplets about ¼" to ½" in diameter over and area of about 8" in diameter. By increasing the pressure to about 90 psi the fluid flow will remain at ½ gallon per minute and the stream will become smaller droplets of about ⅛" diameter and create pattern of about 14" in diameter. This technique is particularly valuable with adhesives where the droplets do not need to be as fine as a high-pressure paint spray, but rather the goal is to generally cover a surface with enough adhesive for mating a second sheet or board to the substrate. This is the case with flooring, roofing, and wall panel applications.

In an exemplary embodiment, a deformable container 14 provides a good flow, 20 to 300 psi, of a fluid or substance 50 which can then be sprayed with the assistance of pressurized air 400. Gravity, low pressure pumps, and pressure pots are used to create substance flow, but these have the disadvantage of limited substance viscosity. Many products require heating the substance to lower its' viscosity for air assisted spray applications. Some two component substances, such as waterproofing materials can be sprayed with air assist but the material quantity is limited because it must be dispensed in a dual cartridge gun. These are generally limited to about 1500 ml. To utilize a larger volume of the substance the material has to be moved from a bulk container through a hose to an air assisted spray gun. A deformable container that can withstand pressures of up to 300 psi has the advantage of moving the substance and eliminating the need for either heating or pumping.

Figure 36:
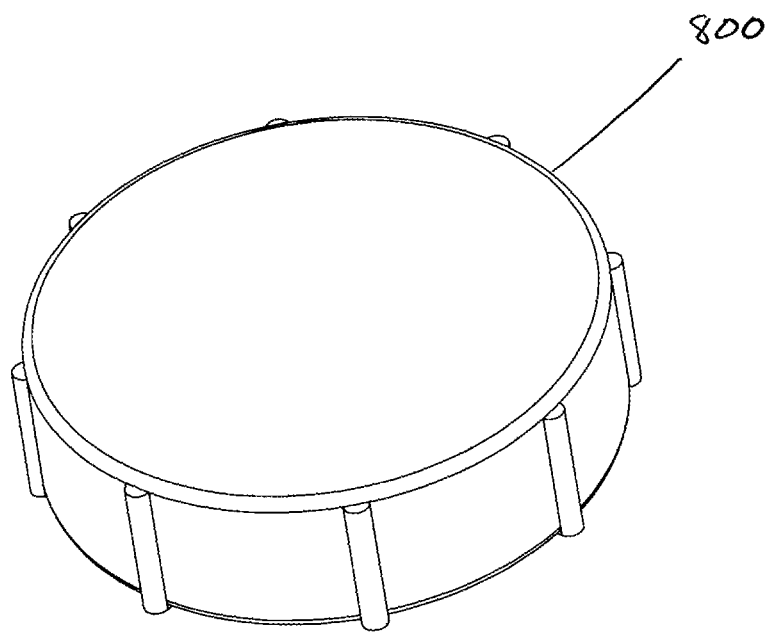
FIG. 36 is a perspective view of a component of a fluid dispensing system in accordance with an embodiment of the present invention.
Figure 53:
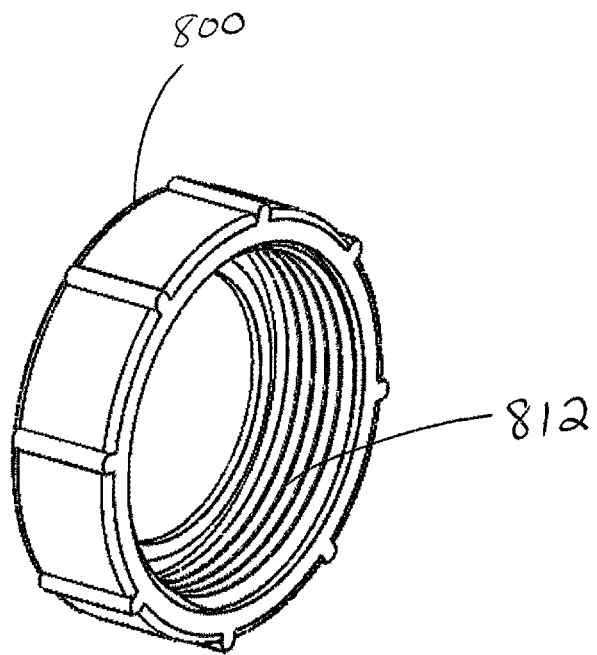
FIG. 53 is a perspective view of a cap in accordance with an embodiment of the present invention.
Figure 54:
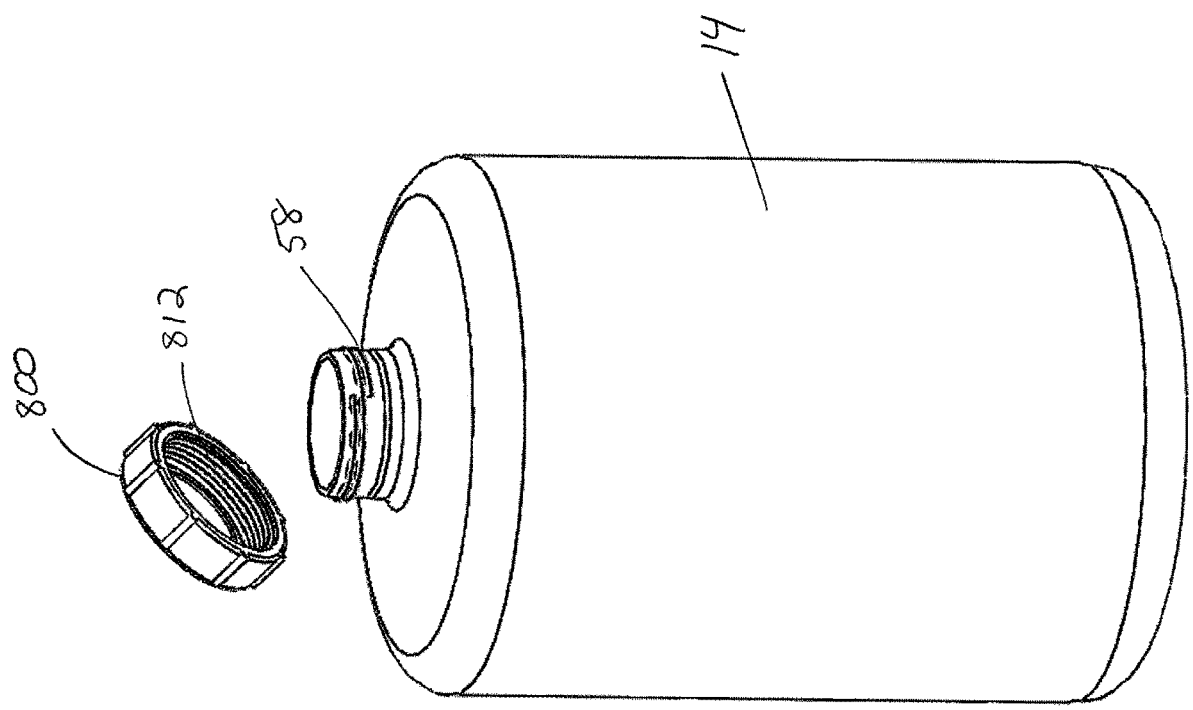
FIG. 54 is a perspective view of a container and a cap in accordance with an embodiment of the present invention.

Referring to FIGS. 36, 53, and 54, the cap or shipping cap 800 of the container 14 is different than the dispensing cap 56 (FIG. 1). The shipping cap 800 is tightened onto the second end 42 of the deformable container 14. The threads 58 of the container 14 are rigid enough to utilize threaded leverage to create pressure on the seal between the shipping cap gasket and the outermost surface of the deformable container 14. The seal is strong enough to withstand the rigors of shifting fluid waves inside the container during shipping and handling. Referring to FIG. 53, an internal threaded portion 812 of the shipping cap 800 is shown. Referring to FIG. 54, the internal threaded portion 812 of the shipping cap 800 is removably connectable with the threads 58 of the deformable container 14.

Figure 37:
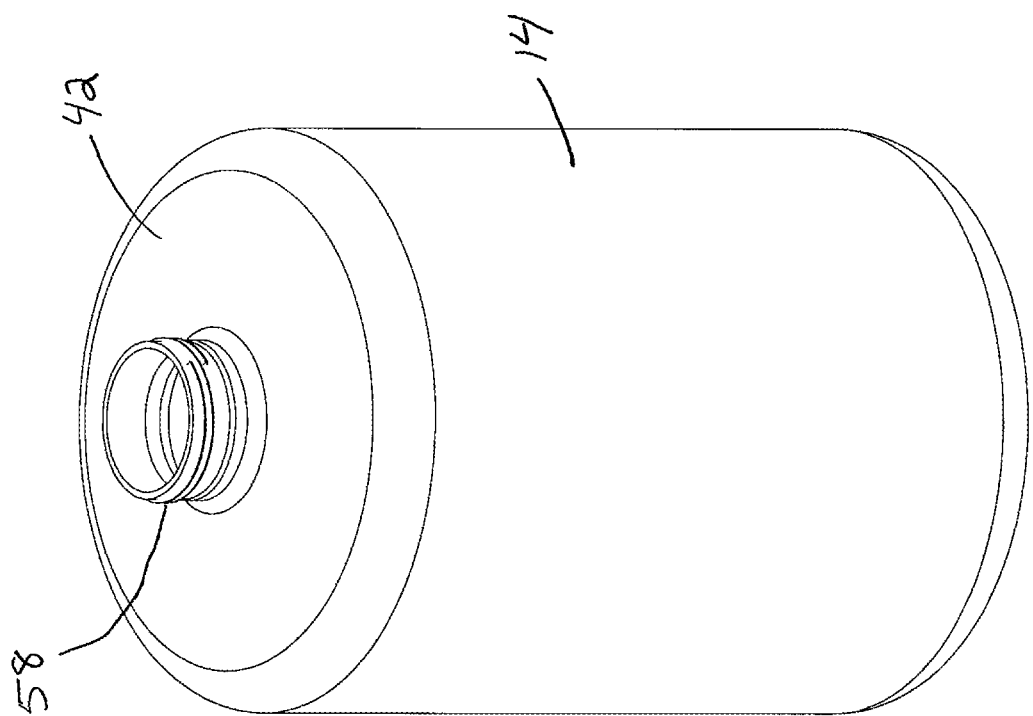
FIG. 37 is a perspective view of a component of a fluid dispensing system in accordance with an embodiment of the present invention.

Referring to FIG. 37, the second end 42 of the deformable container 14 is rigid enough to provide threads 58, the cap can be tightly sealed for both the dispensing and shipping caps 56, 800. The shape of the second end 42 of the deformable container 14 is fashioned to correspond with the interior shape of the second end 22 of the confinement structure 12. Some art utilizes opened flexible packages which leak inside a barrel. Some conventional systems utilize plungers that extend into canisters creating a mess on the plungers. The attempt to separate the plungers from the fluid being dispensed have the disadvantage of a separate cup which slides inside the canister but is not sealed to the canister thereby allowing significant leakage onto the plunger and the frame. The present invention addresses these issues with the use of a deformable container. Furthermore, conventional canisters not only have a separate cup at the first end, they have no support around the canister. The canister is therefore rigid in an attempt to hold the substance pressure from breaking through the sidewall of the canister. This only works when the exit aperture is free and clear. In practice the sidewall of canisters or caulking tube frequently break and the fluid spurts out through the sidewall opening.

Figure 38:
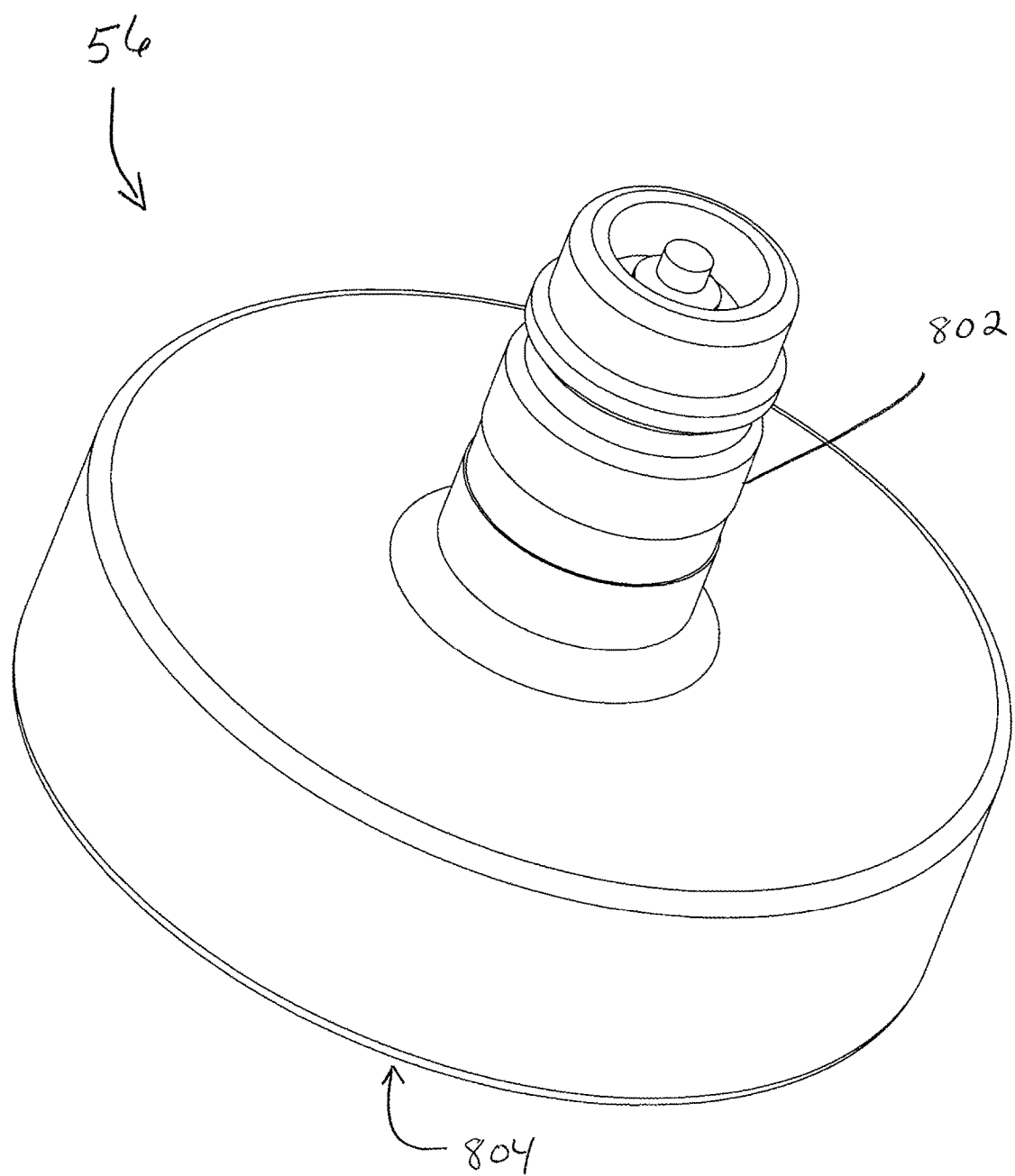
FIG. 38 is a perspective view of a component of a fluid dispensing system in accordance with an embodiment of the present invention.

Referring to FIG. 38, the dispensing cap 56 has the same internal threads 804 as the shipping cap 800 and is designed to create a seal with the second end 42 of the deformable container 14. The center of the dispensing cap 56 has ridges 802 to match a standard quick connect fitting. The fitting is valved meaning it is closed when not connected. This allows the deformable container to be placed into the confinement structure and then into the carrier without spillage. The connection of the fitting to the container is not open like a sausage package where material touches the inside of a bulk caulking barrel rather this connection between the deformable container and the quick connect fitting of a hose or manifold provides sealed transport from the deformable container to the exit aperture or hose. Bulk caulking guns fail to provide this leak free connection.

Figure 39:
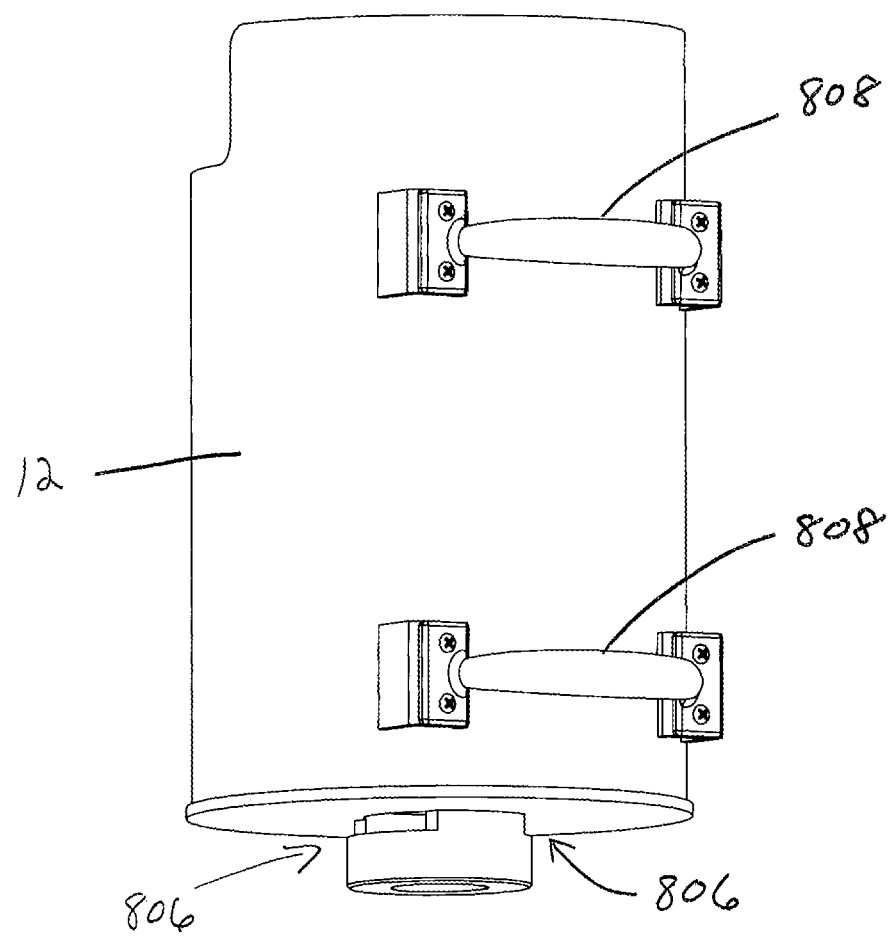
FIG. 39 is a perspective view of a component of a fluid dispensing system in accordance with an embodiment of the present invention.

Referring to FIG. 39, the confinement structure 12 is fashioned to have an interior shape that matches the exterior of the deformable container 14. Slots 806 on the second end 22 of the confinement structure 12 orient and locate the confinement structure 12 into a precise position of the force resistance structure 190. The confinement structure 12 is gravitationally secured into the force resistance structure 190. The two handles 808 on the outside of the confinement structure 12 allow for the lifting and manipulating of the confinement structure 12. When a deformable container 14 of about 4.5 gallons is filled with a coating and positioned within the confinement structure 12 the resulting weight is about 55 pounds. The two handles 808 assist with this load.

Figure 40:
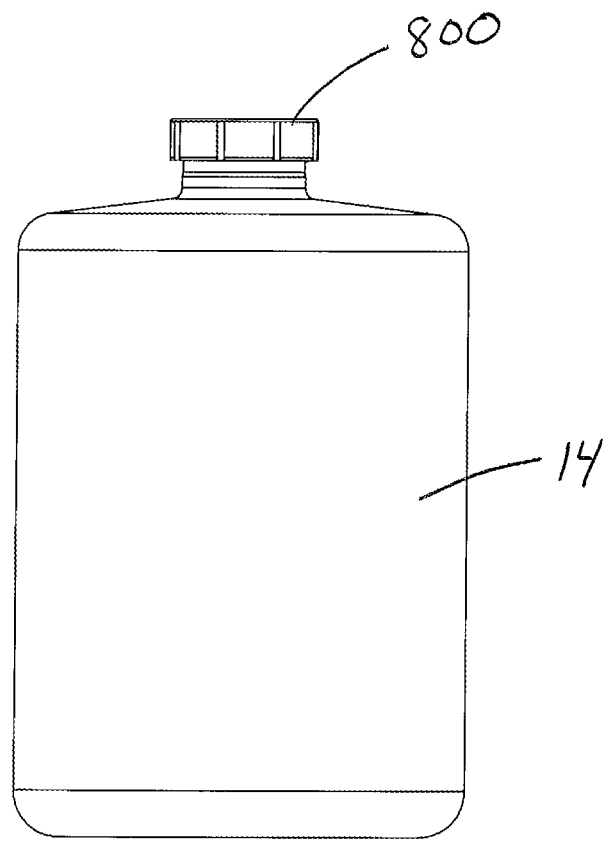
FIG. 40 is a perspective view of a component of a fluid dispensing system in accordance with an embodiment of the present invention.

Referring to FIG. 40, the shipping cap 800 fits snugly onto the deformable container 14 to create a seal.

Figure 41:
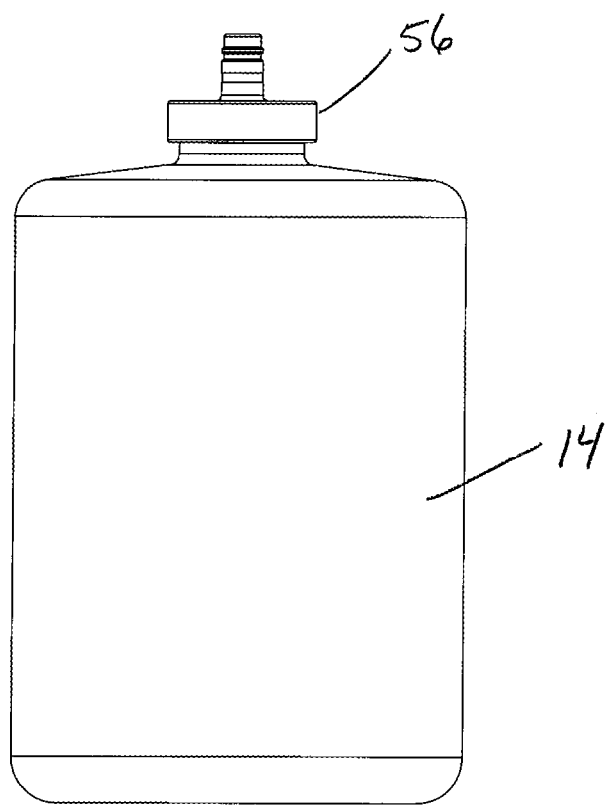
FIG. 41 is a perspective view of a component of a fluid dispensing system in accordance with an embodiment of the present invention.

Referring to FIG. 41, the dispensing cap 56 and quick connect fitting seal the deformable container 14. With the second end 42 of the deformable container 14 in the up position the confinement structure 12 can be slid down over the deformable container 14.

Figure 42:
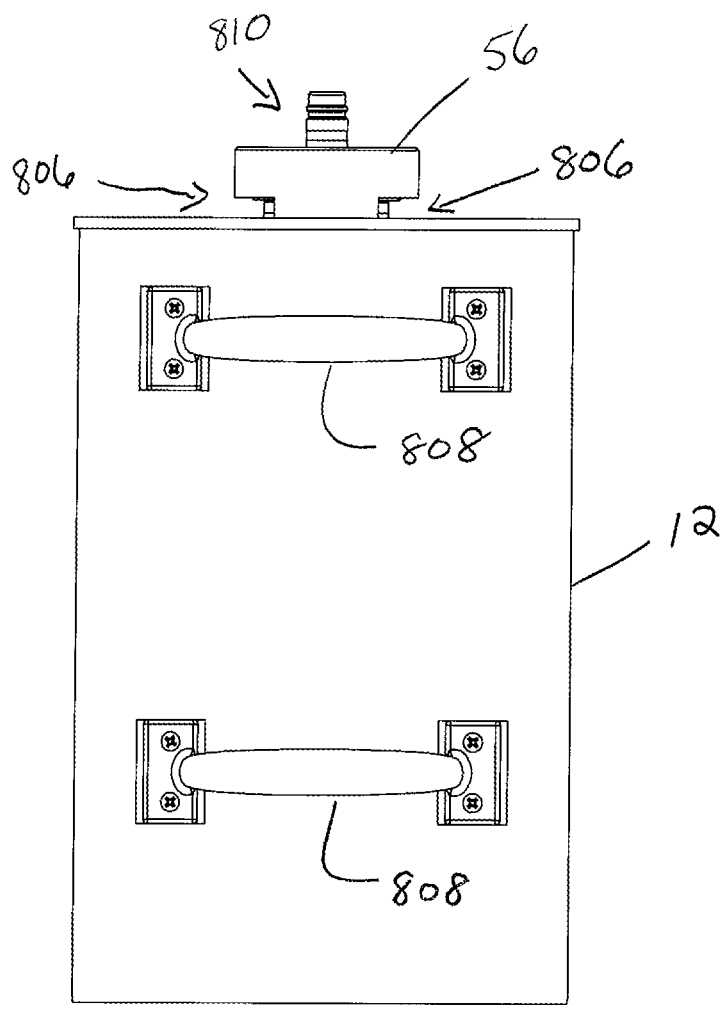
FIG. 42 is a perspective view of a component of a fluid dispensing system in accordance with an embodiment of the present invention.

Referring to FIG. 42, the quick connect fitting 810 extends through the opening in the second end 22 of the confinement structures 12 and an attachment can be connected to dispensing cap 56 prior to placing the confinement structure 12 into the force resistance structure 190.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A fluid dispensing system, comprising:
    a first carrier;
    a first container disposed on a first portion of the first carrier, the first container defining a first container interior adapted to hold a first fluid;
    a first hose having a first hose end and a second hose end, the first hose end removably connectable to a first exit portion of the first container;
    a second carrier;
    a second container disposed on a first portion of the second carrier, the second container defining a second container interior adapted to hold a second fluid;
    a second hose having a third hose end and a fourth hose end, the third hose end removably connectable to a second exit portion of the second container;
    a valve system transitionable between a first position and a second position;
    a dispensing hose having an inlet and an outlet, the inlet of the dispensing hose is in communication with the first hose and the second hose via the valve system;
    a first force generation system disposed on a second portion of the first carrier in communication with the first container, the first force generation system transitionable between a first setting in which the first container holds the first fluid and a second setting in which the first force generation system actuates an actuator which expels the first fluid from the first container; and
    a first pressurized air source that assists a flow of the first fluid,
    wherein, with the valve system in the first position, the first hose is in fluid communication with the dispensing hose and the second hose is not in fluid communication with the dispensing hose, and
    wherein, with the valve system in the second position, the second hose is in fluid communication with the dispensing hose and the first hose is not in fluid communication with the dispensing hose.

2. The fluid dispensing system of claim 1, wherein the first carrier is movable over a surface.

3. The fluid dispensing system of claim 1, wherein the second carrier is movable over a surface.

4. The fluid dispensing system of claim 1, wherein the first carrier is separate from the second carrier.

5. The fluid dispensing system of claim 1, further comprising:
- a second force generation system disposed on a second portion of the second carrier in communication with the second container, the second force generation system transitionable between a third setting in which the second container holds the second fluid and a fourth setting in which the second force generation system actuates a second actuator which expels the second fluid from the second container.

6. The fluid dispensing system of claim 5, wherein the first fluid is a same fluid as the second fluid.

7. The fluid dispensing system of claim 6, further comprising:
- a third container disposed on a third portion of the first carrier, the third container defining a third container interior adapted to hold a third fluid.

8. The fluid dispensing system of claim 7, further comprising:
- a third hose having a fifth hose end and a sixth hose end, the fifth hose end removably connectable to a third exit portion of the third container.

9. The fluid dispensing system of claim 8, further comprising:
- a fourth container disposed on a third portion of the second carrier, the fourth container defining a fourth container interior adapted to hold a fourth fluid.

10. The fluid dispensing system of claim 9, further comprising:
- a fourth hose having a seventh hose end and an eighth hose end, the seventh hose end removably connectable to a fourth exit portion of the fourth container.

11. The fluid dispensing system of claim 10, further comprising:
- a second valve system transitionable between a first position and a second position; and
- a second dispensing hose having a second inlet and a second outlet, the second inlet of the second dispensing hose is in communication with the third hose and the fourth hose via the second valve system,
- wherein, with the second valve system in the first position, the third hose is in fluid communication with the second dispensing hose and the fourth hose is not in fluid communication with the second dispensing hose, and
- wherein, with the second valve system in the second position, the fourth hose is in fluid communication with the second dispensing hose and the third hose is not in fluid communication with the second dispensing hose.

12. The fluid dispensing system of claim 11, wherein the first force generation system is in communication with the third container, the first force generation system transitionable between the first setting in which the third container holds the third fluid and the second setting in which the first force generation system actuates a third actuator which expels the third fluid from the third container.

13. The fluid dispensing system of claim 12, wherein the second force generation system is in communication with the fourth container, the second force generation system transitionable between the third setting in which the fourth container holds the fourth fluid and the fourth setting in which the second force generation system actuates a fourth actuator which expels the fourth fluid from the fourth container.

14. The fluid dispensing system of claim 13, wherein the third fluid is a same fluid as the fourth fluid.

15. The fluid dispensing system of claim 14, wherein the third fluid and the fourth fluid are a different fluid than the first fluid and the second fluid.

16. The fluid dispensing system of claim 15, wherein the fluid dispensing system allows for a first continuous flow of one of the first fluid and the second fluid to the dispensing hose.

17. The fluid dispensing system of claim 16, wherein the fluid dispensing system allows for a second continuous flow of one of the third fluid and the fourth fluid to the second dispensing hose.

18. The fluid dispensing system of claim 17, further comprising a second pressurized air source that assists a flow of the second fluid.

19. The fluid dispensing system of claim 17, further comprising a third pressurized air source that assists a flow of the third fluid.

20. The fluid dispensing system of claim 17, further comprising a fourth pressurized air source that assists a flow of the fourth fluid.

21. A fluid dispensing system, comprising:
- a first carrier;
- a first container disposed on a first portion of the first carrier, the first container defining a first container interior adapted to hold a first fluid;
- a first hose having a first hose end and a second hose end, the first hose end removably connectable to a first exit portion of the first container;
- a second carrier;
- a second container disposed on a first portion of the second carrier, the second container defining a second container interior adapted to hold a second fluid;
- a second hose having a third hose end and a fourth hose end, the third hose end removably connectable to a second exit portion of the second container;
- a valve system transitionable between a first position and a second position; and
- a dispensing hose having an inlet and an outlet, the inlet of the dispensing hose is in communication with the first hose and the second hose via the valve system,
- wherein, with the valve system in the first position, the first hose is in fluid communication with the dispensing hose and the second hose is not in fluid communication with the dispensing hose, and
- wherein, with the valve system in the second position, the second hose is in fluid communication with the dispensing hose and the first hose is not in fluid communication with the dispensing hose.

* * * * *